(12) United States Patent
Gao et al.

(10) Patent No.: US 11,528,195 B2
(45) Date of Patent: Dec. 13, 2022

(54) SYSTEM FOR CREATING NETWORK TROUBLESHOOTING PROCEDURE

(71) Applicant: NetBrain Technologies, Inc., Burlington, MA (US)

(72) Inventors: Lingping Gao, Burlington, MA (US); Guangdong Liao, Burlington, MA (US); Feng Gan, Burlington, MA (US); Chaoxiang Cheng, Burlington, MA (US)

(73) Assignee: NetBrain Technologies, Inc., Burlington, MA (US)

( * ) Notice: Subject to any disclaimer, the term of this patent is extended or adjusted under 35 U.S.C. 154(b) by 0 days.

(21) Appl. No.: 16/374,374

(22) Filed: Apr. 3, 2019

(65) Prior Publication Data

US 2019/0230003 A1 Jul. 25, 2019

Related U.S. Application Data

(63) Continuation-in-part of application No. 15/652,797, filed on Jul. 18, 2017, now abandoned, and a
(Continued)

(51) Int. Cl.
*H04L 41/22* (2022.01)
*H04L 41/02* (2022.01)
(Continued)

(52) U.S. Cl.
CPC .............. *H04L 41/22* (2013.01); *H04L 41/02* (2013.01); *H04L 41/069* (2013.01); *H04L 41/0654* (2013.01); *H04L 41/0677* (2013.01); *H04L 41/0853* (2013.01); *H04L 41/20* (2013.01); *H04L 41/0213* (2013.01); *H04L 41/052* (2022.05); *H04L 41/0681* (2013.01); *H04L 41/12* (2013.01); *H04L 43/045* (2013.01);
(Continued)

(58) Field of Classification Search
CPC ... H04L 41/02; H04L 41/0654; H04L 41/069; H04L 41/20; H04L 41/22
USPC ....................................... 709/223
See application file for complete search history.

(56) References Cited

U.S. PATENT DOCUMENTS

5,276,789 A 1/1994 Besaw et al.
5,504,921 A 4/1996 Dev et al.
(Continued)

FOREIGN PATENT DOCUMENTS

WO WO 2014/145818 A1 9/2014
WO WO-2014145818 A1 * 9/2014 .......... G06F 11/0709

OTHER PUBLICATIONS

United States Patent and Office Action, dated Mar. 20, 2012, Trademark Office U.S. Appl. No. 12/510,467, 13 pages.
(Continued)

*Primary Examiner* — James E Springer
*Assistant Examiner* — Patrick F Ngankam
(74) *Attorney, Agent, or Firm* — Crowell & Moring LLP

(57) ABSTRACT

A system for constructing and storing procedures for troubleshooting computer networks. A user can design and add troubleshooting steps, via a GUI, to define the procedure including annotations. Each step is configured to take an action on the network. The order of the steps can be re-arranged via the GUI. The procedure can be stored and re-executed by another user.

19 Claims, 39 Drawing Sheets

Related U.S. Application Data continuation-in-part of application No. 14/619,957, filed on Feb. 11, 2015, now Pat. No. 10,454,782, which is a continuation-in-part of application No. 13/841,735, filed on Mar. 15, 2013, now Pat. No. 9,374,278.

(60) Provisional application No. 62/363,711, filed on Jul. 18, 2016.

(51) Int. Cl.

| | | |
|---|---|---|
| *H04L 41/069* | (2022.01) | |
| *H04L 41/0654* | (2022.01) | |
| *H04L 41/00* | (2022.01) | |
| *H04L 41/0853* | (2022.01) | |
| *H04L 41/0677* | (2022.01) | |
| H04L 43/045 | (2022.01) | |
| H04L 41/12 | (2022.01) | |
| H04L 43/0817 | (2022.01) | |
| H04L 41/0213 | (2022.01) | |
| H04L 43/0811 | (2022.01) | |
| H04L 43/16 | (2022.01) | |
| H04L 41/0681 | (2022.01) | |
| H04L 43/10 | (2022.01) | |
| H04L 41/052 | (2022.01) | |

(52) U.S. Cl.
CPC ....... *H04L 43/0811* (2013.01); *H04L 43/0817* (2013.01); *H04L 43/10* (2013.01); *H04L 43/16* (2013.01)

(56) References Cited

U.S. PATENT DOCUMENTS

| | | | |
|---|---|---|---|
| 5,572,640 A | 11/1996 | Schettler | |
| 5,999,179 A * | 12/1999 | Kekic | H04L 41/0213 |
| | | | 715/969 |
| 6,058,103 A | 5/2000 | Henderson et al. | |
| 6,078,924 A | 6/2000 | Ainsbury et al. | |
| 6,137,782 A | 10/2000 | Sharon et al. | |
| 6,151,031 A | 11/2000 | Atkins et al. | |
| 6,205,122 B1 | 3/2001 | Sharon et al. | |
| 6,253,240 B1 | 6/2001 | Axberg et al. | |
| 6,286,035 B1 | 9/2001 | Gillis | |
| 6,289,380 B1 | 9/2001 | Battat et al. | |
| 6,477,572 B1 | 11/2002 | Elderton et al. | |
| 6,628,304 B2 | 9/2003 | Mitchell et al. | |
| 6,718,382 B1 | 4/2004 | Li et al. | |
| 6,788,315 B1 | 9/2004 | Kekic et al. | |
| 6,907,572 B2 | 6/2005 | Little et al. | |
| 6,909,708 B1 | 6/2005 | Krishnaswamy et al. | |
| 6,957,263 B2 | 10/2005 | Galou et al. | |
| 7,054,901 B2 | 5/2006 | Shafer | |
| 7,082,464 B2 | 7/2006 | Hasan | |
| 7,219,339 B1 * | 5/2007 | Goyal | H04L 41/0879 |
| | | | 717/142 |
| 7,254,778 B2 | 8/2007 | Dikhit | |
| 7,310,666 B2 | 12/2007 | Benfield et al. | |
| 7,376,719 B1 | 5/2008 | Shafer et al. | |
| 7,469,139 B2 | 12/2008 | van de Groenendaal | |
| 7,590,718 B2 | 9/2009 | Gilmour et al. | |
| 7,721,304 B2 | 5/2010 | Datla et al. | |
| 7,742,459 B2 | 6/2010 | Kwan et al. | |
| 7,765,320 B2 | 7/2010 | Vehse et al. | |
| 7,783,733 B1 | 8/2010 | Yip et al. | |
| 7,813,281 B2 | 10/2010 | Bolt et al. | |
| 7,823,069 B1 | 10/2010 | Tanner et al. | |
| 7,848,337 B1 | 12/2010 | Weng et al. | |
| 7,908,594 B2 | 3/2011 | Varanasi et al. | |
| 7,996,415 B1 | 8/2011 | Raffill et al. | |
| 8,266,264 B2 | 9/2012 | Hasan et al. | |
| 8,271,626 B2 | 9/2012 | Childers et al. | |
| 8,276,152 B2 | 9/2012 | Sanghvi | |
| 8,386,593 B1 | 2/2013 | Gao | |
| 8,386,937 B1 | 2/2013 | Gao et al. | |
| 8,549,499 B1 | 10/2013 | Ding et al. | |
| 8,782,201 B2 | 7/2014 | Kephart et al. | |
| 8,943,184 B2 | 1/2015 | Kothe | |
| 2002/0054169 A1 | 5/2002 | Richardson | |
| 2002/0152305 A1 | 10/2002 | Jackson et al. | |
| 2002/0161861 A1 | 10/2002 | Greuel | |
| 2002/0161875 A1 * | 10/2002 | Raymond | H04L 41/18 |
| | | | 709/223 |
| 2002/0198974 A1 | 12/2002 | Shafer | |
| 2003/0009430 A1 | 1/2003 | Burkey et al. | |
| 2003/0033588 A1 | 2/2003 | Alexander | |
| 2003/0051032 A1 | 3/2003 | Schenkel et al. | |
| 2003/0055892 A1 | 3/2003 | Huitema et al. | |
| 2003/0101262 A1 | 5/2003 | Godwin | |
| 2003/0135758 A1 | 7/2003 | Turner | |
| 2003/0204590 A1 | 10/2003 | Torii | |
| 2004/0019671 A1 | 1/2004 | Metz | |
| 2004/0024865 A1 | 2/2004 | Huang et al. | |
| 2004/0041833 A1 | 3/2004 | Dikhit | |
| 2004/0194088 A1 * | 9/2004 | Chen | G06F 9/45512 |
| | | | 718/100 |
| 2005/0005266 A1 | 1/2005 | Datig | |
| 2005/0060693 A1 | 3/2005 | Robison et al. | |
| 2005/0138557 A1 | 6/2005 | Bolder et al. | |
| 2005/0165597 A1 | 7/2005 | Nightingale | |
| 2005/0243066 A1 | 11/2005 | Li | |
| 2005/0256961 A1 | 11/2005 | Alon et al. | |
| 2006/0004745 A1 | 1/2006 | Kuhn et al. | |
| 2006/0015591 A1 | 1/2006 | Datla et al. | |
| 2006/0031446 A1 | 2/2006 | Hamedi | |
| 2006/0036612 A1 | 2/2006 | Harrop et al. | |
| 2006/0062154 A1 | 3/2006 | Choy et al. | |
| 2006/0258348 A1 * | 11/2006 | Rajala | H04L 41/069 |
| | | | 455/423 |
| 2006/0282453 A1 | 12/2006 | Tjong et al. | |
| 2007/0006179 A1 | 1/2007 | Tjong et al. | |
| 2007/0011348 A1 | 1/2007 | Bansal | |
| 2007/0058570 A1 | 3/2007 | Singh et al. | |
| 2007/0101273 A1 | 5/2007 | Lin et al. | |
| 2007/0130112 A1 | 6/2007 | Lin | |
| 2007/0169008 A1 | 7/2007 | Varanasi et al. | |
| 2007/0204231 A1 | 8/2007 | Cunningham | |
| 2007/0283328 A1 | 12/2007 | Javed et al. | |
| 2008/0120129 A1 | 5/2008 | Seubert et al. | |
| 2008/0155423 A1 | 6/2008 | Moran et al. | |
| 2008/0155643 A1 | 6/2008 | Moran et al. | |
| 2009/0003232 A1 | 1/2009 | Vaswani et al. | |
| 2009/0094521 A1 | 4/2009 | Hung et al. | |
| 2009/0119280 A1 | 5/2009 | Waters | |
| 2009/0216867 A1 | 8/2009 | Pusateri et al. | |
| 2009/0288065 A1 | 11/2009 | Nathan et al. | |
| 2010/0023867 A1 | 1/2010 | Coldiron et al. | |
| 2010/0030984 A1 | 2/2010 | Erickson et al. | |
| 2010/0122175 A1 | 5/2010 | Gupta et al. | |
| 2010/0153852 A1 | 6/2010 | McCallum et al. | |
| 2010/0318639 A1 | 7/2010 | McCallum et al. | |
| 2010/0260066 A1 | 10/2010 | August et al. | |
| 2011/0047467 A1 * | 2/2011 | Porter | H04L 41/22 |
| | | | 715/734 |
| 2011/0087988 A1 | 4/2011 | Ray et al. | |
| 2011/0161730 A1 | 6/2011 | Van Der Merwe et al. | |
| 2012/0054551 A1 | 3/2012 | Gao et al. | |
| 2012/0173691 A1 | 7/2012 | Kothe et al. | |
| 2012/0259762 A1 | 10/2012 | Tarighat et al. | |
| 2013/0042222 A1 | 2/2013 | Maddela | |
| 2013/0067018 A1 | 3/2013 | Reynolds et al. | |
| 2013/0073486 A1 | 3/2013 | Petrick | |
| 2013/0290224 A1 | 10/2013 | Crowns et al. | |
| 2013/0305091 A1 | 11/2013 | Stan et al. | |
| 2014/0004071 A1 | 2/2014 | Smith | |
| 2014/0078930 A1 | 3/2014 | Bevemyr | |
| 2014/0207840 A1 | 7/2014 | Smith et al. | |
| 2014/0258985 A1 | 9/2014 | Yawn et al. | |

(56) References Cited

U.S. PATENT DOCUMENTS

| | | | |
|---|---|---|---|
| 2014/0280831 A1 | 9/2014 | Gao et al. | |
| 2014/0280833 A1* | 9/2014 | Gao | H04L 41/0213 709/223 |
| 2014/0282027 A1* | 9/2014 | Gao | H04L 41/22 715/736 |

OTHER PUBLICATIONS

Cisco Systems, Inc. "Show Command Section Filter," Cisco IOS Release 12.3(2)T, 6 pages, 2003.
Office Action, dated Apr. 2, 2012, U.S. Appl. No. 12/505,432, 24 pages.
NetBrain Workstation Architect Edition, parts of chapter 10, Apr. 27, 2010.
NetBrain workstation 2.0 Oct. 10, 2008.
NetBrain Technologies New Channel Strategy in North America and Europe Mar. 17, 2010.
NetBrain Technologies Releases Enterprise Suite 4.0 at Ciscolive 2011, Jul. 8, 2011.
PCT International Search Report and Written Opinion dated Mar. 29, 2016, issued in corresponding International Application No. PCT/US2016/015603 (11 pages).
PCT International Search Report dated Aug. 7, 2014, issued in related International Application No. PCT/US2014/030647 (3 pages).
Schmidt et al., "Do-It-Yourself TMN Applications by Visual Programming Methods", IEEE Communications Magazine, IEEE Service Center, Piscataway, US, vol. 33, No. 11, Nov. 1, 1995, pp. 72-76.
Extended European Search Report dated Oct. 24, 2016, issued in corresponding European Application No. 16172682.3 (10 pages).
Extended European Search Report dated Oct. 24, 2016, issued in corresponding European Application No. 16172666.6 (10 pages).
Extended European Search Report dated Mar. 28, 2019, issued in corresponding European Application No. 16172666.6 ( (8 pages).
U.S. Appl. No. 12/505,432, filed Jul. 17, 2009.
U.S. Appl. No. 12/505,461, filed Jul. 17, 2009.
U.S. Appl. No. 12/510,467, filed Jul. 28, 2009.
U.S. Appl. No. 15/287,230, filed Oct. 6, 2016.
U.S. Appl. No. 13/841,735, filed Mar. 15, 2013.
U.S. Appl. No. 13/842,024, filed Mar. 15, 2013.
U.S. Appl. No. 13/842,222, filed Mar. 15, 2013.
U.S. Appl. No. 14/619,957, filed Feb. 11, 2015.
U.S. Appl. No. 15/652,797, filed Jul. 18, 2017.
U.S. Appl. No. 14/956,096, filed Dec. 1, 2015.
U.S. Appl. No. 14/956,107, filed Dec. 1, 2015.
U.S. Appl. No. 16/375,297, filed Apr. 4, 2019.

* cited by examiner

FIG. 7

| Device | Alert Message | Condition | First Time | Last Time | Co... | Acknowl... |
|---|---|---|---|---|---|---|
| Bos-F5_LB-ASA-SW | Bos-F5_LB-ASA-SW: Current Memory utilizatio... | ($$Memory[79] != None and $$Memory[79] >= [int_Warning_A_... | 2016-07-18 11:21:57 | 2016-07-18 11:21:57 | 1 | No |
| ITE_WLC | ITE_WLC: Device has been down | ($$DeviceStatus[Down] != None and $$DeviceStatus[Down] == [stri... | 2016-07-18 11:21:57 | 2016-07-18 11:21:57 | 1 | No |
| NBITE_ArubaWLC | NBITE_ArubaWLC: Device has been down | ($$DeviceStatus[Down] != None and $$DeviceStatus[Down] == [stri... | 2016-07-18 11:21:59 | 2016-07-18 11:21:59 | 1 | No |

FIG. 34

SYSTEM FOR CREATING NETWORK TROUBLESHOOTING PROCEDURE

CROSS-REFERENCE TO RELATED APPLICATIONS

This application claims priority as a continuation-in-part to U.S. patent application Ser. No. 14/619,957, entitled "SYSTEM AND METHOD FOR AUTOMATING NETWORK MANAGEMENT TASKS," filed on Feb. 11, 2015, which claims priority as a continuation-in-part to U.S. patent application Ser. No. 13/841,735, entitled "GRAPHIC USER INTERFACE BASED NETWORK MANAGEMENT SYSTEM TO DEFINE AND EXECUTE TROUBLESHOOTING PROCEDURE," filed on Mar. 15, 2013 and issued as U.S. Pat. No. 9,374,278; wherein the entirety of each of the aforementioned applications is hereby incorporated by reference. This application further claims priority as a continuation-in-part to U.S. patent application Ser. No. 15/652,797, entitled "SYSTEM FOR CREATING A NETWORK TROUBLESHOOTING PROCEDURE," filed on Jul. 18, 2017, which claims priority to U.S. Provisional Patent Application No. 62/363,711, entitled "A GUI System For Automated Computer Network Troubleshooting Task Steps," filed on Jul. 18, 2016; wherein the entirety of each of the aforementioned applications is hereby incorporated by reference.

BACKGROUND

This disclosure relates generally to network management and graphic user interface based automated procedures in network management. More specifically, it relates to system and method for automating network management tasks using graphical user interface and network management applications to retrieve and display dynamic network operating information.

Note that the points discussed below may reflect the hindsight gained from the disclosed inventions, and are not necessarily admitted to be prior art.

No doubt we are living in a time that almost every one of us and every single entity is connected by devices and computers via the Internet, proprietary intra-electronic networks through cable or wireless. Data and communications are being inter-exchanged constantly through the vast and complex network connections. A single interruption in network communication could mean hundreds of thousands of dollars in losses and damages. According to some current conservative estimates, network outages could cost $1,400 per minute on average. Reducing the down time is critical to the success of business.

Like the transportation highways in the real world, the communication highways in the virtual world are becoming ever more tangled and more complicated each single minute. Management of these networks is becoming more challenging at the most basic levels. Identifying a problematic device from the vast sea of network devices is literally like finding a needle in a hay stack.

The conventional way for network troubleshooting requires a network professional to manually run a set of standard commands and processes for each of the devices. However, to become familiar with those commands, along with each of its parameters takes years of practice. Also complicated troubleshooting methodology is often hard to share and transfer. Therefore even though a similar network problem happens again and again, each instance of troubleshooting may still have to start from scratch. However, networks are getting more and more complex and it is increasingly difficult to manage it efficiently with traditional methods and tools. The following are the key challenges using conventional ways to troubleshoot network problems:

Firstly, with text-based Command-Line Interface (CLI) as the primary method for troubleshooting a network problem, a network professional usually needs to repetitively execute the same CLI commands and decode key data from the command output many times for many network devices. This process is error-prone, strenuous and time consuming.

Secondly, currently there is no efficient mechanism or method to record a troubleshooting process for future reference. Consequently network professionals cannot share their troubleshooting knowledge with other network professionals. Within the same enterprise the same network professional may need to spend the same amount of time and effort to troubleshoot the same problem which had occurred before.

A generic network troubleshooting process consists of the following tasks: Define the problem, Gather the data, Analyze the data, Eliminate the possible problem causes, Find the root cause of the problem.

Many books and papers have been written to analyze the typical actions and decisions that are taken during each of these processes and how these could be planned and implemented via the standard procedures. However these procedures are static, and the process to gather and analyze data (usually via CLI commands) is still a very manual and meticulous process.

The invention of a computer-aided network engineering system, NETBRAIN™ Workstation (as described in U.S. Pat. No. 8,386,593 by the inventors of this application) provides a graphic user interface (GUI) that renders network troubleshooting automation possible. In a GUI-based system, a network structure may be represented with graphic features (icons, lines and menus) that represent corresponding features in a physical network. Such visual representation liberates a network engineer from memorizing the standard or proprietary protocols and the tedious manual tasks of typing.

The inventions provide GUIs for users to write Executable Procedures without having any programming background. After a Procedure is created, it can be run in NETBRAIN™ Workstation in connection with any network system. From start to finish, troubleshooting with a proposed solution may just take a few minutes instead of hours or days traditionally.

Computer network management and troubleshooting is complex. There are thousands of shell scripts and applications for different network problems. The available, but poorly documented solutions, can be overwhelming for junior network engineers. Most network engineers learn troubleshooting through reading the manufacture's manual or internal documentation from the company's documentation department. But the effectiveness varies. For instance, the troubleshooting knowledge captured in a document can only be helpful if the information is accurate and if the user correctly identifies the problem. Many companies have to conduct extensive training for junior engineers.

However, many computer network problems are common. It is most efficient by starting to try out a common troubleshooting procedure. For managed service providers (MSP), improving the efficiency of their troubleshooting processes means reduced training cost and increased reliability in providing services to their customers.

For repeatable diagnostic steps for most commonly reported problems, especially level one support cases, due to the sheer number of such "commonly reported problems," companies are strongly motivated to reduce human labor in resolving such issues, or collect accurate and complete diagnostics dataset in time for further analysis in order to reduce overall support cost.

In addition, high turnover rate and low skillset of level one support engineers suggests a need for enterprises and MSPs to automate such repeatable action as much as possible in order to reduce training cost and labor cost for most simple tasks.

Many companies currently use documentation, e.g., troubleshooting procedures, to maintain their knowledge base, but still rely on level one engineers to efficiently and reliably execute these recorded steps in order to make the procedures useful.

For highly repeatable complex multi-step troubleshooting processes, there is a need for specific technology knowledge for problem isolation. Such troubleshooting "knowledge" may not help a user resolve the entire case, but can come in handy to help guide the user to diagnose certain aspects of a problem. Today, this kind of knowledge is captured only in a company's internal knowledge base or in books covering network troubleshooting practices. However, effective usage of them relies on training and manual execution of such flows by each individual support engineer.

But even for those senior network engineers that may be versed at manually issuing individual CLI commands for network management, they may not have sufficient training and experience for writing executable scripts for automatic execution and repeated execution.

BRIEF SUMMARY OF THE INVENTION

The present application discloses new approaches to troubleshooting a network problem and a GUI system for standardizing computer network troubleshooting steps for re-use and knowledge transfer. A system is invented to define a Procedure which can be automatically executed. This type of Procedures is called an Executable Procedure. An Executable Procedure utilizes a visual programming method to enable a CLI-based troubleshooting processes executable and re-useable. It emulates the thinking process of human troubleshooters when they use CLI commands. A network professional without any programming background can also effectively program his know-how and the end result of this programming can be applied to any other type of network by anyone to troubleshoot a similar type of network problems.

In one embodiment, GUIs are provided to define an Executable Procedure. The definitions of an Executable Procedure are divided into a set of visual blocks and each block can be defined with a visual interface.

In one embodiment, by using a GUI, a user defines how to collect data from network devices, how to parse the key information from the data, and the methods to analyze the data and messages to be output when a certain condition occurs. After a Procedure is defined, the system automatically creates an executable application.

In one embodiment, the executable application is enabled to run from within a network map, on one or multiple network devices or through any other input from a user. A Procedure can be re-used to troubleshoot another network problem, create a map, verify the network health and create a report.

In one embodiment, functions that group together a set of processes for gathering data from execution results of network devices and connections are made accessible through a set of corresponding GUIs represented as a Parser.

In one embodiment, functions that group together a set of processes for analyzing data collected from network devices and connections are made accessible through a set of corresponding GUIs represented as a Trigger.

In one embodiment, a set of GUIs are provided to visually display an execution of a set of processes and commands in real time.

In one embodiment, a set of GUIs are provided to visually display identified possible errors and warning messages.

In one embodiment, a set of GUIs are provided to visually display a possible solution to a network problem.

In one embodiment, a set of troubleshooting processes and strategies are saved as a Procedure and are made accessible through a set of user interfaces.

In one aspect of the present disclosure, a system for creating a network management procedure with respect to a network of devices comprises a computer processor and a non-transient memory comprising instructions that, when executed by the computer processor, cause the computer processor to implement a method comprising: presenting a graphical user interface (GUI) on a display; presenting a representation of the network of devices on the display, wherein the representation include real-time information for each represented device; accepting from a user, via the GUI, one or more steps of the network management procedure, wherein each step is a single independently executable action with respect to the network; presenting, on the display, a graphic element corresponding to each accepted step; and storing the accepted steps as the network management procedure for later retrieval, wherein the graphic element for each step on the display is operable by a GUI operation applied to the graphic element.

In another aspect, a system for troubleshooting a network of devices comprises a computer processor and a non-transient memory comprising instructions that, when executed by the computer processor, cause the computer processor to implement a method comprising: presenting a graphical user interface (GUI) on a display; presenting a representation of the network of devices on the display, wherein the representation include real-time information for each represented device; presenting, on the display, a list of one or more stored network management procedures; accepting from a user, via the GUI, an indication of a listed network management procedure; retrieving the indicated network management procedure; presenting, on the display, one or more steps of the indicated network management procedure, wherein each step is a single independently executable action with respect to the network; and presenting, on the display, a graphic element corresponding to each step, wherein the graphic element for each step on the display is operable by a GUI operation applied to the graphic element.

The disclosed innovations, in various embodiments, provide one or more of at least the following advantages. However, not all of these advantages result from every one of the innovations disclosed, and this list of advantages does not limit the various claimed features.

The advantages of a system with a GUI for providing user control and access are obvious—dramatically shortening the learning curves and maximizing efficiency, and therefore enabling a junior network professional to consistently perform complicated network management tasks.

Further any time saved in troubleshooting may mean real money for an enterprise that relies on network stability and network performance. With a visual system running in real time, any network trouble may be identified instantly and therefore be fixed in a shorter period of time.

A well-built Procedure can automatically gather data, analyze data and eliminate possible causes. Besides troubleshooting the network problems, the Executable Procedure can also be used to: Create a map, for example, mapping an application's path Procedure. Provide network compliance or health checks. Create a customized report.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

FIG. 7 shows an example GUI for displaying execution results of a Procedure, according to some embodiments of the present disclosure.

FIGS. 31-35 show an example GUI for the design process described in FIG. 30 in accordance with this application.

DETAILED DESCRIPTION

Figure 1:
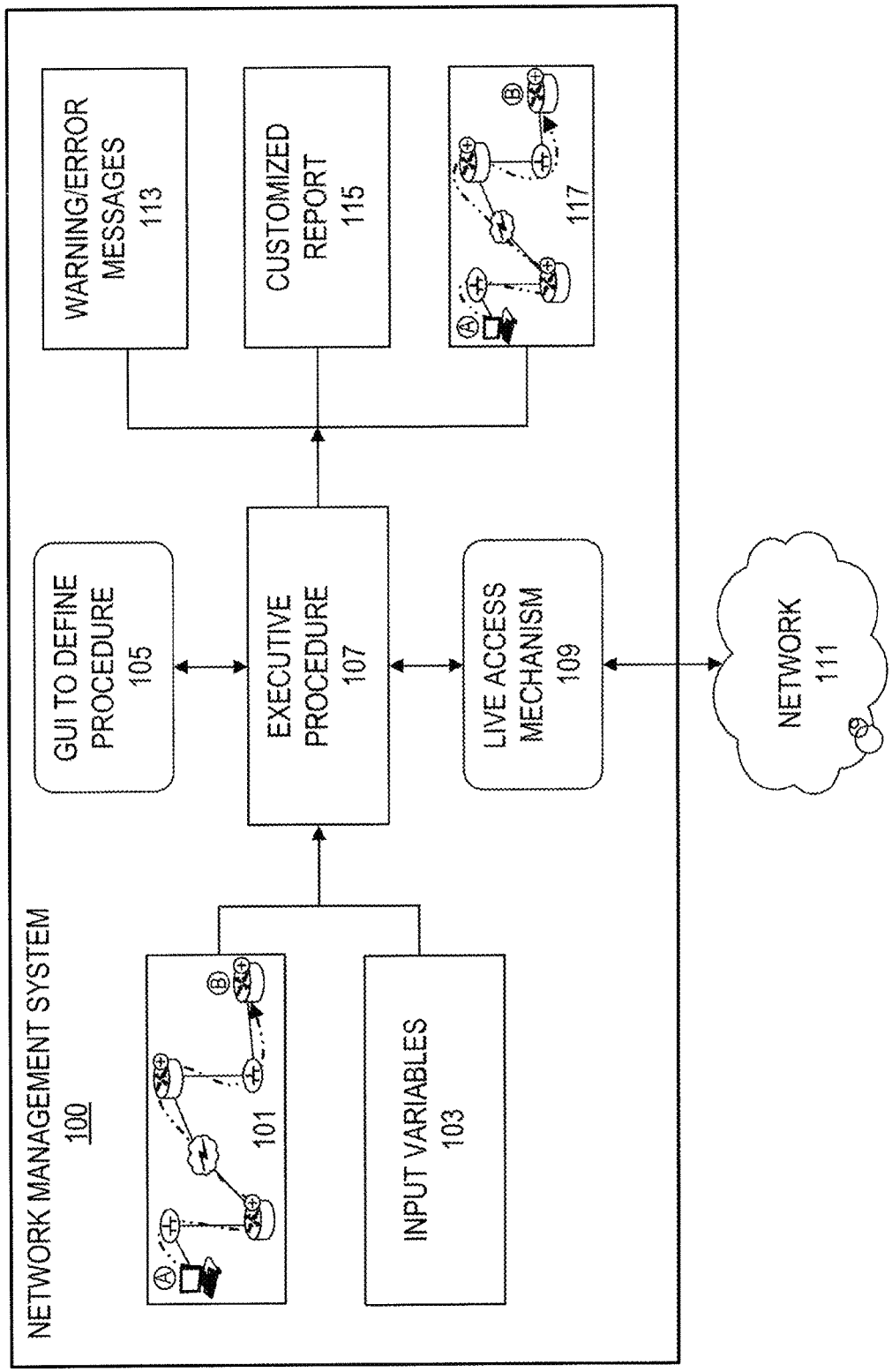
FIG. 1 shows an example functional interaction flow of an Executable Procedure of a GUI based network management system, according to some embodiments of the present disclosure.

Reference will now be made in detail to exemplary embodiments of the invention, examples of which are illustrated in the accompanying drawings. When appropriate, the same reference numbers are used throughout the drawings to refer to the same or like parts.

The numerous innovative teachings of the present application will be described with particular reference to presently preferred embodiments (by way of example, and not of limitation). The present application describes several inventions, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help improve understanding of embodiments of the invention.

The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present disclosure, and that the detailed description is not to be taken in a limiting sense, and that elements may be differently positioned, or otherwise noted as in the appended claims without requirements of the written description being required thereto.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

The aspects of the present disclosure may be described herein in terms of functional block components and various processing steps. It should be appreciated that such functional blocks may be realized by any number of hardware and/or software components configured to perform the specified functions. For example, these aspects may employ various integrated circuit components, e.g., memory elements, processing elements, logic elements, look-up tables, and the like, which may carry out a variety of functions under the control of one or more microprocessors or other control devices.

Similarly, the software elements of the present disclosure may be implemented with any programming or scripting languages such as C, C++, Java, COBOL, assembler, PERL, Python, or the like, with the various algorithms being implemented with any combination of data structures, objects, processes, routines, or other programming elements. Further, it should be noted that the present disclosure may employ any number of conventional techniques for data transmission, signaling, data processing, network control, and the like.

It should be appreciated that the particular implementations shown and described herein are for explanatory purposes and are not intended to otherwise be limiting in any way. Furthermore, the connecting lines shown in the various figures contained herein are intended to represent exemplary functional relationships and/or physical couplings between the various elements. It should be noted that many alternative or additional functional relationships or physical connections may be present in a practical incentive system implemented in accordance with the disclosure.

As will be appreciated by one of ordinary skill in the art, aspects of the present disclosure may be embodied as a method or a system. Furthermore, these aspects of the present disclosure may take the form of a computer program product on a tangible computer-readable storage medium having computer-readable program-code embodied in the storage medium. Any suitable computer-readable storage medium may be utilized, including hard disks, CD-ROM, optical storage devices, magnetic storage devices, and/or the like. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

As used herein, the terms "user," "network engineer," "network manager," "network developer" and "participant" shall interchangeably refer to any person, entity, organization, machine, hardware, software, or business that accesses and uses the system of the disclosure. Participants in the system may interact with one another either online or off-line.

Communication between participants in the system of the present disclosure is accomplished through any suitable communication means, such as, for example, a telephone network, intranet, Internet, extranet, WAN, LAN, personal digital assistant, cellular phone, online communications, off-line communications, wireless network communications, satellite communications, and/or the like. One skilled in the art will also appreciate that, for security reasons, any databases, systems, or components of the present disclosure may consist of any combination of databases or components at a single location or at multiple locations, wherein each database or system includes any of various suitable security features, such as firewalls, access codes, encryption, de-encryption, compression, decompression, and/or the like.

The terms "graphic" or "visual" or "graphic element" are used interchangeably and refer to the computer element that contains at least one interactive element. The terms refer to those computer elements that can be displayed on a computer screen with an effect of image or drawing associated with an interactive computer executable function; not simply as an input prompt. A graphic computer element is generally the available element in any current or future Graphical user Interface computer software design, such as a button, a hyperlink, a frame, a browser window, a scrolling bar, a text editor window, etc. In computer technology, graphical user interface is distinguished from CLI interface, any ordinary person in the art knows that CLI per se is a text based interface for operating computer programs.

A particularly powerful tool for understanding network behavior is through graphic visualization where the oftentimes complicated interactions between network devices are vividly represented through drawing and graphs. A computer-aided network engineering system, NETBRAIN™ Workstation, enables automation in network troubleshooting. A user such as a network professional can follow a few steps to troubleshoot a network problem including mapping the problem area, probing from a network map, and comparing the current network state with baseline data. Using a network management application known as an Executable Procedure (or Executive Procedure or simply Procedure), the user can select and execute one or more suitable Procedures relevant to the network problem from the network map. The output of the Procedure(s) may help to identify the cause of the problem.

According to one embodiment, a graphical representation of the network using a map may be output to a display screen, printer, plotter, or the like. Background technologies and terminologies for computer network Map and Path building, particularly Qmap and Qapp technology from NetBrain Technologies, Inc. of Burlington, Mass., are further described in U.S. Pat. Nos. 8,386,593, 8,386,937 and 9,374,278, the contents of each of which is incorporated by reference herein for all purposes.

In network troubleshooting, a network engineer may use a set of commonly used commands, methods, and tools, either standard or proprietary. For example, these commands, methods, and tools include the following items:

The Command Line Interface (CLI): network devices often provide CLI commands to check the network status or statistics. For example, in a Cisco IOS switch, the command "show interface" can be used to show the interface status such as input errors.

Ping: a simple tool used to check whether a device is reachable from another device. For example, after a network reconfiguration, it is normally a best practice to ping the main servers from the core network devices to ensure no major outage of key applications.

Traceroute: a tool to check the route from a device to a destination device. This tool is useful to troubleshoot a connectivity problem.

Configuration management: a tool used to find differences of configurations of network devices in a certain period. This is important since about half of the network problems are caused by configuration changes.

The term "Object" refers to the term used in computer technology, in the same meaning of "object oriented" programming languages (such as Java, Common Lisp, Python, C++, Objective-C, Smalltalk, Delphi, Java, Swift, C#, Perl, Ruby, and PHP). It is an abstracting computer logic entity that envelopes or mimics an entity in the real physical world, usually possessing an interface, data properties and/or methods.

The term "Device" refers to a data object representing a physical computer machine (e.g. printer, router) connected in a network or an object (e.g. computer instances or database instances on a server) created by computer logic functioning in a computer network.

The term "Interface" refers to the set of logic objects or methods of a Device that are used to communicate with another Device or data object.

The term "Topology" refers to the relationships and connections between Interfaces. For example, L3 topology refers to logic connections between two Interfaces and L2 topology refers to physical connections between two Interfaces. There are other types of logical relationship in mathematic modeling, such as L1 or other overlay technologies. In Q-map system, a user can use plug-in scripts to add other types of logic connections.

The terms "Q-map" or "Qmap" refers to a map of network devices created by the computer technology of NetBrain Technologies, Inc. that uses visual images and graphic drawings to represent topology of a computer network with interface property and device property displays through a graphical user interface (GUI). Typically, a computer network is created with a map-like structure where a device is represented with a device image and is linked with other devices through straight lines, pointed lines, dashed lines and/or curved lines, depending on their interfaces and connection relationship. Along the lines, also displayed are the various data properties of the device or connection.

The term "Qapp" refers to a built-in or user defined independently executable script or procedure generated through a graphical user interface as per technology available from of NetBrain Technologies, Inc.

The term "GUI" refers to graphical user interface, programs makes use of a visual paradigm that offers users a plethora of choices. GUI paradigm or operation relies on windows, icons, mouse, pointers and scrollbars to display graphically the set of available files and applications.

The term "Step" refers to a single independently executable computer action represented by a GUI element, that obtains, or causes, a network result from, or in, a computer network; a Step can take a form of a Qapp, a system function, or a block of plain text describing an external action to be executed manually by a user, such as a suggestion of action, "go check the cable." Each Step is thus operable and re-usable by a GUI operation, such as mouse curser drag-and-drop or a mouse clicking.

The term "modularized task-oriented standard procedure" refers to a set of Steps with in-between logic control to perform a computer network task. The task may be those operations commonly identified in the computer network management field. This term is also used interchangeably with the term "Runbook." A Runbook (RB) is a modularized task-oriented standard procedure saved to the present inventive system to be shared with other users.

The term "Execution Instance" refers to an Object created to encapsulate the running results from executing a Step.

The term "action block" refers to a set of Steps, that are grouped together to form a block, to be executed together and viewed on a monitor at a particular time of operation. There is an "ordered block" wherein the steps in the block must be executed following a predefined order, with the option of logical control, e.g. If-Else, to connect the individual steps. There is an "unordered block" wherein the steps in the block can be executed in any order or in parallel, with no pre-defined order or logical relationships between the individual steps in the same block.

In the computer network management field, an automated tool for the convenience in knowledge transfer and project cooperation is of paramount interest to network engineers. Generally a network task, for example, a troubleshooting task may involve many running steps, and a network engineer with software-writing skills can write a scripted procedure to automatically execute these individual steps. After accomplishing the task and solving the particular problem, the procedure may no longer be useful to this engineer. But this procedure and its individual steps can be very useful for other engineers to solve similar problems in their network systems. Automation and convenience in transfer knowledge can be tremendously useful for an enterprise in reducing cost and reliability.

In some aspects of the present disclosure, the term "users" may refer to network engineers who have a basic understanding of networking technologies, and are skilled in operating a network via a device command line interface and able to interpret a CLI output. Among them there can be two types of users, one type being those who design and create the task-oriented standard procedures (Creator, level two user) and the other type being those who make use of the created task-oriented standard procedures (User, level one user).

The two important actions taken by users are 1) to execute a standardized procedure and 2) to view the execution results stored in the Execution Instance. In a typical workflow for both Troubleshooting and Routing Task execution, it is quite common that the person who runs an execution of a procedure is different from the person who views the result for further analysis.

For example, in Troubleshooting Escalation, User A, a level one engineer, takes a ticket and after finding a particular standard troubleshooting procedure and follows the instructions to conduct an initial screening and data collection. User A creates Qmap with an Execution Instance. Then the ticket is picked up by a level two engineer. The level two engineer sees the initial screening result and data collected and stored for review in the Qmap Execution Instance record by the level one engineer User A, and continues to try to solve the problem.

In an enterprise or MSP organization, a standard procedure is typically created by a senior network engineer based on his rich experience of networking technologies and deep understanding on the enterprise or organization's own network architecture and device configuration. The created standard procedure is then expected to be created once and used many times as an effective vehicle for knowledge transfer.

But even those senior network engineers, who may be adept at manually issuing individual CLI commands for network management, may not have sufficient training and experience for writing executable scripts for automatic execution and repeated execution. A GUI that helps senior network engineers to convert their deep understanding of their network architecture into standardized task-oriented procedure will be tremendously beneficial for a company.

Troubleshooting procedures, usually provided by hardware vendors or experts in the field, may comprise the following sequence of actions: Execute the CLI, ping, traceroute, or other commands from one or more network devices; Find one or more key values from the command output; Compare the key value(s) with one or more standard values; Conduct actions depending on the key value(s) and/or the comparison.

For example, the actions may include executing other commands to further troubleshoot the network problem, determining the cause, and isolating the issue.

In traditional methods, each of these steps is generally performed manually on one network device at a time, which are tedious and error prone.

Some embodiments of the present disclosure utilize GUIs to provide a visual presentation of network commands, network executable processes, and/or network strategic procedures. These commands and processes can be visually represented, defined, and made accessible through GUIs and visual symbols.

Some embodiments may include a GUI to define an Executable Procedure. This user interface provides an easy way to define Procedures to allow a user to create a Procedure without special training in network programming. After a Procedure is saved, a standalone application containing executable codes may be created. In one example, creating the standalone application from the Procedure may be implemented using Python Script. Other suitable types of programming languages can also be used to convert a Procedure defined through the GUI to an executable standalone application.

In some embodiments, the GUI may include a Probe, a Trigger, and/or a Process Node.

A Probe includes a set of functions that retrieve and parse data from a network device.

A Trigger includes a set of functions that define the logic to analyze data.

A Process Node is a visual representation of a block of executable codes that generally include zero to multiple Probes and/or Triggers.

Some embodiments may include four types of Probes: a CLI command Probe runs CLI commands, and parses and analyzes the result; a Configuration Probe analyzes the configurations; a Ping Probe checks the connectivity between devices; a Traceroute Probe runs the traceroute command between two devices.

Some embodiments may include an Executable Procedure (or referred to as a Procedure for simplicity). A Procedure includes a set of processes and strategies to achieve a result that can be presented visually through the GUI. A Procedure may contain multiple Process Nodes and logic workflows from one Process Node to another.

Some embodiments may include a Parser. A Parser includes a set of functions that define how to retrieve data from the output of an execution of a CLI, ping, traceroute or any other types of commands. Depending on the format of the output, four types of Parsers may be provided: Keyword, Paragraph, Table, and Filter Parsers.

The configured and saved Executable Procedures may automate conventional troubleshooting processes. For example, an Executable Procedure can perform the following tasks automatically: Issue a command (CLI command/ping/traceroute/SNMP) to one or more network devices and collect the output via a Probe; Parse the command output to retrieve key data via a Parser; Analyze the key data using a Trigger; Output possible errors or warnings and advices via a GUI; and/or Create a network map and/or a document for an underlying network system or the troubleshooting process.

FIG. 1 shows a GUI-based Procedure system 100 for network management. System 100 includes a GUI 105. GUI 105 may be used to define an Executable Procedure 107. Executable Procedure 107 may be defined by a set of visual block-based programming interfaces to allow a user to effectively program or create network management applications. After a Procedure is saved, system 100 can create a standalone application containing executable codes, for example, using Python Script or any other type of programming language to convert Procedure 107 defined through GUI 105 to executable codes.

Executable Procedure 107 can be executed within a network map 101. For example, in a common scenario, a user creates network map 101 to include network devices and/or network interfaces relevant to a network task, and then selects the relevant Procedures to run within network map 101. Executable Procedure 107 can also receive user input, such as input variables 103 through a user input interface. When Procedure 107 is executed, Procedure 107 can collect data from various types of network devices in a live network 111 via a live access mechanism 109. The output of Executable Procedure 107 may include warning or error messages 113, customized report 115, and a network map 117 with the problem area being highlighted or noted.

Figure 2:
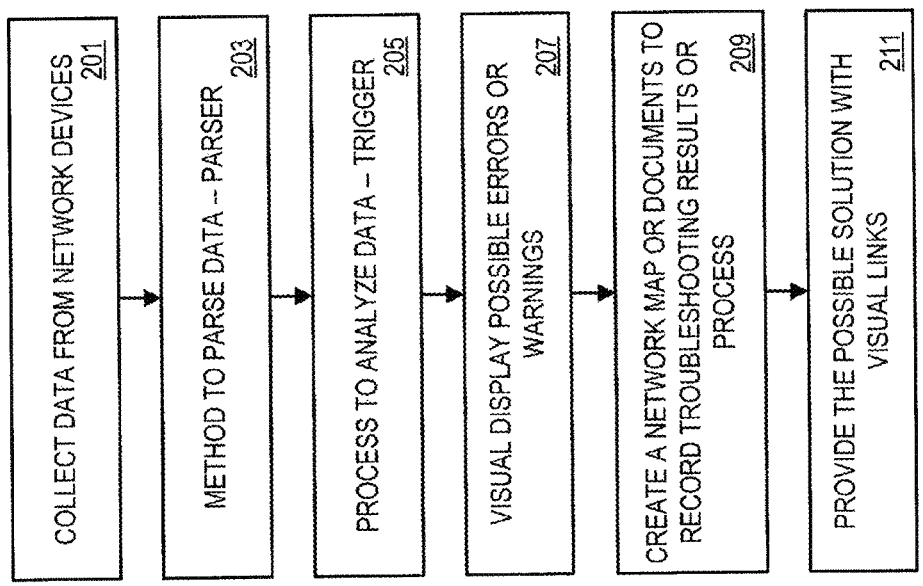
FIG. 2 shows a flow chart of an example execution flow of an Executable Procedure of a GUI based network management system, according to some embodiments of the present disclosure.

FIG. 2 shows a flow chart of an exemplary troubleshooting process using an Executable Procedure. At step 201, a group of built-in functions may be called and executed on a network or a network device to collect data. The data can be parsed at step 203 to extract key information. A Trigger may be used to analyze the extracted key information at step 205. The analysis result such as error messages or warnings can be displayed at step 207. A network map or document may be created to record the troubleshooting result or process at step 209. Possible solutions may be provided with visual links at step 211. The knowledge or logic to troubleshoot a network problem may be included and saved in the Procedure. Therefore, a network professional does not need to memorize manuals or steps for troubleshooting a common network problem.

Figure 3:
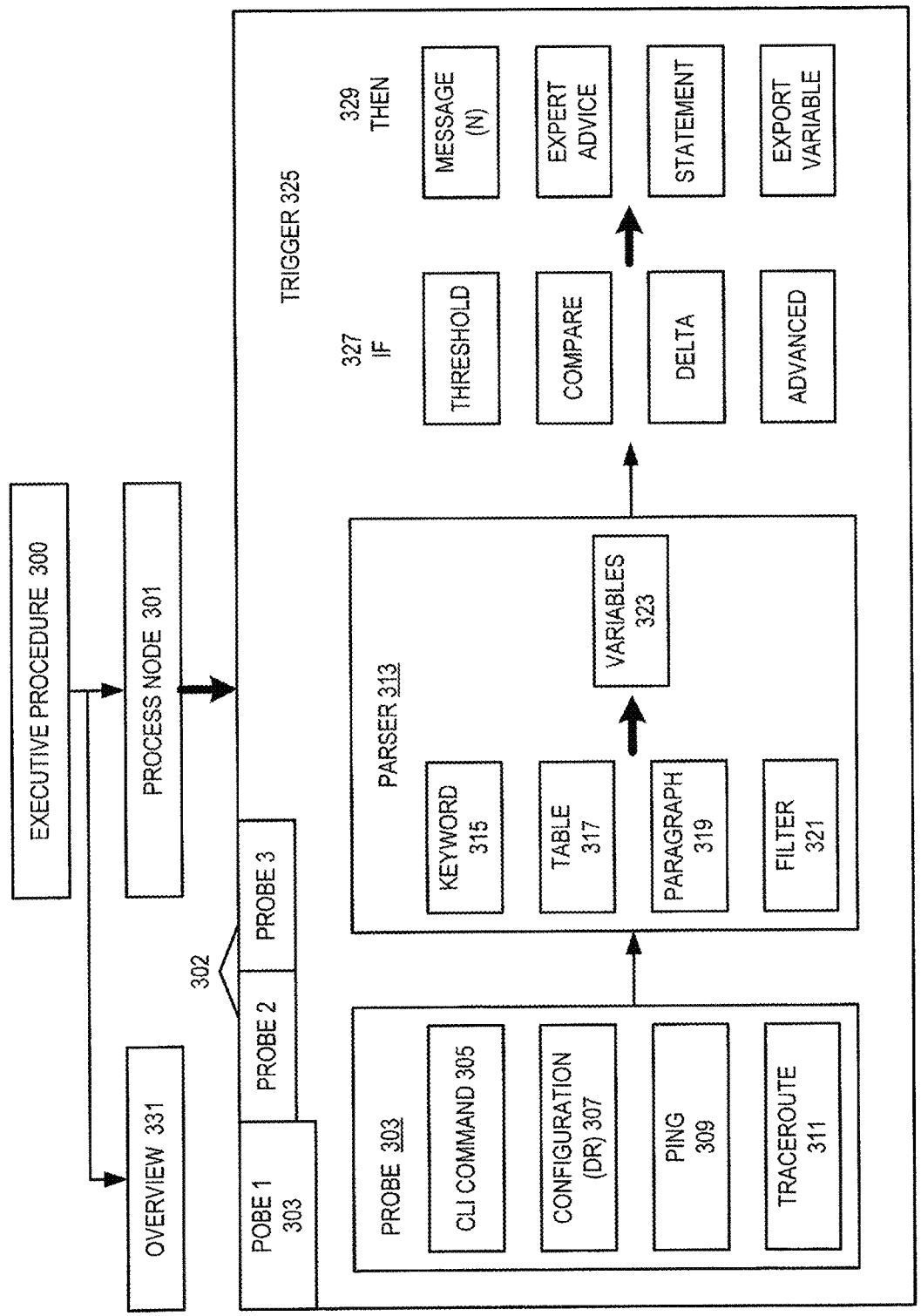
FIG. 3 illustrates an example process for constructing an Executable Procedure, according to some embodiments of the present disclosure.

FIG. 3 shows an exemplary Executable Procedure 300 including a Process Node 301, which further includes one or more Probes (Probe1 303, Probe2 302, etc.). Probe1 303 may include one or more commands, standard functions, and/or proprietary functions, such as CLI Command 305, Configuration (DR) 307, Ping 309, and/or Traceroute 311. Process Node 301 may also include one or more Parsers 313, which may include Keyword Parser 315, Table Parser 317, Paragraph Parser 319 and/or Filter Parser 321. Process Node 301 may also include one or more Triggers 325 that define various sets of "If" and "Then" analysis logic loops 327 and 329. Trigger 325 may include a plurality of settings. For example, Trigger 325 may include settings of Threshold, Compare, Delta, and/or Advanced. Variable output 323 from Parser 313 may be analyzed automatically with preset conditions of normality or abnormalities.

Executable Procedure 300 may include an Overview Node 331 that includes the description of Procedure 300 such as what the Procedure does, the author, a sample map, etc.

In some embodiments, a Process Node may be a programming unit of an Executable Procedure. The Process Node may be configured to finish a task. Each Node may be executed on a device at a time. In some embodiments, a built-in logic loop may allow the same logic to be executed across a dynamic set of devices. A Process Node may contain zero to multiple Probes and Triggers. A Probe may retrieve and parse data from a device. A Trigger may define logic to analyze the data. In some embodiments, four built-in Probes corresponding to common tools for network management may be provided.

CLI command Probe may be configured to run CLI command and to parse and analyze the result. Configuration Probe may be configured to analyze configurations. Ping Probe may be configured to check the connectivity between devices. Traceroute Probe may be configured to run a traceroute between two devices.

Besides the Probes described above, system 100 may also include other Probes such as SNMP Probes. A SNMP Probe may be configured to retrieve data via SNMP and to analyze the data.

A Parser may define how to parse the data from an output. Depending on the format of the output, the data may be parsed using a Keyword Parser, a Paragraph Parser, a Table Parser, or a Filter Parser.

Keyword Parser may be configured to retrieve an instance of the data. For example, Keyword Parser may retrieve the IOS version from the output of a "show version" command.

A Paragraph Parser may be configured to parse data if the original data (e.g., configurations or CLI command output) include multiple repeating instances. For example, Paragraph Parser may retrieve the CDP neighbor entries from the output of a "show cdp neighbors" command.

A Table Parser may be configured to parse data if the CLI command output is formatted as a table. For example, Table Parser may retrieve EIGRP neighbor details from a "show ip eigrp neighbor" command.

A Filter Parser may be configured to filter a partial data from the original data.

Data retrieved by a Parser may be stored in one or more output variables.

A Trigger may define the control flow to analyze the output variables retrieved by a Parser. For example, a Threshold Trigger can run a Parser once and compare a variable with a threshold value. For example, a Threshold Trigger can compare the CPU usage of a network device with a threshold value, such as 90%. If the CPU usage is higher than this threshold value, a warning message may be created.

A Compare Trigger can run a Parser against two data sources (e.g., live data and baseline data) and check whether a variable changes. For example, Compare Trigger can compare configurations retrieved from a live network with benchmark configurations and output any difference.

A Delta Trigger can run a Parser twice within a certain time interval and check whether a variable changes. For example, a Delta Trigger can retrieve CRC errors of a network interface within a certain time interval such as 5 seconds. If the CRC errors increase, an error message may be created indicating that the cable connected to this network interface does not work properly.

If one or more Triggers described above do not find the problem, an Advanced Trigger with advanced options may be used.

An exemplary logic used in a Trigger is as follows:

```
if (condition 1)
    action block 1
else if (condition 2)
    action block 2
else
    action block 3
```

System 100 may conduct an action block under a corresponding condition. Each action block can include multiple messages, an expert advice block, a statement block, an export variable block, and/or a control action probe.

A message can be shown in the Message field of a Procedure Task (e.g., a GUI to show results after a Procedure is executed). There may be three types of messages: the error message indicating an error requiring an immediate action, the warning message indicating something abnormal occurred, which requires attention, and the information message.

The Expert Advice field may be in text format for the Procedure user to give advice if a specified condition occurs.

It can be displayed in the Procedure Task window when a user views the detail of a message.

The Statement field can be any executable code such as making function calls to draw a map or creating customized fields for device properties.

Figure 4:
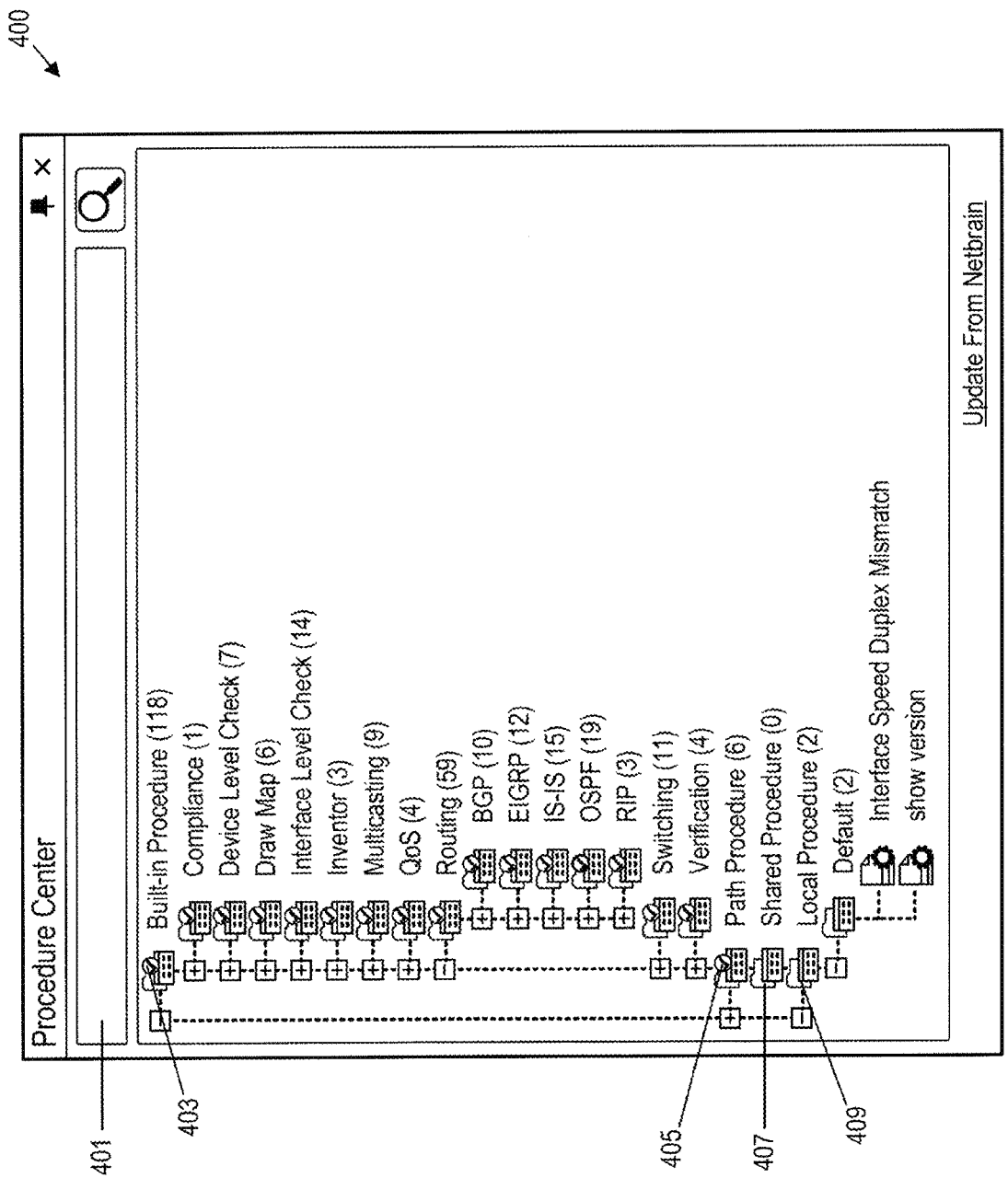
FIG. 4 shows an example GUI for managing various Executable Procedures, according to some embodiments of the present disclosure.

Executable Procedures can be organized by category. In one exemplary implementation, in reference to FIG. 4, a Procedure Center 400 is provided to manage the Procedures. Built-in Procedures for common use cases are provided under the built-in category 403, but a user-created Procedure can also be placed and managed here and shared through a common server. By sharing Executable Procedures inside an enterprise or across network professionals around the world, some common types of network problems can be quickly solved by running shared Executable Procedures. There may be provided other categories of Procedures, such as Path Procedure 405, Shared Procedure 407, and Local Procedure 409.

At the top of the Procedure Center, there may be provided a search box 401, where a keyword (for example, "eigrp") can be entered and the Procedures matching the keyword can be found.

For built-in Procedures, they may be categorized by the following usage cases: Compliance, Device Level Check, Draw Map, Interface Level Check, Inventory, Multicasting, QoS, Routing, Switching, and Verification. A category can also have subcategories. For example, the Routing category may have five subcategories: BGP, EIGRP, ISIS, OSPF, and RIP.

A Path Procedure may be a special type of Procedure used to discover the path between two end points. There may be provided with built-in Path Procedures and customized Path Procedures.

A Shared Procedure may be saved in a common database of the network management system and can be accessed by a client.

A Local Procedure may only be saved on a local disk and not shared with others.

Procedures may often be executed from within a network topology map. An exemplary common use case is as follows: a user creates a map for the network devices relevant to a network (e.g., the problem area of a troubleshooting task). The user may then execute one or more Procedures from within the map to gather data, analyze data, and identify possible causes.

Figure 5:
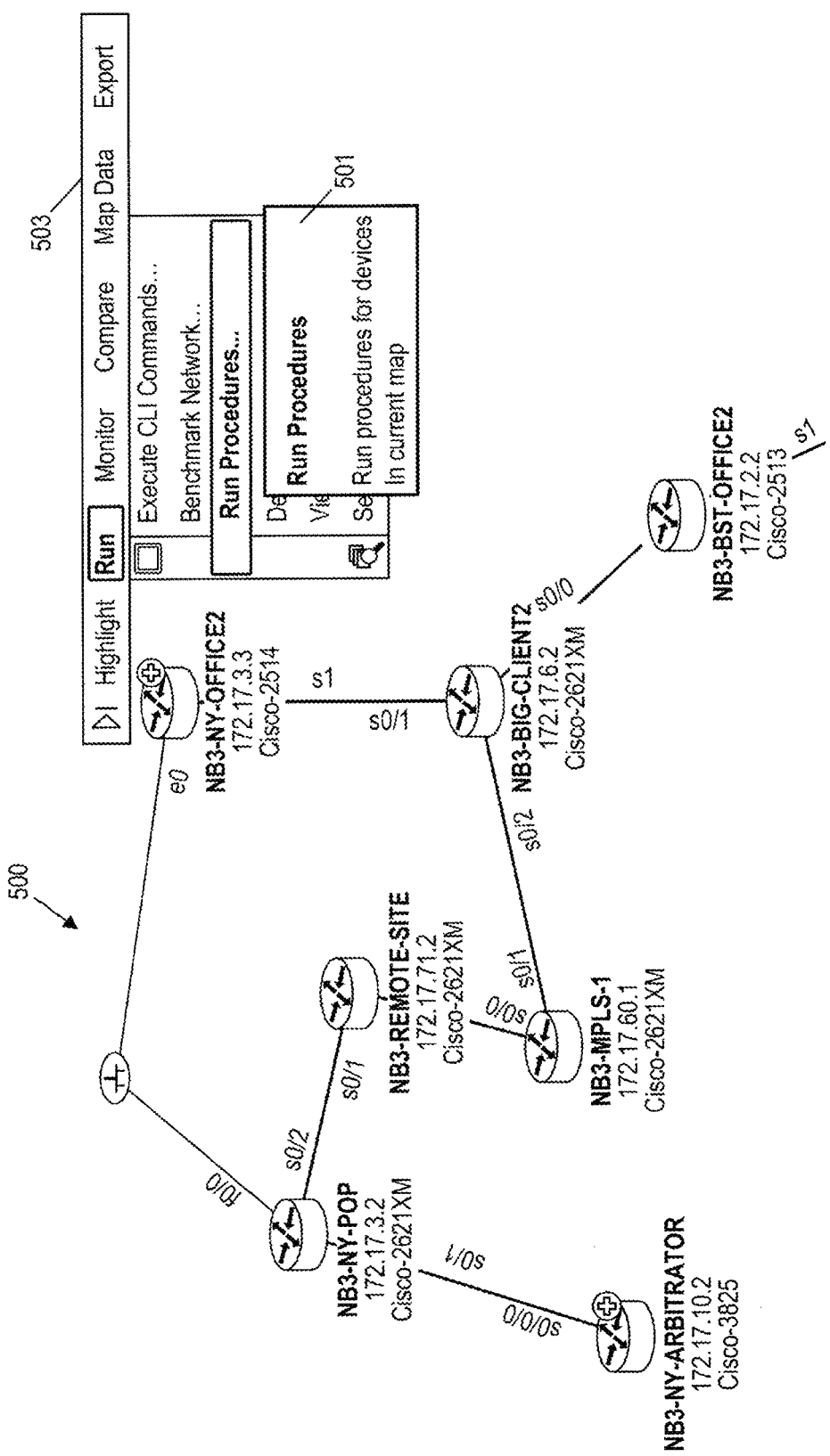
FIG. 5 shows an example method to run an Executable Procedure within a network device map, according to some embodiments of the present disclosure.
Figure 6:
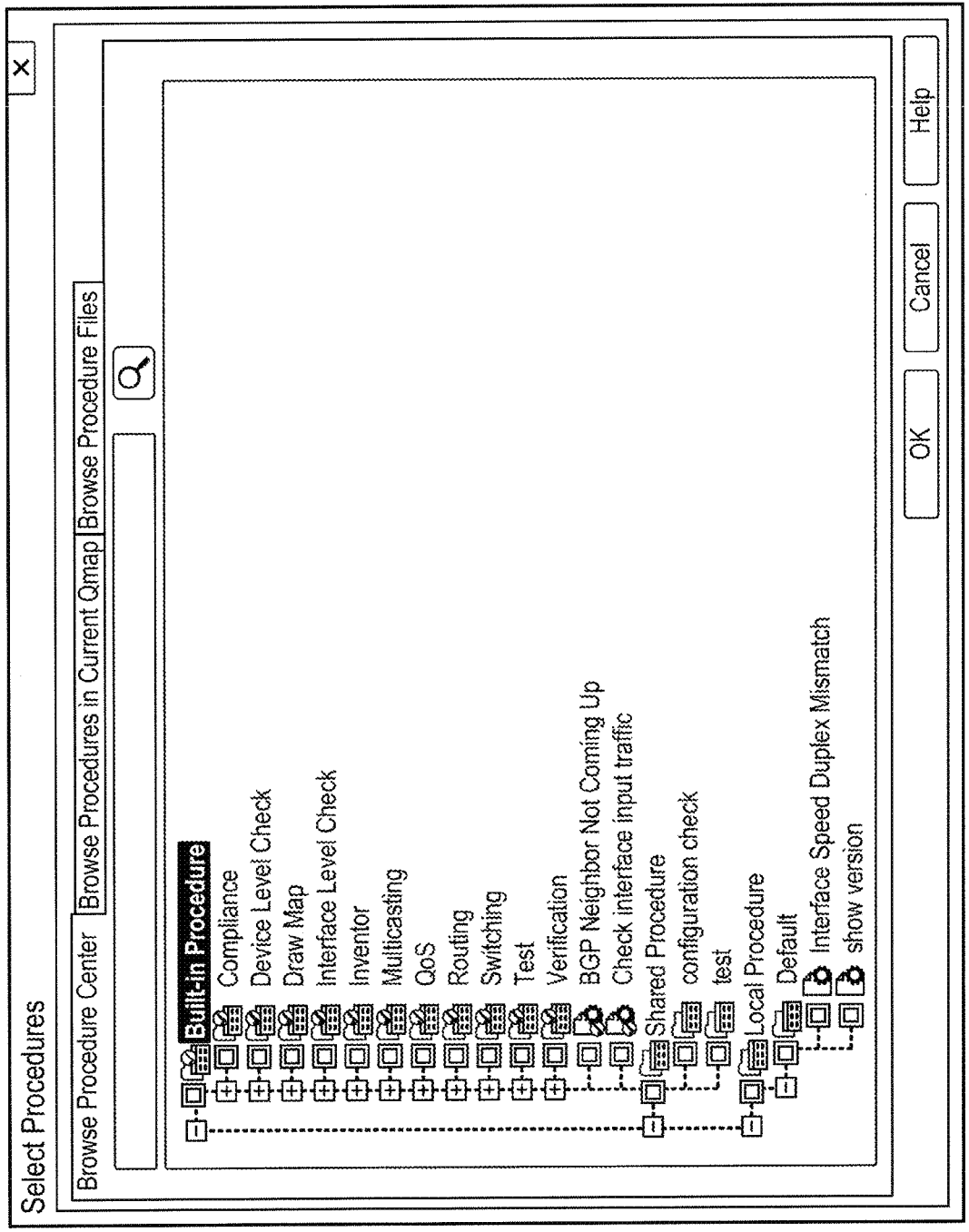
FIG. 6 shows an example GUI for selecting Procedures, according to some embodiments of the present disclosure.

FIG. 5 shows an exemplary method to run a Procedure within a map 500. A run procedure menu 501 may be added in a float menu 503 of the map. After a user clicks Run Procedure in menu 501, a window shown in FIG. 6 may be displayed for the user to select Procedures from the Procedure Center. The user can click the + sign in front of any category and select one or more Procedures in the Procedure Center to run the selected Procedure(s).

Figure 7:
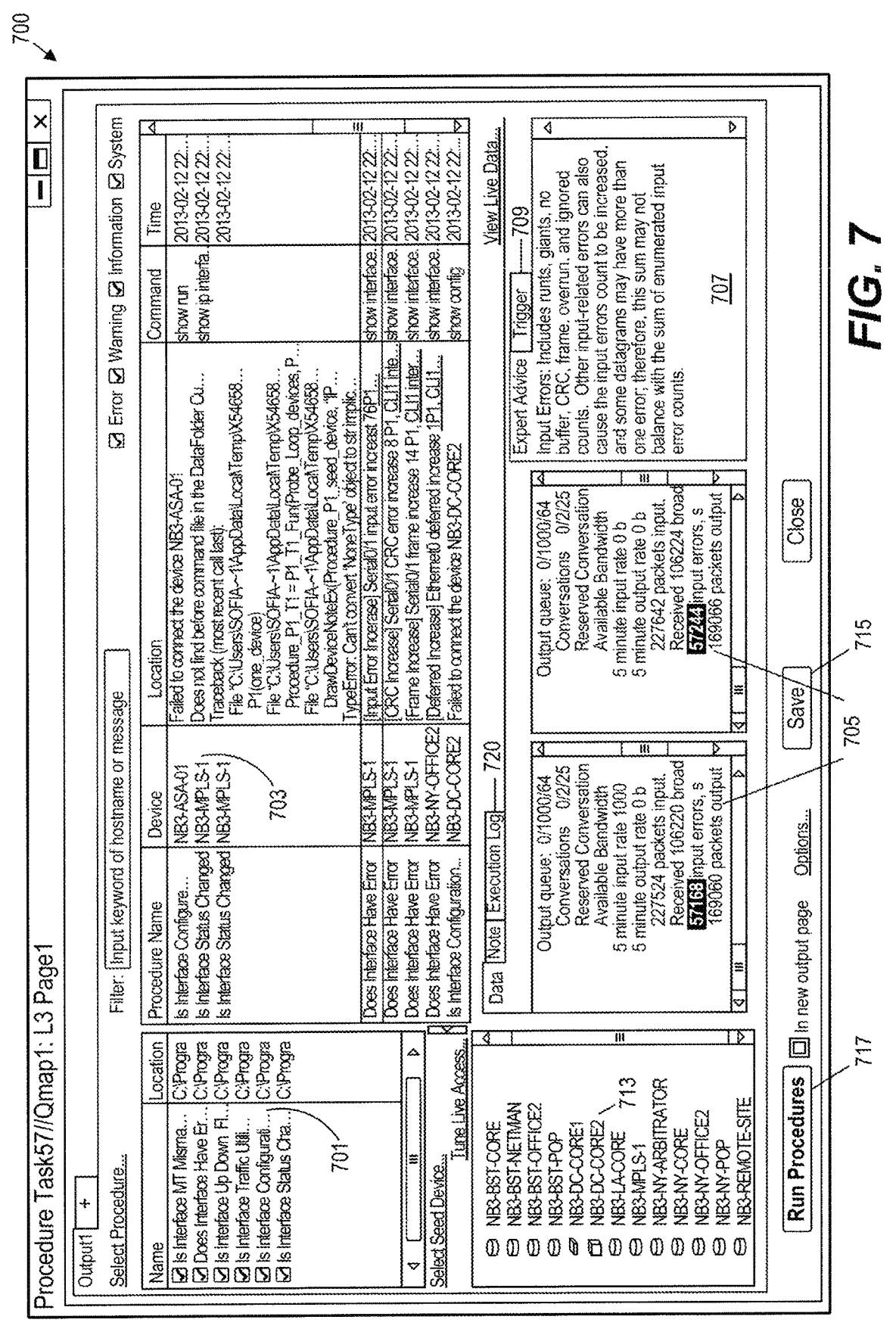

FIG. 7 shows a Procedure Task window 700 to display Procedure results. The Procedures are listed in Pane 701 and messages relevant to the Procedures are displayed in Pane 703. If a Procedure is selected in Pane 701, then only the messages relevant to the selected Procedure are displayed in Pane 703. A user can also select the type of messages to be displayed. For example, the user may check the Error checkbox and uncheck other checkboxes to only display error messages. Details of a selected message are displayed in Pane 705. The command output related to this message is also shown in Pane 705. Expert advice is shown in Pane 707 and a trigger to print out this message is shown in Pane 709. The execution log for the whole Procedure Task can also be displayed in Pane 705 when the tab Execution Log 720 is selected. The execution log displays the details of how the Procedures are executed.

The network devices on which the Procedures are executed are listed in Pane 713. A user can use the Select Seed Devices link to add more devices. Or, the user can remove one or more devices by right clicking on a device and selecting "Remove" from the menu.

A Procedure Task can be saved as a file by clicking a Save button 715. The saved Procedure Task can be opened for future examination or be sent to a peer for review. A Run Procedure button 717 allows a user to rerun the Procedure Task.

Figure 8:
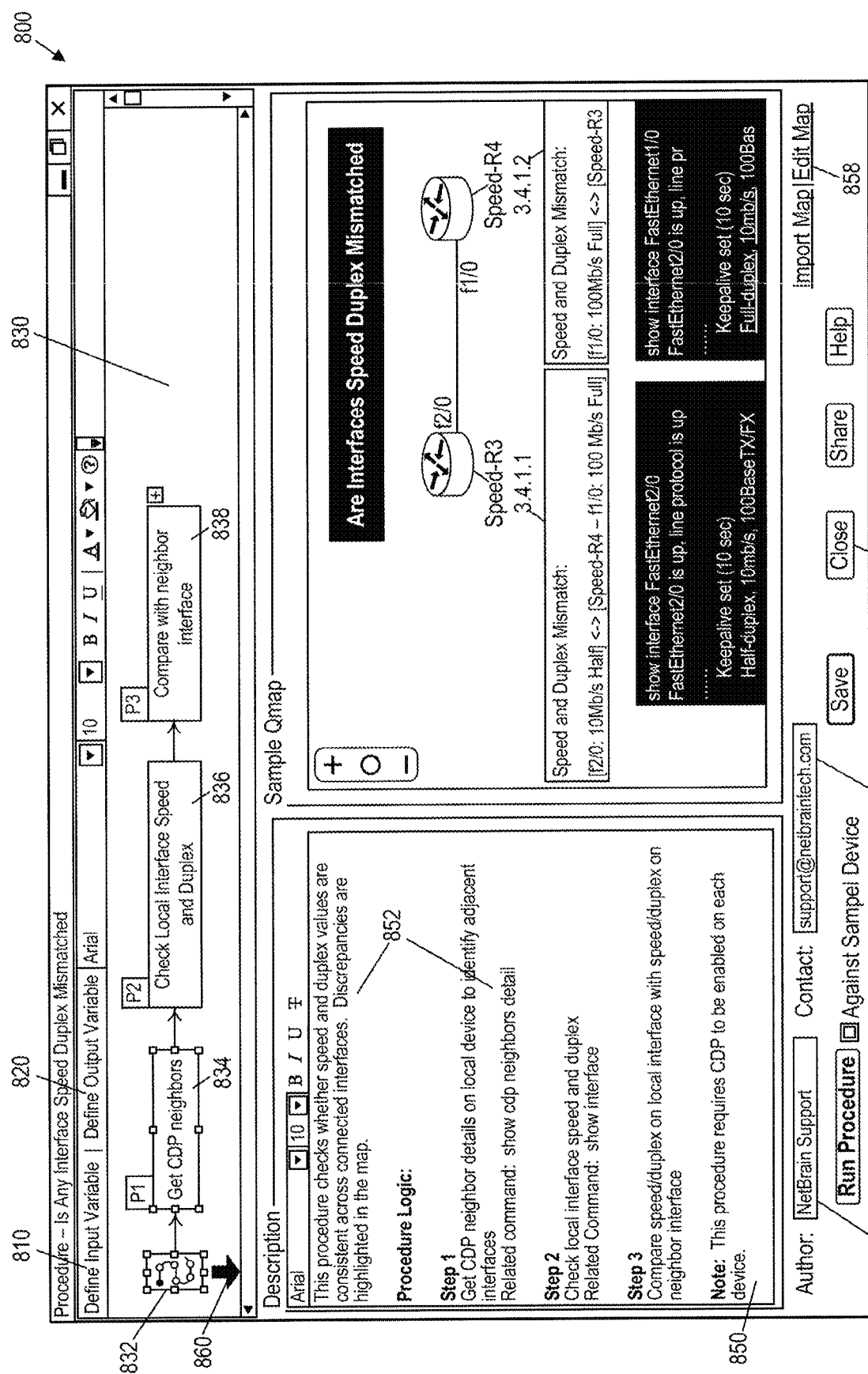
FIG. 8 shows an example Procedure having three Process Nodes, according to some embodiments of the present disclosure.

FIG. 8 shows a window 800 displaying an exemplary Executable Procedure. This example Procedure is used to check whether the speed or duplex of the neighbor interfaces are mismatched. Buttons 810 and 820 are used to define the global input and output variables of the Procedure, which will be described in greater detail later. The flow chart shown in the upper pane 830 describes the overall flow of the Procedure. The Procedure has a summary Node 832 and one or more Process Nodes. In this example, there are three Process Nodes 834, 836, and 838. The lower pane 850 shows the details of the current Node 832 (the Node with the arrow 860 under it). Clicking on another node may set that node as the current node.

In summary Node 832, a user can enter a description 852 to describe what the Procedure is for, author information 854, and contact information 856. An Import Sample Qmap link 858 can be used to import a map to illustrate the problems this Procedure is configured to solve.

In this example, description 852 provides the summary of the Procedure and steps to solve the problems:

---

This procedure checks whether speed and duplex values are consistent across connected interfaces. Discrepancies are highlighted in the map.
    Step 1
        Get CDP neighbor details on local device to identify adjacent interfaces
        Related command: show cdp neighbors detail
    Step 2
        Check local interface speed and duplex
        Related command: show interface
    Step 3
        Compare speed/duplex on local interface with speed/duplex on neighbor interface

---

Note:
This procedure requires CDP to be enabled on each device.

Without automation, it may take a few days to perform these steps. With the Executable Procedure Interface, three process nodes 834, 836 and 838 are created to execute corresponding steps 1, 2, and 3 in minutes.

After the Procedure is defined, the user may click a save button (not labeled) to save the Procedure and a close button 870 to close. The Procedure may be saved as a file with the specific file name extension, for example, .qapp (meaning "quick application").

Figure 9:
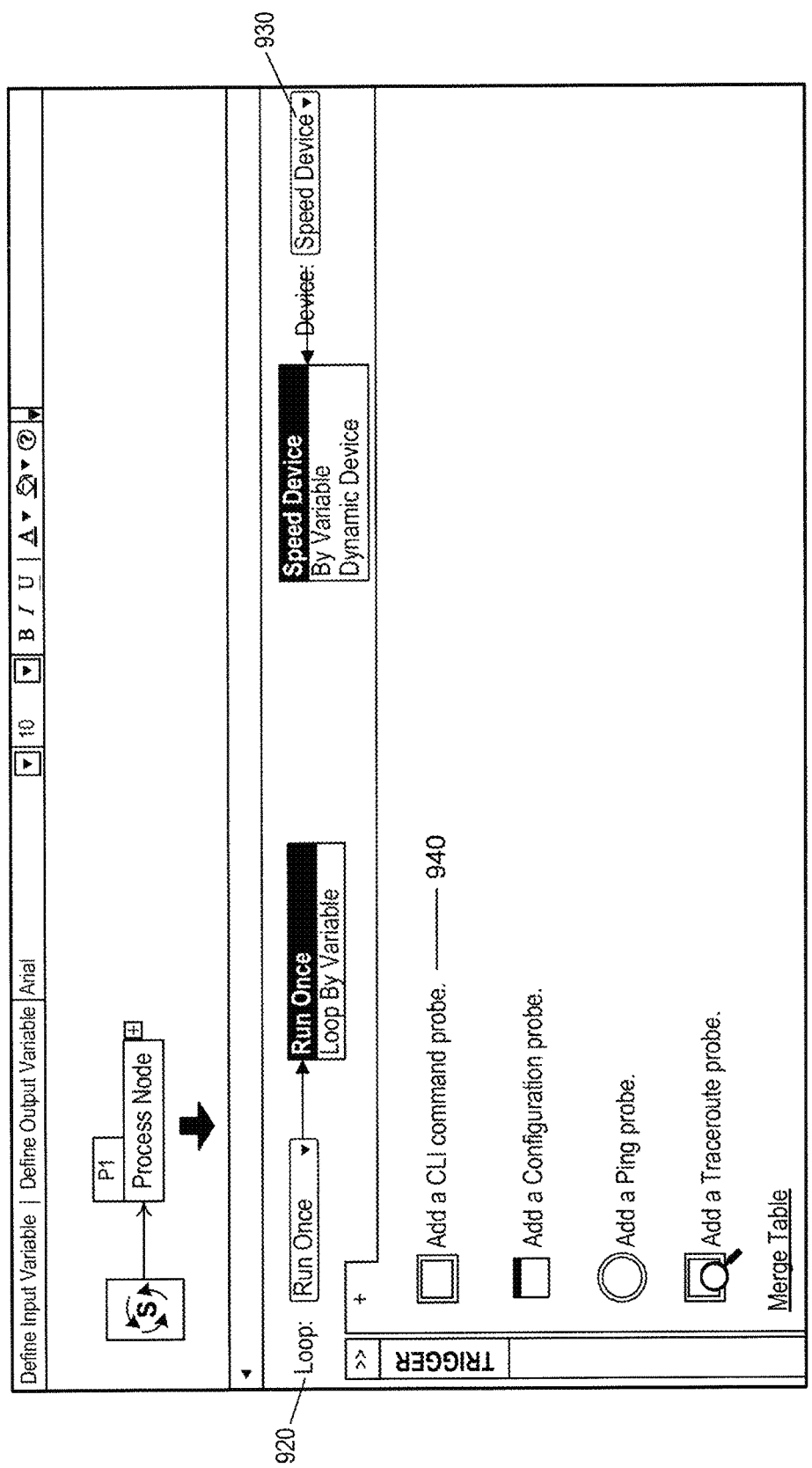
FIG. 9 shows an example GUI for defining a Process Node, according to some embodiments of the present disclosure.

FIG. 9 shows an exemplary method to define a Process Node. In some embodiments, two options may control how a Process Node is executed: Loop 920 and Devices 930. The Loop option defines the loop for the block of codes corresponding to the Process Node. The Devices option defines on which network device(s) the Node should be executed.

There may be two options for Loop 920: Run Once, indicating that the Node will only run once for each seed device, and Loop by Variable, indicating that the Node will run for each element of the variable.

There may be three options for Devices Option 930: Seed Device, By Variable, and Dynamic Device. Default option Seed Device indicates that the Node will run on one or more seed devices. The seed device(s) may be selected by the user while running the Procedure. Option By Variable indicates that the node will run on the devices defined by the variable. Option Dynamic Device is used to run the Procedure recursively until a certain condition is satisfied. The Dynamic Device option can be used to map out the topology from a seed device.

The user can select one of the four types of Probes. For example, by clicking "add a CLI command Probe" 940 to define the CLI command probe, a window 1000 is shown (FIG. 10).

Figure 10:
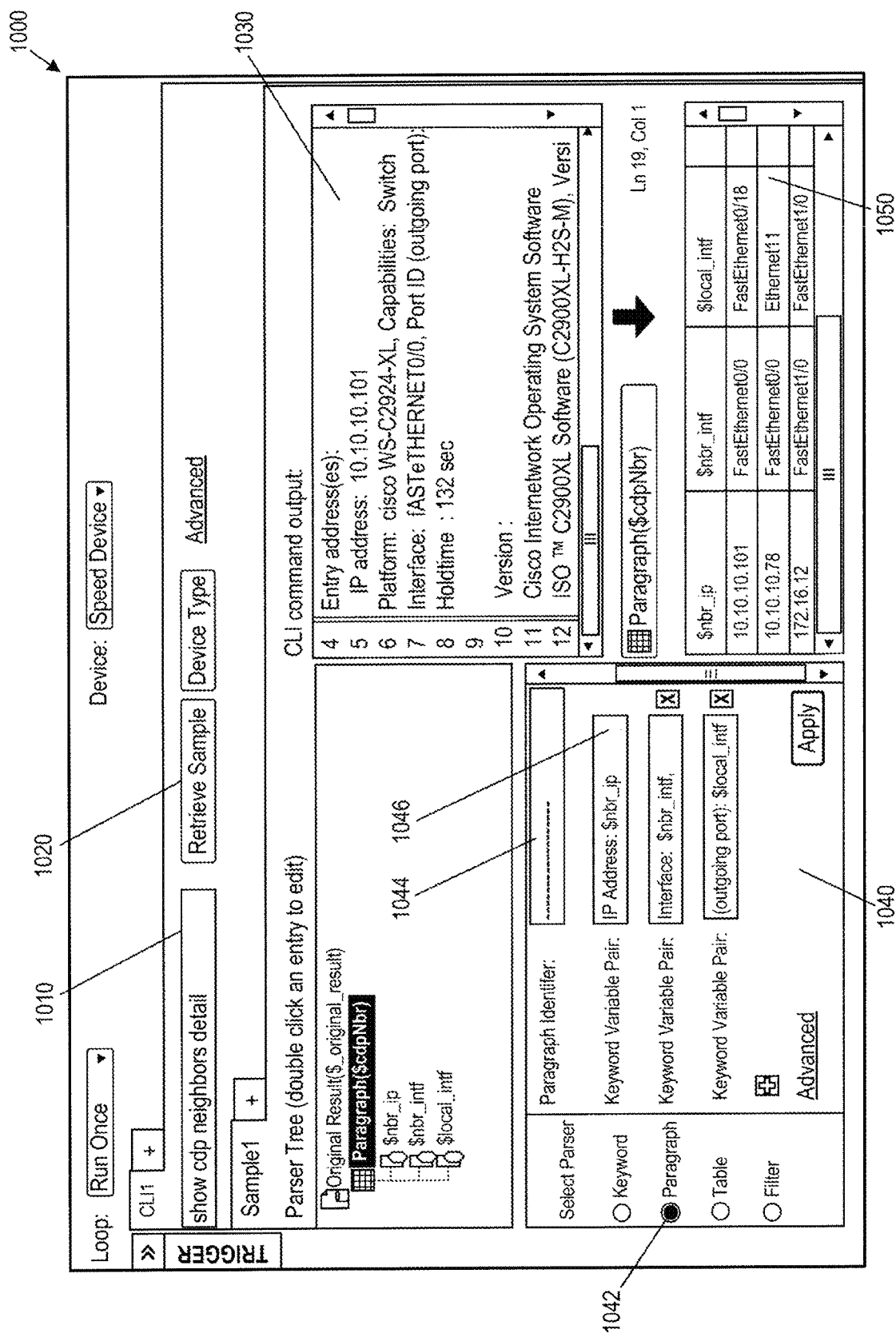
FIG. 10 shows an example GUI for defining a CLI command Probe, according to some embodiments of the present disclosure.

Referring to FIG. 10, a user may first enter the CLI command in field 1010. In this example, the CLI command, "show cdp neighbors detail," is used to retrieve the neighbor device and connected interfaces. The user may then retrieve a sample output to define a Parser. The user can click the Retrieve Sample button 1020 and select a device. The sample output may be shown in field 1030. The following is an exemplary sample output:

```
lablosSwitch3>show cdp neighbors detail
-------------------------
Device ID: 2900XL-1
Entry address(es):
  IP address: 192.168.1.210
Platform: cisco WS-C2924C-XL, Capabilities: Trans-Bridge Switch
Interface: FastEthernet0/3, Port ID (outgoing port): FastEthernet0/5
Holdtitne : 150 sec
Version :
Cisco Internetwork Operating System Software
IOS (tm) C2900x1 Software (C2900x1-C3H2S-M), Version 12.0(5)WC5,
RELEASE SOFTWARE (fc1)
Copyright (c) 1986-2002 by cisco Systems, Inc.
Compiled Tue 28-May-02 11:11 by devgoyal
advertisement version: 2
Protocol Hello: OUI=0x00000C, Protocol ID=0x0112; payload len=27,
value=
00000000FFFFFFFF010121FF000000000000005080703CC0FF0001
VTP Management Domain: "
Native VLAN: 1
Duplex: full
Management address(es):
-------------------------
Device ID: NY_POP
Entry address(es):
  IP address: 172.22.20.2
Platform: cisco 2500, Capabilities: Router
Interface: FastEthernet0/7, Port ID (outgoing port): Ethernet0
Holdtime : 160 sec
Version :
Cisco Internetwork Operating System Software
IOS (tm) 3000 Software (IGS-IN-L), Version 11.1(10), RELEASE
SOFTWARE
(fc1)
Copyright (c) 1986-1997 by cisco Systems, Inc.
Compiled Mon 10-Mar-97 15:53 by dschwart
advertisement version: 1
Management address(es):
```

Using the provided sample output, the user can define a set of Parsers in window 1040 for the Procedure to retrieve data from a running output. Depending on the format of the output, the user can select four types of Parsers: Keyword, Paragraph, Table, and Filter Parsers, as described above.

The sample output may include multiple neighbors. The output of each neighbor may have identical formatting. For this type of output, the Paragraph Parser 1042 may be selected to parse the data. The Paragraph Identifier 1044 is the keyword to identify the start of a new paragraph, in this sample the keyword is "- - -". For each paragraph the user can define the keyword/variable pair 1046 (Keyword Parser). The keyword is the string that stays the same and the variable is a value that can change. In this example, three keyword variable pairs may be defined:

```
IP Address: $nbr_ip
Interface: $nbr_intf,
(outgoing port): $local_intf
```

The matched values may be highlighted in the sample output and may also be shown in pane 1050.

Figure 11:
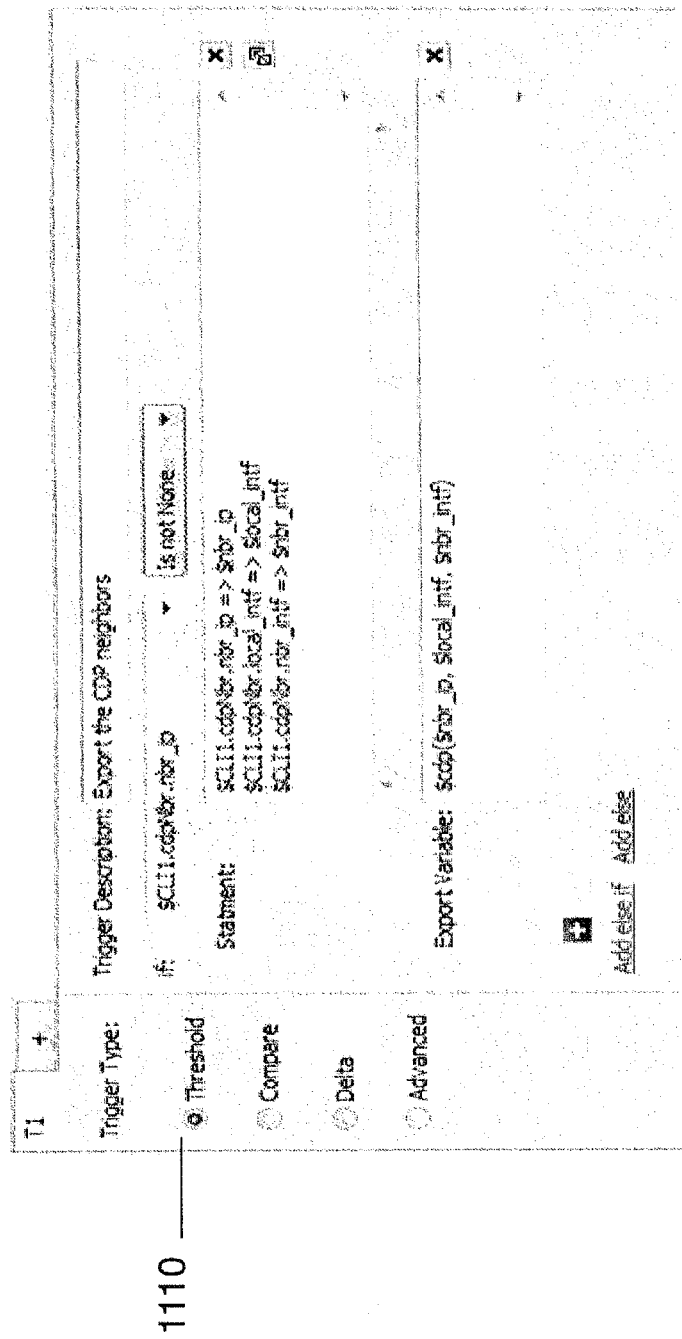
FIG. 11 shows an example GUI for defining a Trigger, according to some embodiments of the present disclosure.

FIG. 11 shows a window 1100 to define an exemplary Trigger. The exemplary Trigger 1110 is a Threshold Trigger that checks whether one of the variables defined in a Parser is "Not None." If so, the Threshold Trigger executes the statements shown in the Statement pane to assign variables and then exports these variables so that downstream process nodes can use the variables.

Figure 12:
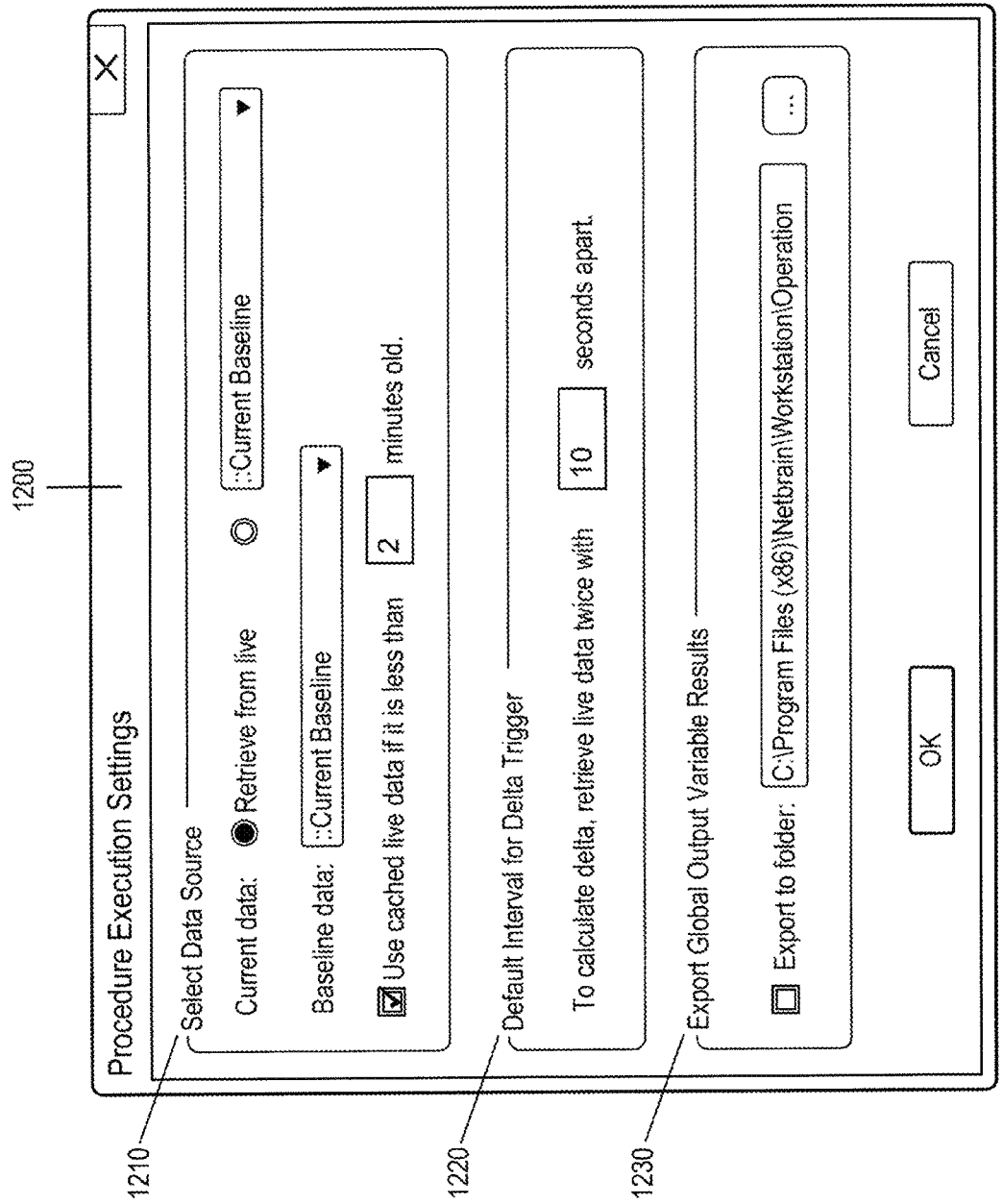
FIG. 12 shows an example GUI for defining parameters to execute a Procedure, according to some embodiments of the present disclosure.

FIG. 12 shows an exemplary GUI 1200 with settings to run a Procedure. Three types of settings are shown. The first type of setting is Data Source 1210. By default, a standard Procedure can retrieve data from a live network. However, a user can set the option to use cached data stored in a data folder. In a Trigger, the current data is compared with baseline data. By default, the current baseline serves as the baseline data. The user can also select another data folder for the baseline data. The second type of setting is Default Interval for Delta Trigger 1220. For a Delta Trigger, data will be retrieved twice, with the time interval value defined here. The third type of setting is Export Global Output Variable Results 1230. Checking the checkbox of this option allows exporting global output variables to a selected file directory.

A Procedure can have input variables and output variables, similar to an application. The input variables allow a Procedure to be executed in different environments without any modification.

Figure 13:
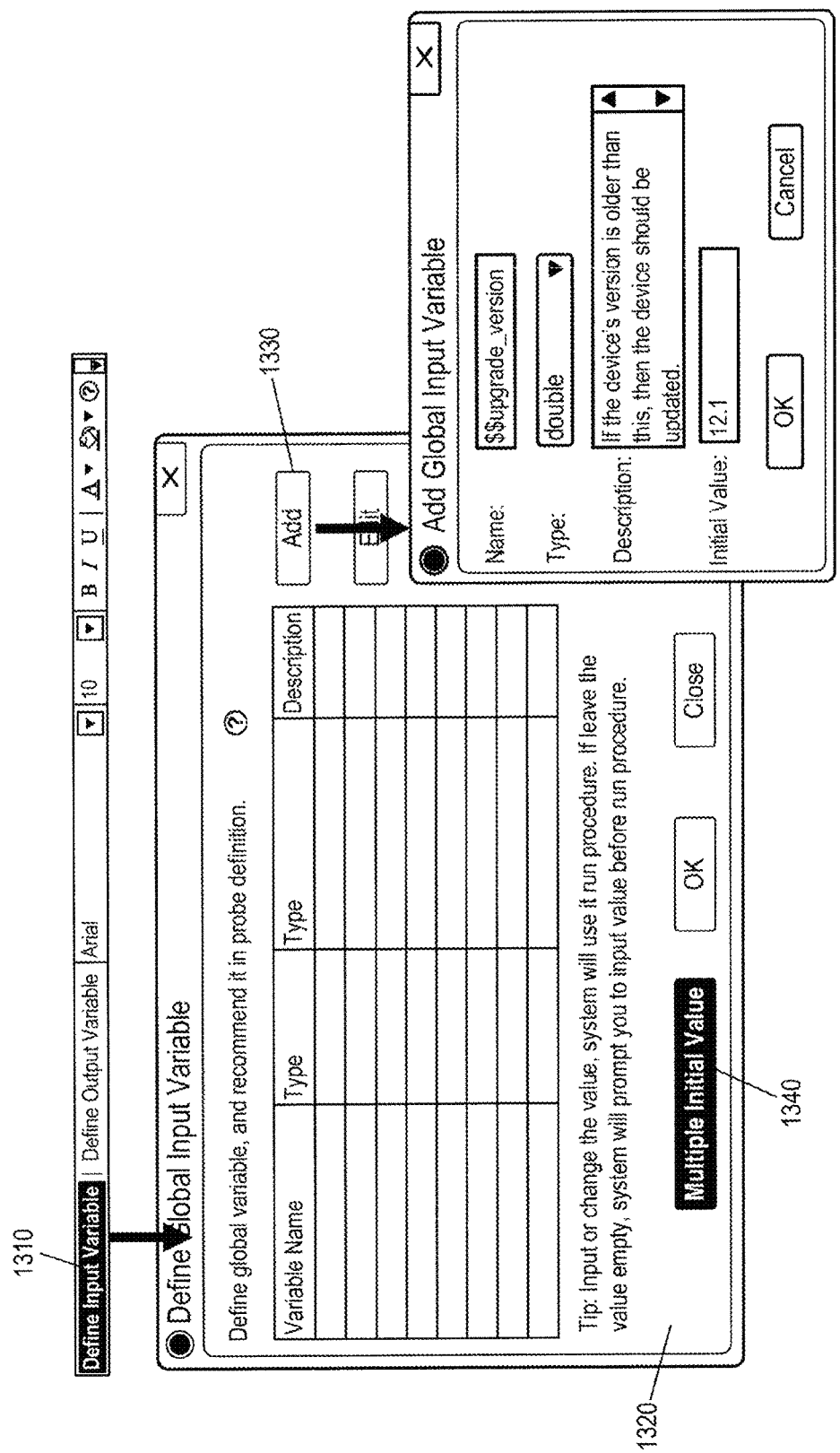
FIG. 13 shows an example GUI for defining input variables to execute a Procedure, according to some embodiments of the present disclosure.

FIG. 13 shows an exemplary method to define input variables for an Executable Procedure. To define a global input variable, a user may click the Define Input Variable button 1310 at the top of the Procedure window. In the Define Global Input Variable window 1320, the user may click the Add button 1330 to add the input variables. In the Add Global Input Variable window, the user may enter the variable name and select the type. In this example, the global variables start with $$ to differentiate from local variables of a process node. Other symbols may also be used. The Description is optional, but a meaningful description can make the Procedure easy to read and use. The Initial Value is also optional and can be set to the most frequently used values if possible. The user can click the Multiple Value link 1340 to set more than one value and system 100 may run the Procedure with each value. This can be convenient in some cases, for example, if the user creates a Procedure to map a multicasting source tree. The user can run this Procedure with the input variable set to multiple sources.

Figure 14:
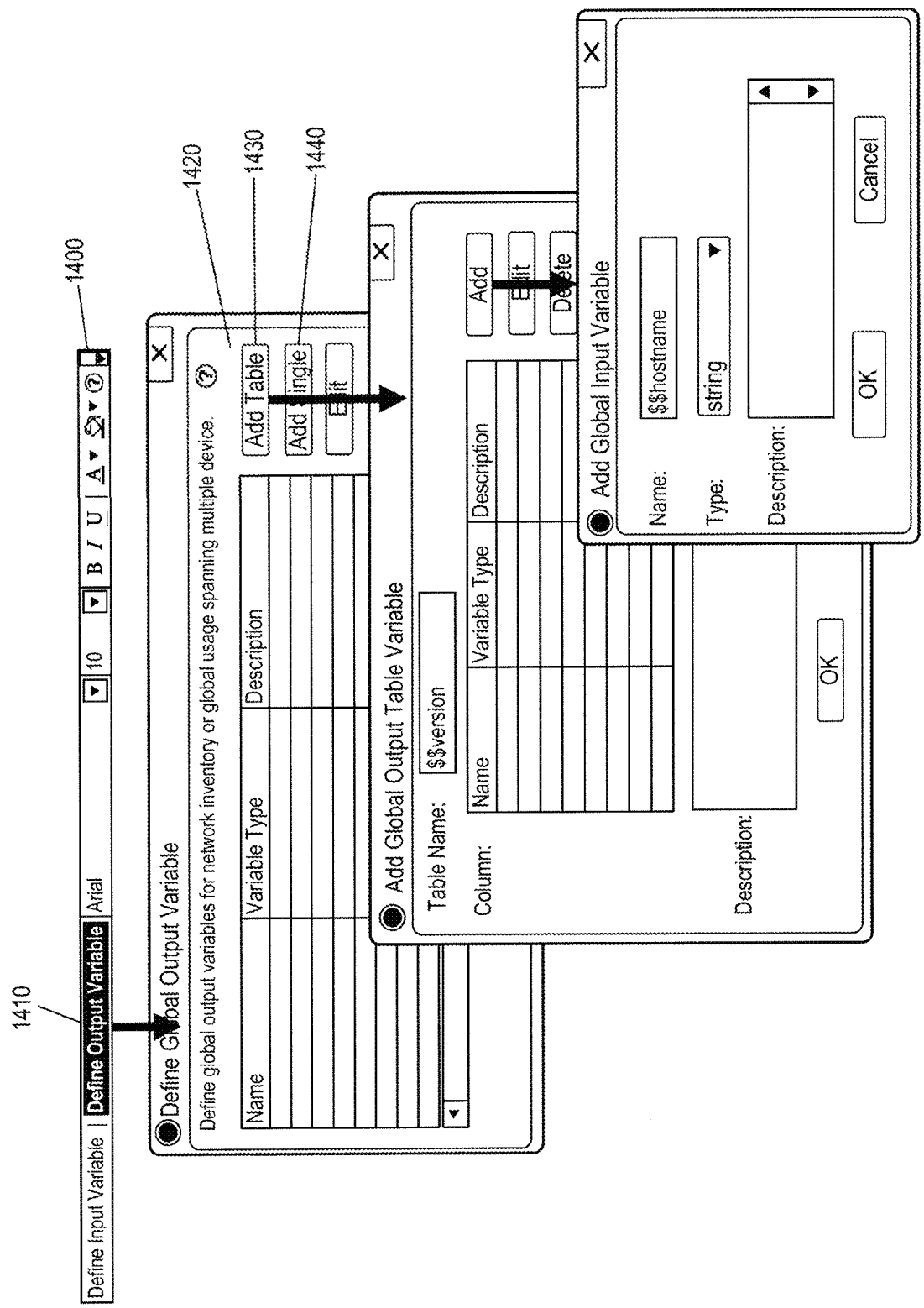
FIG. 14 shows an example GUI for defining output variables to execute a Procedure, according to some embodiments of the present disclosure.

FIG. 14 shows an exemplary method to define output variables. One purpose of using the global output variables is to create a report. For example, a user may want to create a report to include all devices and neighbor interfaces having duplex or speed mismatched.

To define output variables, the user may click the Define Output Variables button 1410 at the top of the Procedure window 1400. In the Define Global Output Variable window 1420, the user may click the Add Table button 1430 to add a variable table or the Add Single button 1440 to add a basic variable. Similar to the global input variable, the global output variable may start with $$. A table can have many columns and each column can have different types of variables.

Besides the CLI command probe, system 100 may also support Ping, Traceroute, and/or Configuration Probes.

Figure 15:
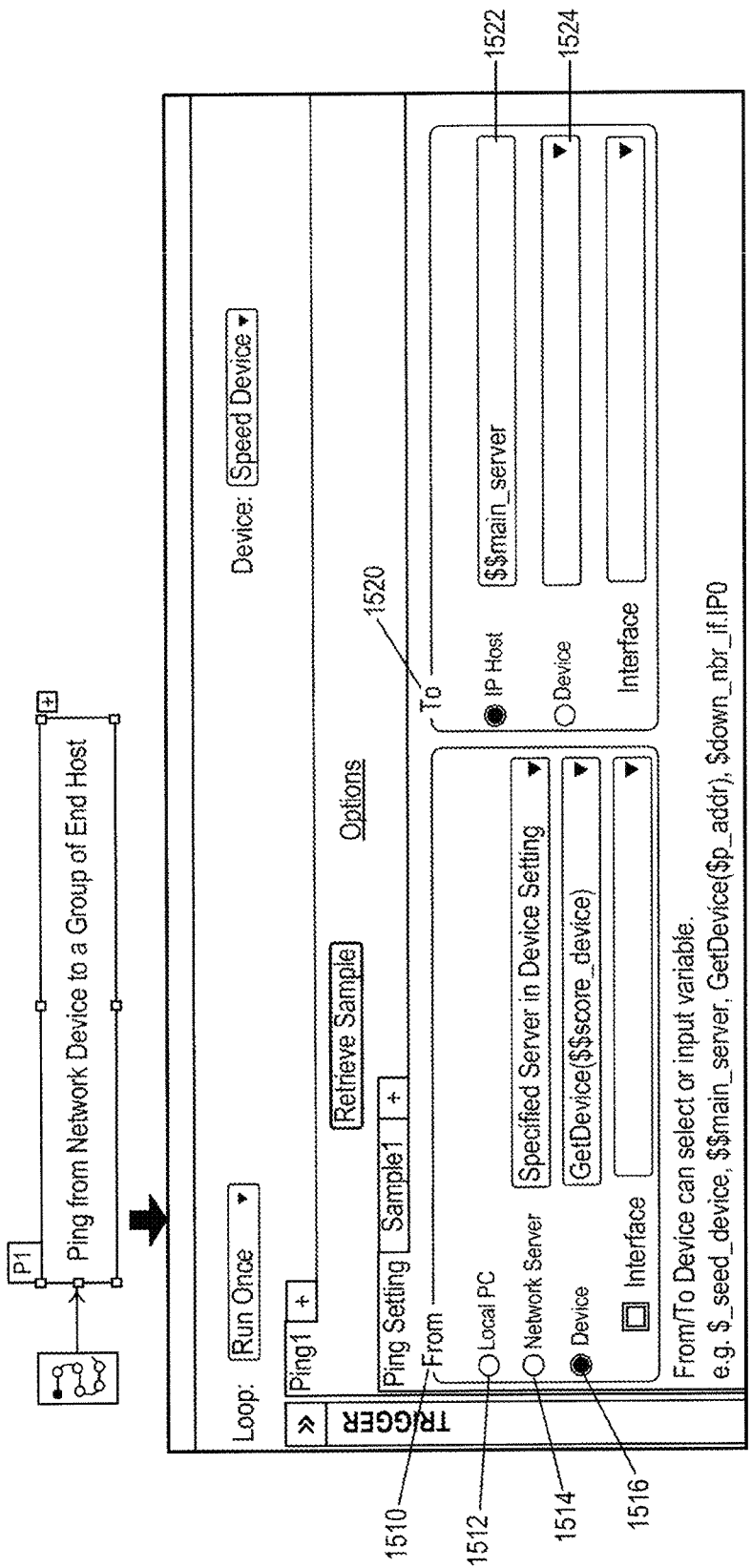
FIG. 15 shows an example GUI for defining a Ping Probe, according to some embodiments of the present disclosure.

FIG. 15 shows an exemplary method to define a Ping Probe. To define a Ping Probe, a user needs to define a source 1510 (the device to ping from) and a destination 1520 (the IP to ping to). For source 1510, the user may have three options: local PC 1512; network server 1514, which is a specified server used to work as a proxy to the live network; or selected devices 1516, where the user can define a list of core devices as the input variables and let system 100 to ping from these devices.

For destination 1520, the user can either enter the IP address 1522 to ping from or select a device 1524 and then an interface on the device. In the example shown here, the IP Host option is checked and the input variable is entered, which defines the IP address to ping to.

Figure 16:
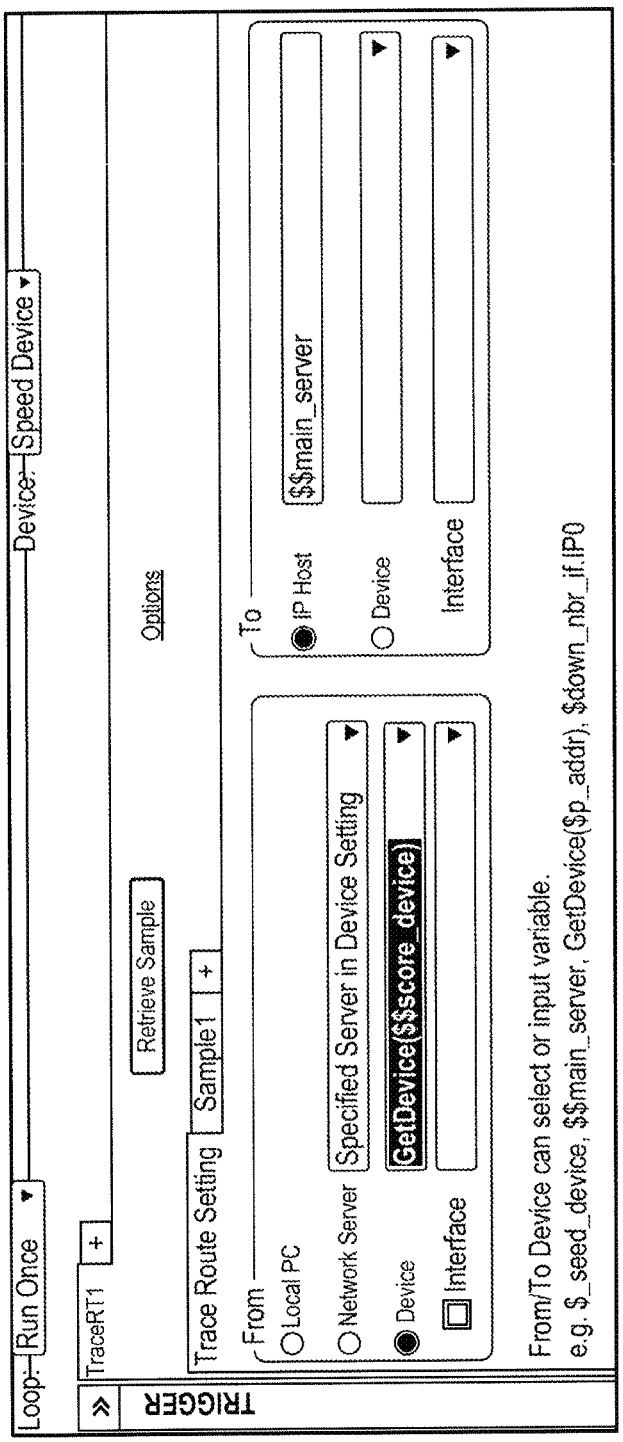
FIG. 16 shows an example GUI for defining a Traceroute Probe, according to some embodiments of the present disclosure.

FIG. 16 shows an exemplary method to define a Traceroute Probe. The process of defining a Traceroute Probe is similar to that of a Ping Probe. Ping and Traceroute Probes can be defined to run from a list of core network devices to a list of main servers after a network change. This automation can be much quicker and more reliable compared to a manual process.

A Configuration Probe is configured to parse and highlight configurations. For example, the Configuration Probes can be used in the following cases: 1) Create a report for devices containing a particular configuration line. For example, find devices with "no service password-encryption" configuration, which violates basic security policies. 2) Highlight or draw a particular configuration in a Q-map. 3) Conduct a preliminary check before applying an additional Procedure. This can improve the performance of the Procedure since the Configuration Probe uses baseline configurations without retrieving data from devices. For example, a user can check whether OSPF is configured to run on a router before applying any Procedure to troubleshoot OSPF routing issues.

Figure 17:
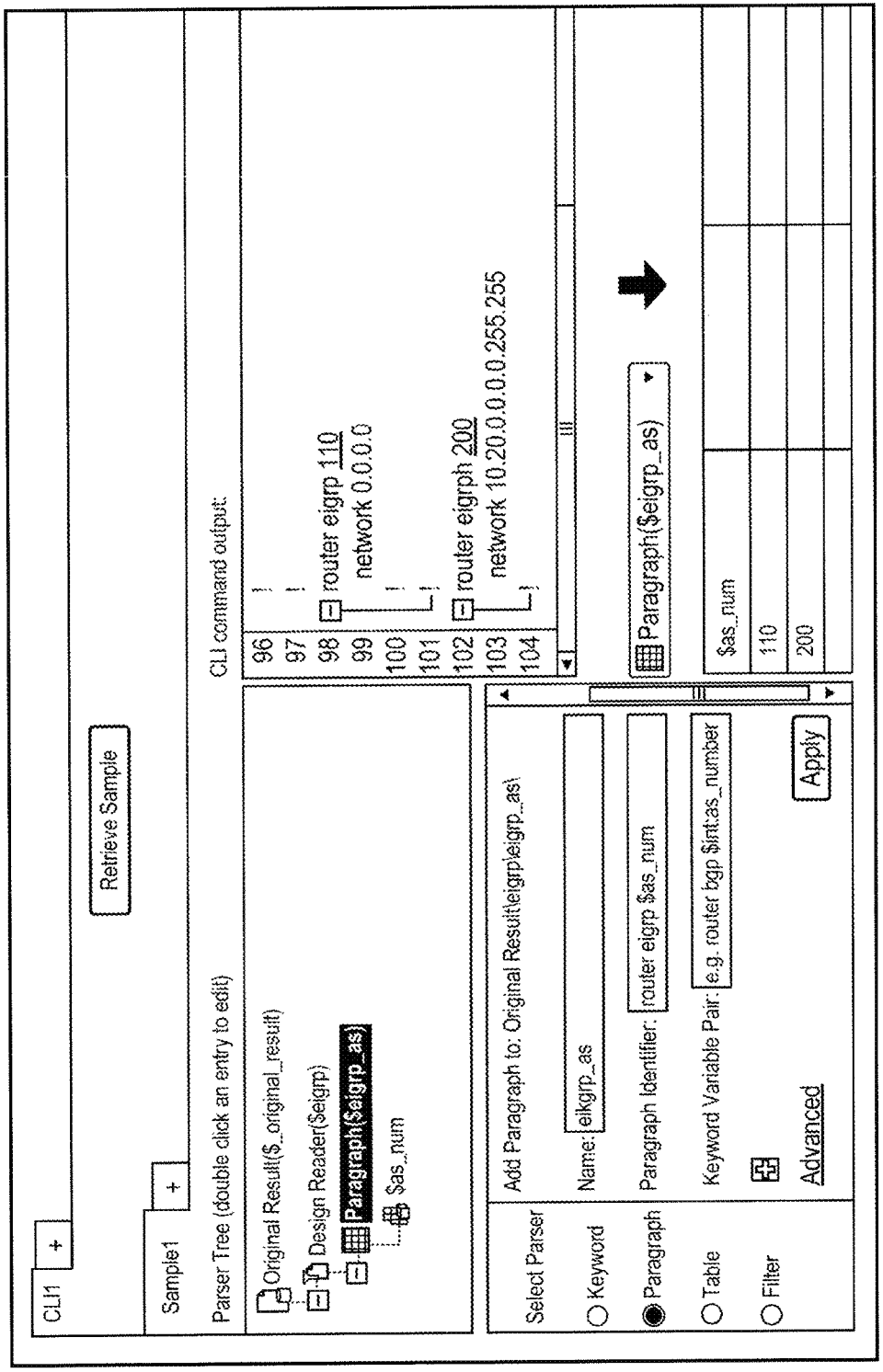
FIG. 17 shows an example GUI for configuring a Probe Parser, according to some embodiments of the present disclosure.

FIG. 17 shows an exemplary method to define a Configuration Probe. In FIG. 17, the Parser and Trigger of a Configuration Probe are the same as those of the CLI command Probe. The differences may be that the Configuration Probe works on configurations and therefore there is no need to define a CLI command to retrieve data.

Figure 18:
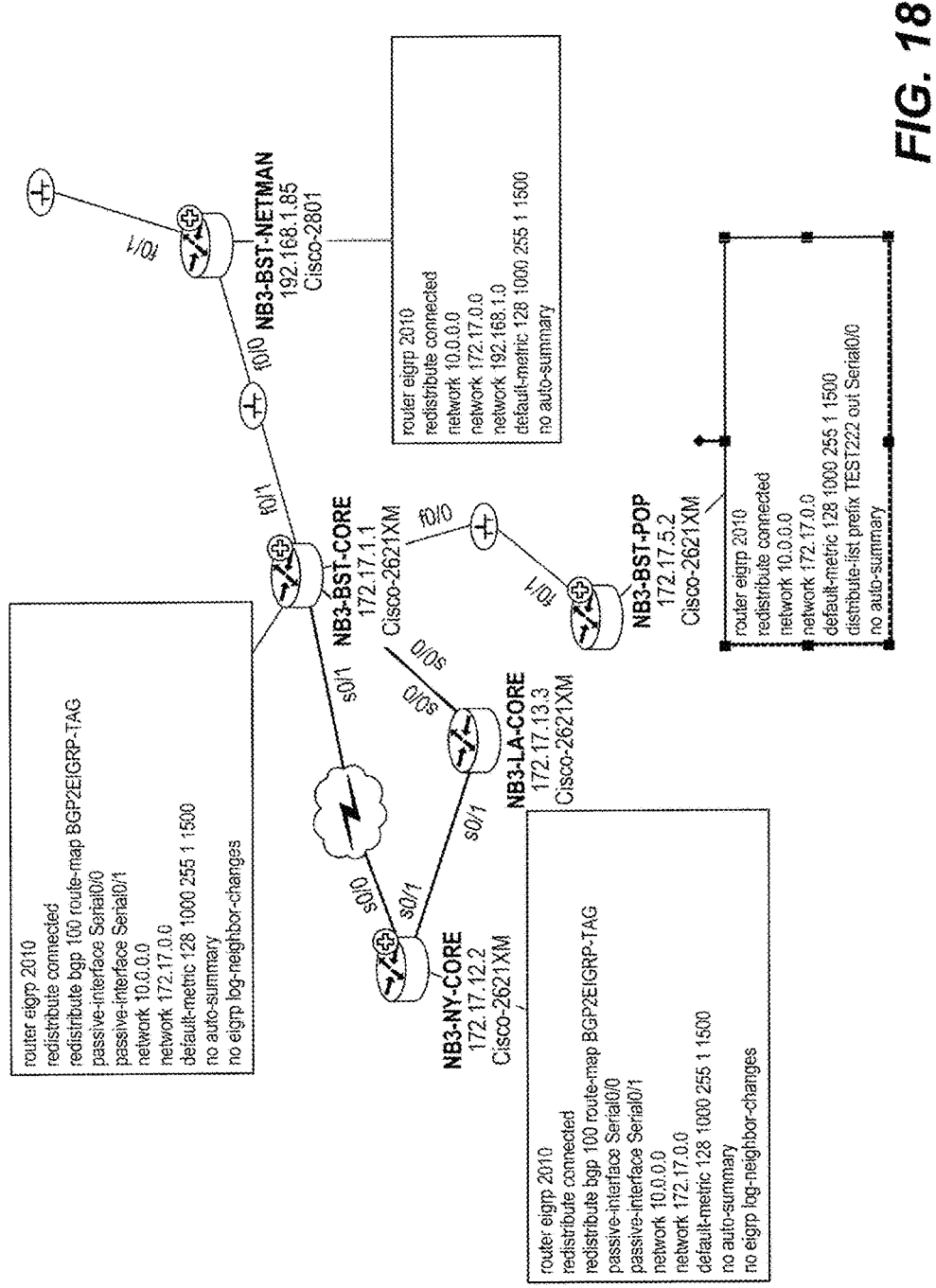
FIG. 18 shows an example network map created by using a Procedure, according to some embodiments of the present disclosure.

FIG. 18 shows an exemplary network map created using a Procedure.

Embodiments consistent with the present disclosure involve system and method for automating network management tasks. Network management tasks may include network performance monitoring, network troubleshooting, network architecture mapping, or other tasks. Automating network management tasks may be accomplished using one or more network management applications. For convenience of description, a network management application is also referred to as a Qapp, although such an application can have any name.

In some embodiments, a Qapp may include one or more procedures. The one or more procedures may be used to retrieve information from a network (e.g., a live computer network). The Qapp may also include an analysis routine to define, for example, how to display the information retrieved using the procedures. The analysis routine may also analyze the retrieved information and create one or more alerts based on the analysis. The alerts may include textual alert messages and graphical alerts. The graphical alerts may include visual effects made to a map of the network. For example, one or more portions of the map relevant to the retrieved information may be highlighted and/or displayed in different colors.

In some embodiments, a Qapp may be created using a GUI. Creating a Qapp may include two steps: the first step involves defining one or more procedures to retrieve data from the network; the second step involves defining an analysis routine for analyzing the retrieved data and displaying the data.

A Qapp may be saved and shared among network professionals. Executing a Qapp may automate network management tasks such as troubleshooting and performance monitoring. For example, executing an Qapp can perform the followings tasks automatically: Describe a network problem or best practice; Recursively execute one or more network commands, obtain data from a network based on the execution of the network command(s), and display the data on a map of the network; Analyze the data obtained from the network; Create an alert (e.g., an alert message and/or a graphical alert) when a certain condition is satisfied, such as when a threshold value is crossed; and Create and save a historical chart based on the analysis of the data for playback and/or future analysis.

Figure 19:
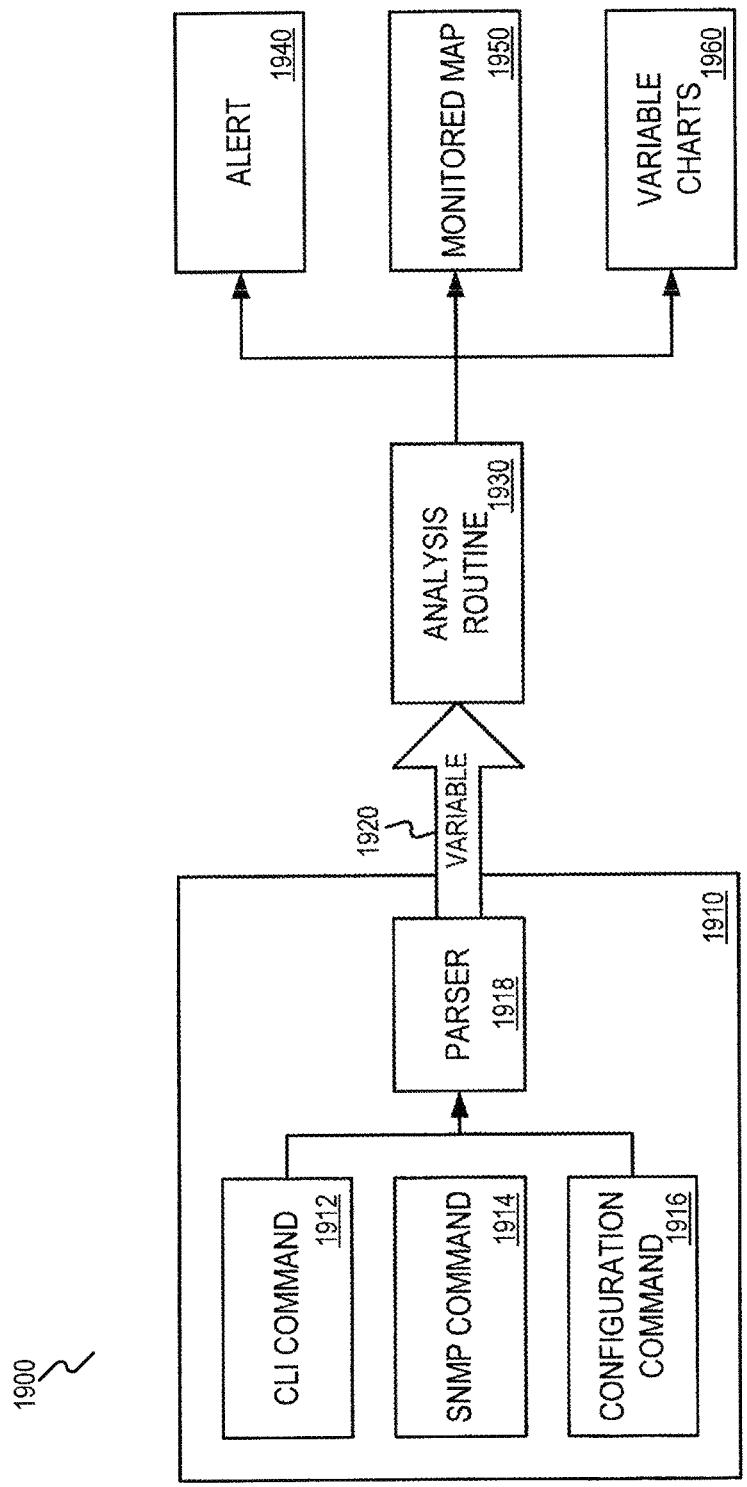
FIG. 19 is a block diagram illustrating example components of a network management application (Qapp), according to some embodiments of the present disclosure.

FIG. 19 is a block diagram illustrating exemplary components of a Qapp 1900. Qapp 1900 may include an executable procedure 1910 and an analysis routine 1930. Procedure 1910 can be created via a GUI, such as GUI 105, to receive from a user a network command to be executed on a computer network. The network command may include one or more CLI commands 1912, one or more simple network management protocol (SNMP) commands 1914, and/or one or more configuration commands 1916. The results of the execution of the network command may be parsed by a parser 1918 to retrieve useful information. For example, when the results include a network parameter indicating network operating status, the network parameter may be identified and stored in a variable 1920. Variable 1920 may be used to transfer information retrieved from the computer network to an analysis routine 1930 for further analysis. Analysis routine 1930 may include analytical logics operating on variable 1920 to generate analysis results, such as an alert 1940, a monitored map 1950, and/or a variable chart 1960.

Figure 20:
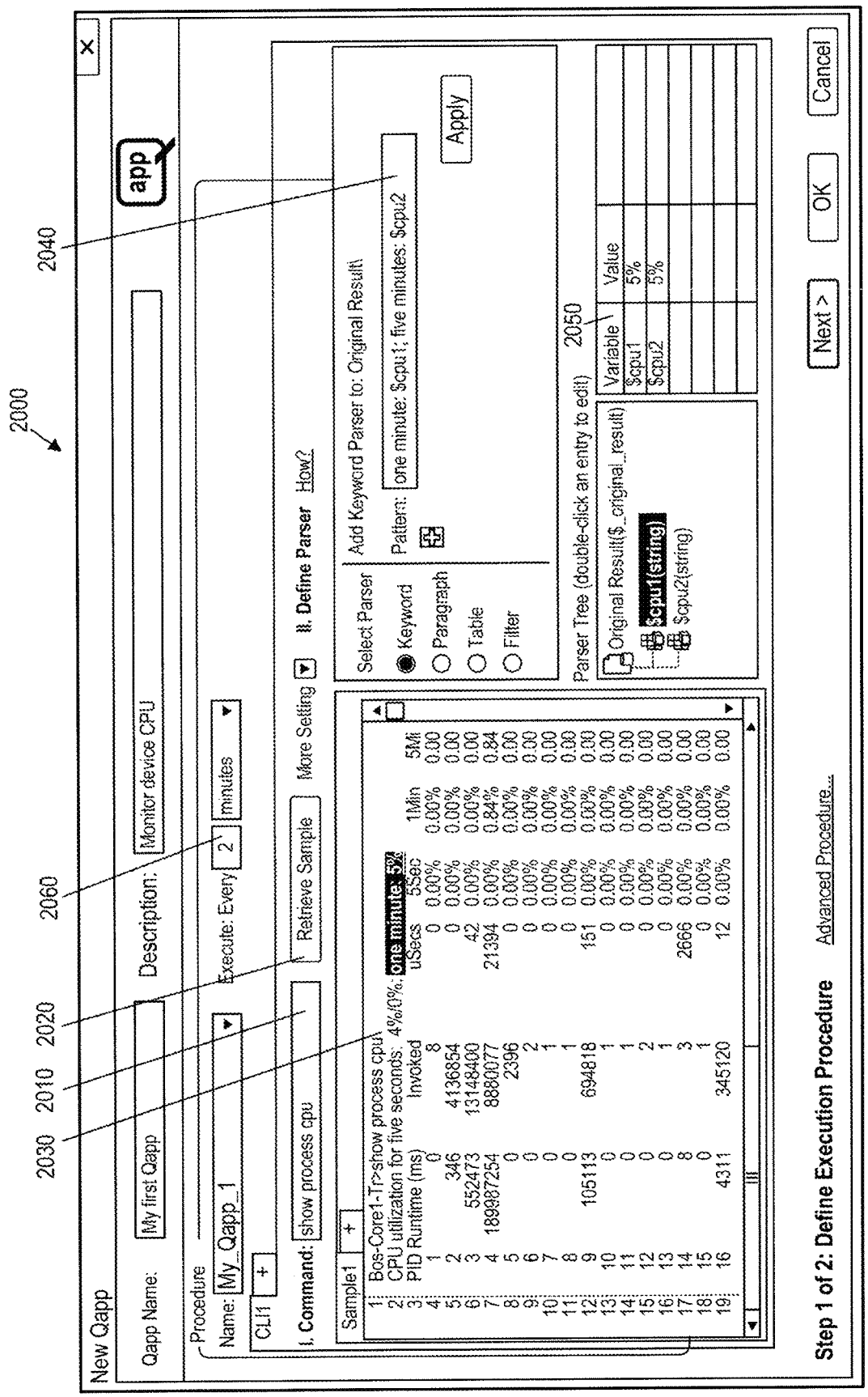
FIG. 20 shows an exemplary GUI to define an example procedure of a Qapp, according to some embodiments of the present disclosure.

FIG. 20 shows an exemplary GUI 2000 for defining an exemplary procedure of a Qapp. GUI 2000 includes an input box 2010 for receiving a network command, such as a CLI command, to be executed on a computer network. A user can input a network command, such as "show process cpu" shown in FIG. 20, to obtain a result from the computer network (e.g., from a network device) by, for example, clicking a button 2020 to execute the network command. Pane 2030 shows the result, which includes information about CPU utilization. Based on the result, a user may define a parser, such as a keyword parser shown in FIG. 20, to retrieve information associated with a network parameter based on the result. For example, in the example shown in FIG. 20, the parser is defined by a pattern in input box 2040, which includes a first variable $cpu1 to store information associated with a first network parameter (e.g., CPU utilization information for one minute) and a second variable $cpu2 to store information associated with a second network parameter (e.g., CPU utilization information for five minutes). Once the parser is defined, the values of these variables can be viewed in pane 2050.

Defining a Qapp parser is similar to defining a procedure parser. However, one difference between these two types of parsers is that the network command used in a Qapp can be executed recursively. Accordingly, the Qapp parser may retrieve information from the recursively obtained result (e.g., obtained in response to the recursive execution of the network command) and recursively update the variable storing the retrieved information. In some embodiments, the frequency for recursively updating the variable (also the frequency to recursively execute the network command) may be defined in an input field 2060 through GUI 2000. For example, FIG. 20 shows an exemplary frequency of 2 minutes.

The value of a network parameter, such as CPU utilization, may be retrieved by the parser (shown in input box 2040) and saved in variable $cpu1 or $cpu2 each time the network command (shown in input box 2010) is executed. The settings and configurations of a Qapp, such as the network command to be executed, the parser used to retrieve information, and an analysis routine (to be described in greater detail later), can be packaged together and saved as an executable network management application (Qapp) for future use or for sharing with others. When the saved Qapp is executed, the network instruction (e.g., the CLI command shown in input box 2010) can be executed recursively (e.g., at a frequency defined in input box 2060). Each time the network instruction is executed, a result can be obtained, similar to the result shown in pane 2030 of FIG. 20, except that the value of the CPU utilization may be changed. The parser defined using the pattern shown in input box 2040 can retrieve the relevant information (e.g., the values of CPU utilization) based on the result and store the retrieved information in variables $cpu1 and $cpu2. In this way, the values of these variables can be updated/stored periodically. A historical chart of the CPU utilization (e.g., CPU utilization as a function of time) can be generated using the data stored in variable $cpu1/$cpu2 and displayed to the user. Because the values of these variables indicate network parameters of the computer network being managed, the historical chart can be of a great help to network performance monitoring or troubleshooting.

Figure 21:
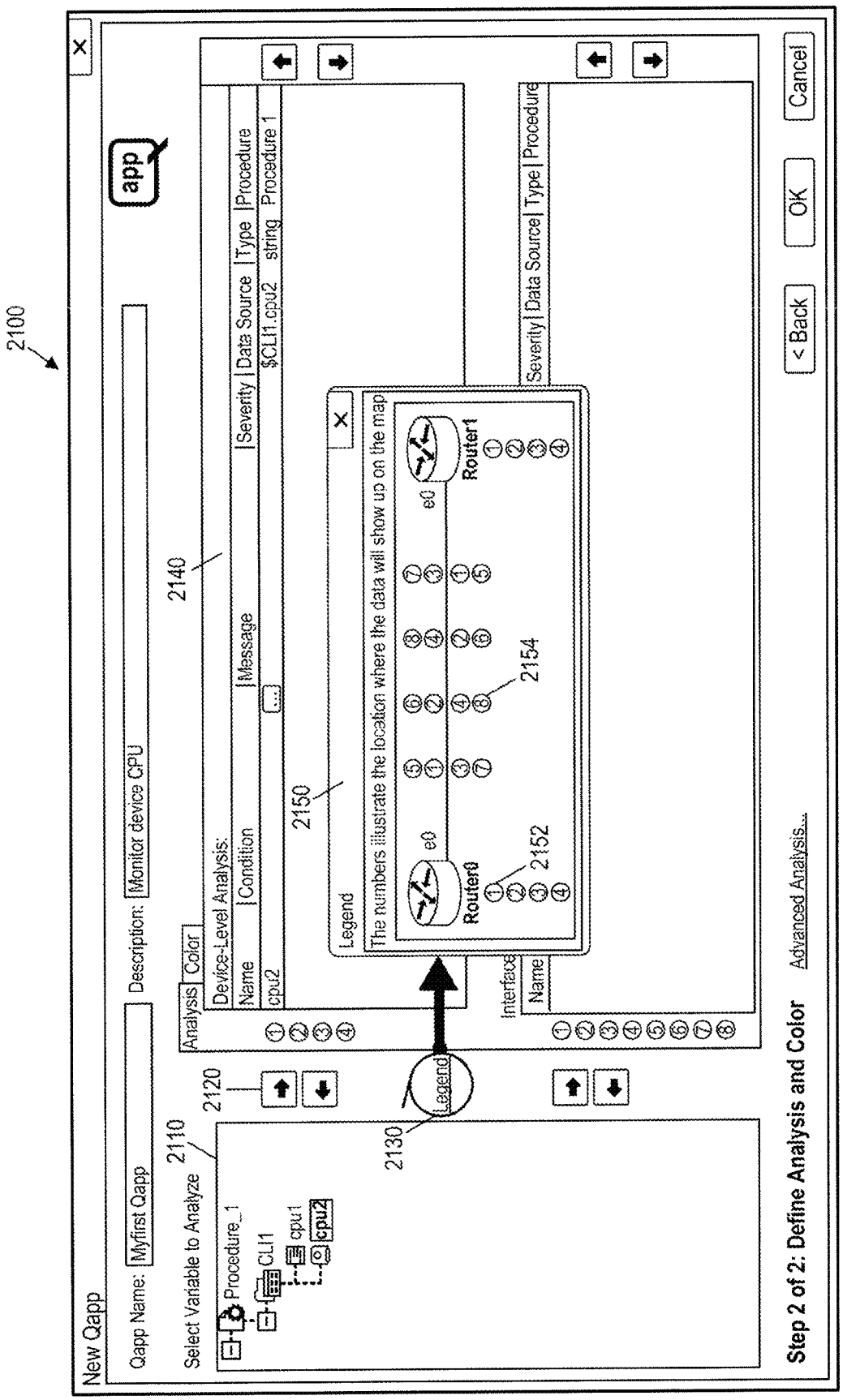
FIG. 21 shows an exemplary GUI to define an example analysis routine of a Qapp, according to some embodiments of the present disclosure.

FIG. 21 shows an exemplary GUI 2100 for defining an exemplary analysis routine of a Qapp. As shown in FIG. 21, variables defined using GUI 2000 (e.g., cpu1 and cpu2) can be displayed in pane 2110 of GUI 2100. The user can select any variable such as cpu1 and click an arrow icon 2120 to add the variable to an analysis tab 2140. Variables added to analysis tab 2140 may be displayed in a network map and/or subject to further analysis. Variables may include device-level variables (or device variables) and interface-level variables (or interface variables). Device variables refer to information relating to network devices, such as CPU utilization shown in FIGS. 20 and 21. Interface variables refer to information relating to network connections, such as cable interfaces, wireless interfaces, etc. As shown in FIG. 21, analysis tab 2140 includes separate areas for device variables and interface variables. A Legend link 2130 can show location information for displaying one or more variables and/or alerts on a network map. For example, in a pop-up window 2150, device variables 2152 are to be displayed under their corresponding devices (e.g., Router0 or Router1), while interface variables 2154 are to be displayed along the connection path between the devices.

Figure 22:
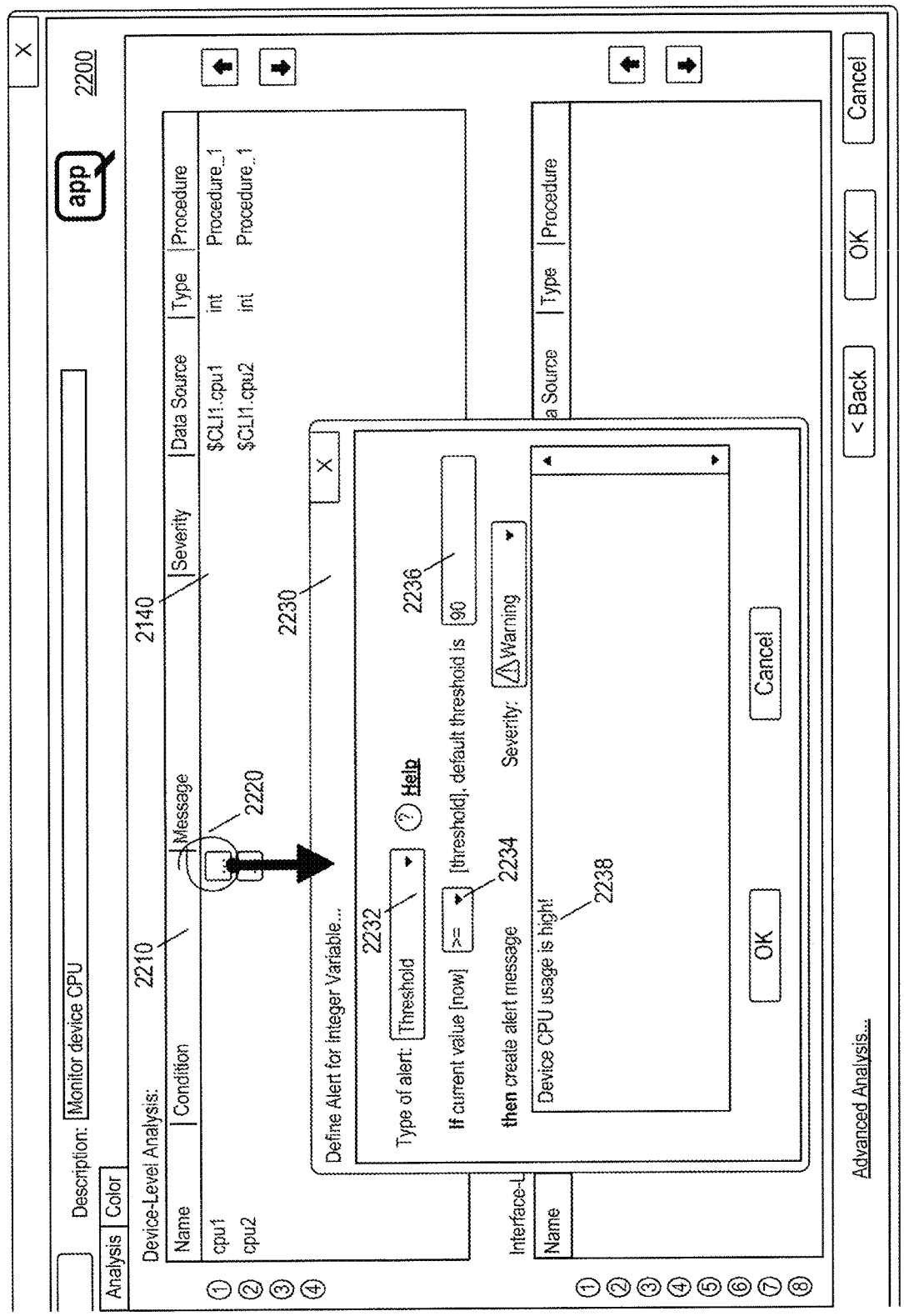
FIG. 22 shows an example GUI to define a textual alert, according to some embodiments of the present disclosure.

In addition to displaying a variable value on a network map, the analysis routine also allows a user to define one or more alerts based on the variable. FIG. 22 shows an exemplary GUI 2200 to define an alert. As shown in FIG. 22, the analysis routine includes a condition 2210, which can be defined in a pop-up window 2230 by clicking a button 2220. In the example of FIG. 22, the alert is a threshold type alert, as shown in selection list 2232. The condition to be evaluated is defined by a logic sign 2234 and a threshold value shown in input box 2236. Here, the current CPU utilization value (variable cpu1) is compared against a threshold value such as 90%. If the value is equal to or larger than the threshold, a textual alert, such as alert message 2238 ("Device CPU usage is high!") is generated and displayed to the user. In some embodiments, the condition may include whether a variable (e.g., variable cpu1) increases, decreases, or flaps with time. For example, the condition may be satisfied when cpu1 increases. In another example, the condition may be stratified when cpu1 fluctuates with time.

Figure 23:
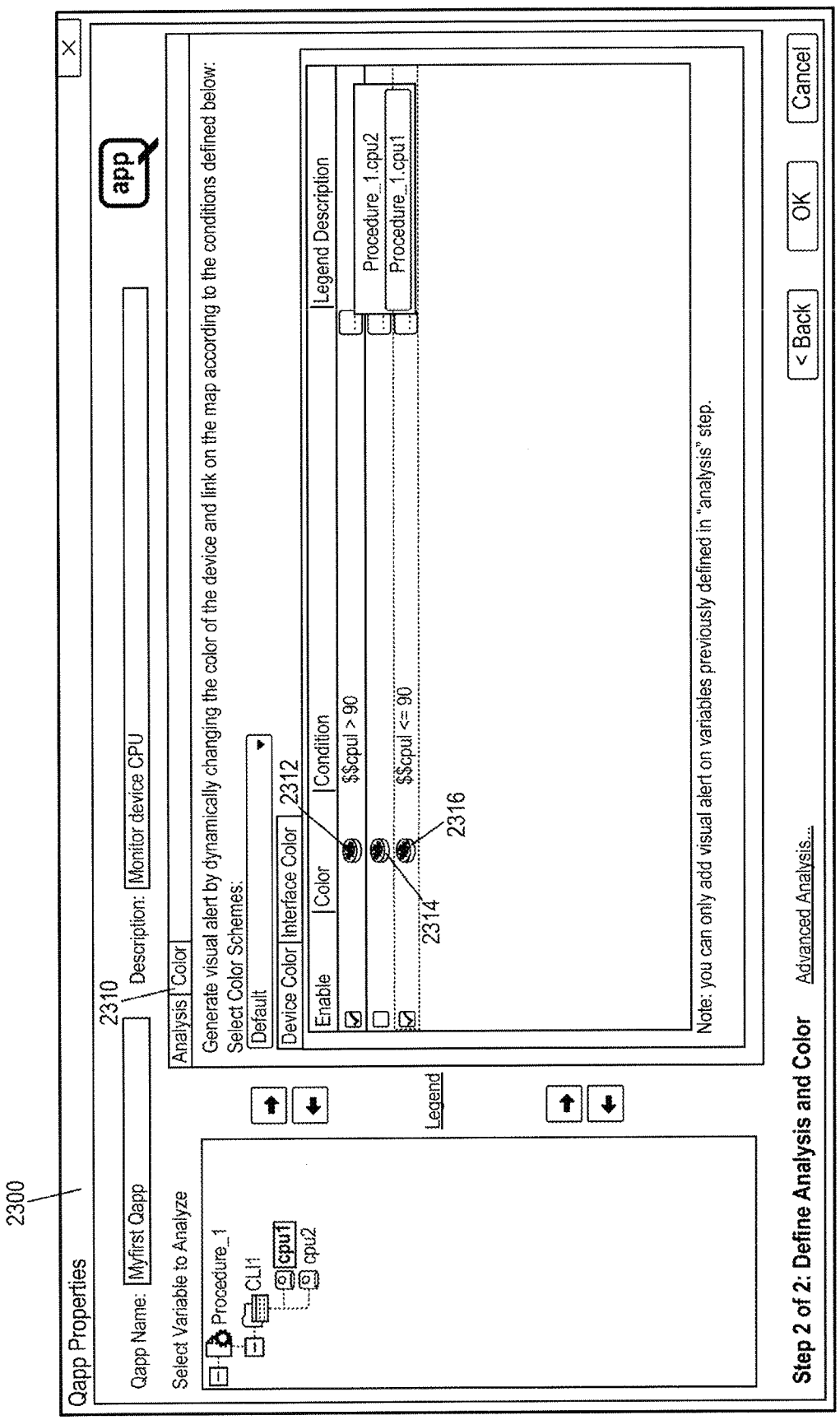
FIG. 23 shows an example GUI to define a graphical alert, according to some embodiments of the present disclosure.

An analysis routine may also include graphical alerts (also referred to as visual alerts). FIG. 23 shows an exemplary GUI 2300 to define a graphical alert. In this example, a device can be represented on a network map as a graphical indicator and the graphical indicator may be displayed in three possible colors: red (2312), yellow (2314), and green (2316). The colors and/or conditions associated with each color can be defined using tab 2310. In this example, the device is displayed in red color if cpu1 utilization is higher than 90% and in green color otherwise (note that yellow color is not enabled in this example).

Figure 24:
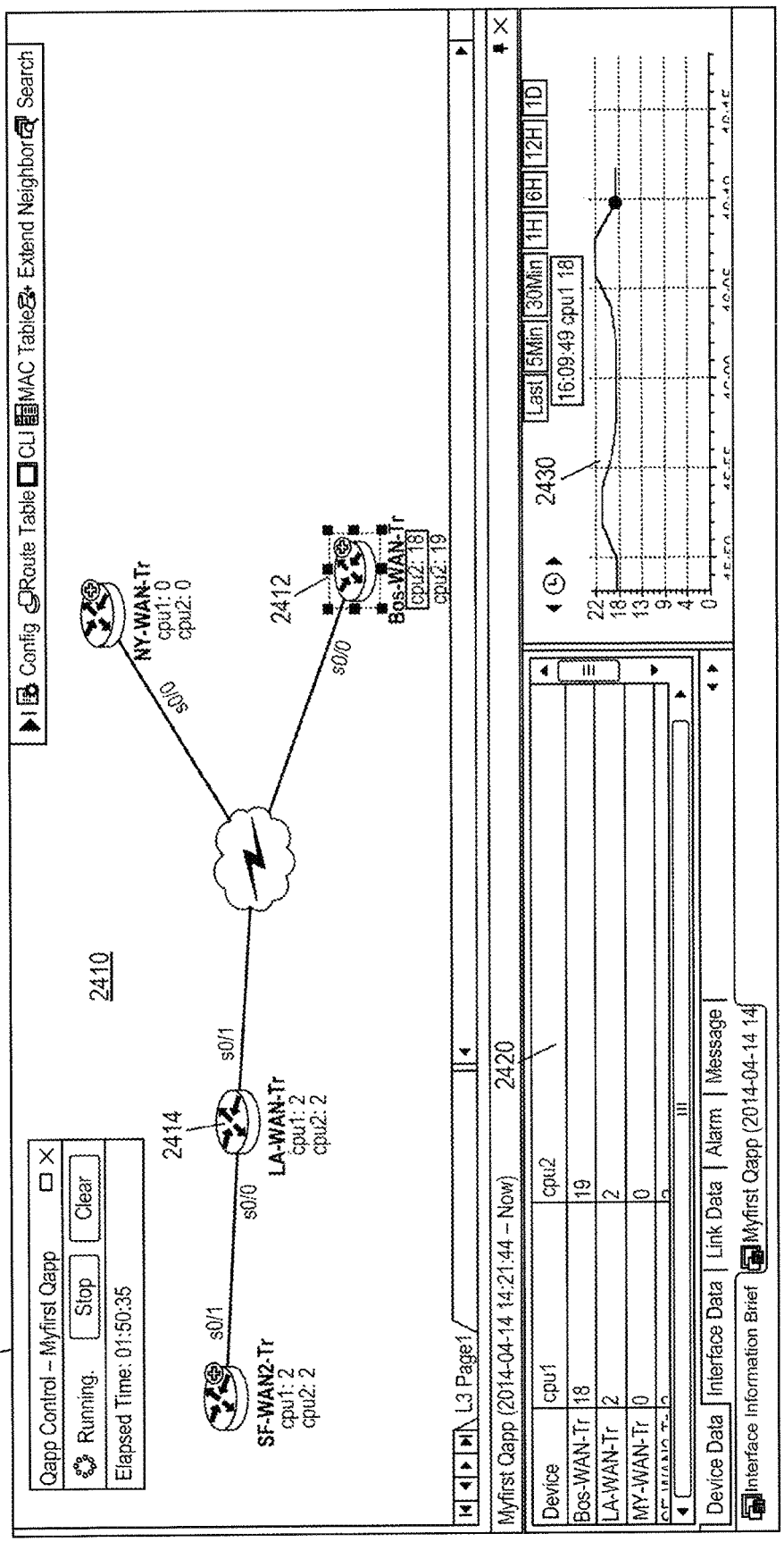
FIG. 24 shows an example GUI to display a Qapp execution result for device level data, according to some embodiments of the present disclosure.

A Qapp may be executed within a map of the network. The data retrieved from the live network and parsed in the Qapp recursively according to the configured frequency may be displayed and updated in the map. FIG. 24 shows an exemplary GUI 2400 to display a Qapp execution result for device level data. GUI 2400 may be displayed when the Qapp defined in FIGS. 20-23 is running to recursively retrieve information from the computer network and update variables $cpu1 and $cpu2. GUI 2400 may include a pane 2410 displaying a network map (e.g., a topology network map) including a plurality of graphical indicators depicting network components of the computer network being managed. For example, the network map may include a graphical indicator 2412 indicating a WAN in Boston and a graphical indicator 2414 indicating a WAN in Los Angeles. The current values of CPU utilization of a network component are displayed under the graphical indicator of that network component, as defined in window 2150 of FIG. 21. The Qapp may compare the current value of a variable with a threshold according to the analysis routine defined in GUI 2200 of FIG. 22. For example, the threshold for cpu1 of the Boston WAN 2412 may be set to 15. When the value of cpu1 is above 15, an alert may be generated. In FIG. 24, the alert is displayed as a change of color (e.g., from green to red) of the graphical indicator and a highlighting of the CPU utilization value. In some embodiments, the alert may be generated when the value of a network parameter is beyond or out of a threshold (for example, above or below the threshold depending on configurations).

In one embodiment, the alert may be removed once the value of a variable is no longer beyond the threshold. For example, in FIG. 24, when the value of cpu1 of Boston WAN 2412 falls back to 10, which is below the threshold of 15, the color of Boston WAN 2412 may be changed back to green and the highlighting of cpu1 may be removed. In another embodiment, the alert may be removed after a predetermined time period has past following the event that the value of a variable is no longer above/below the threshold. For example, in FIG. 24, when the value of cpu1 of Boston WAN 2412 falls back to 10, which is below the threshold of 15, the color of Boston WAN 2412 or the highlighting of cpu1 may not be changed immediately, but may stay for a predetermined time period. If after the predetermined time period, the value of cpu1 is still below the threshold, the color of Boston WAN 2412 may be changed to green and the highlighting of cpu1 may be removed. In yet another embodiment, the alert may not be removed automatically, but may stay until further actions.

In some embodiments, the alert may include a change of display of at least one of the plurality of graphical indicators on the network map. The change of display may include a change of color, a change of size, a change of shape, a change of highlighting, a change of description, or a combination thereof.

In addition to the network map, GUI 2400 may include a pane 2420 that displays the variables in a table format. GUI 2400 may also include a pane 2430 to display a historical chart of a variable in addition to its current value. For example, pane 2430 displays the values of cpu1 as a function of time. Displaying the historical chart may provide valuable information of the network operation status because certain network activities may occur in a relatively short time window and therefore difficult to capture without historical data. In the example shown in FIG. 24, the peak CPU utilization of cpu1 is about 22 and occurs briefly prior to the current time point. With historical data such as the chart shown in pane 2430, a user may obtain valuable information about the network operating status.

Figure 25:
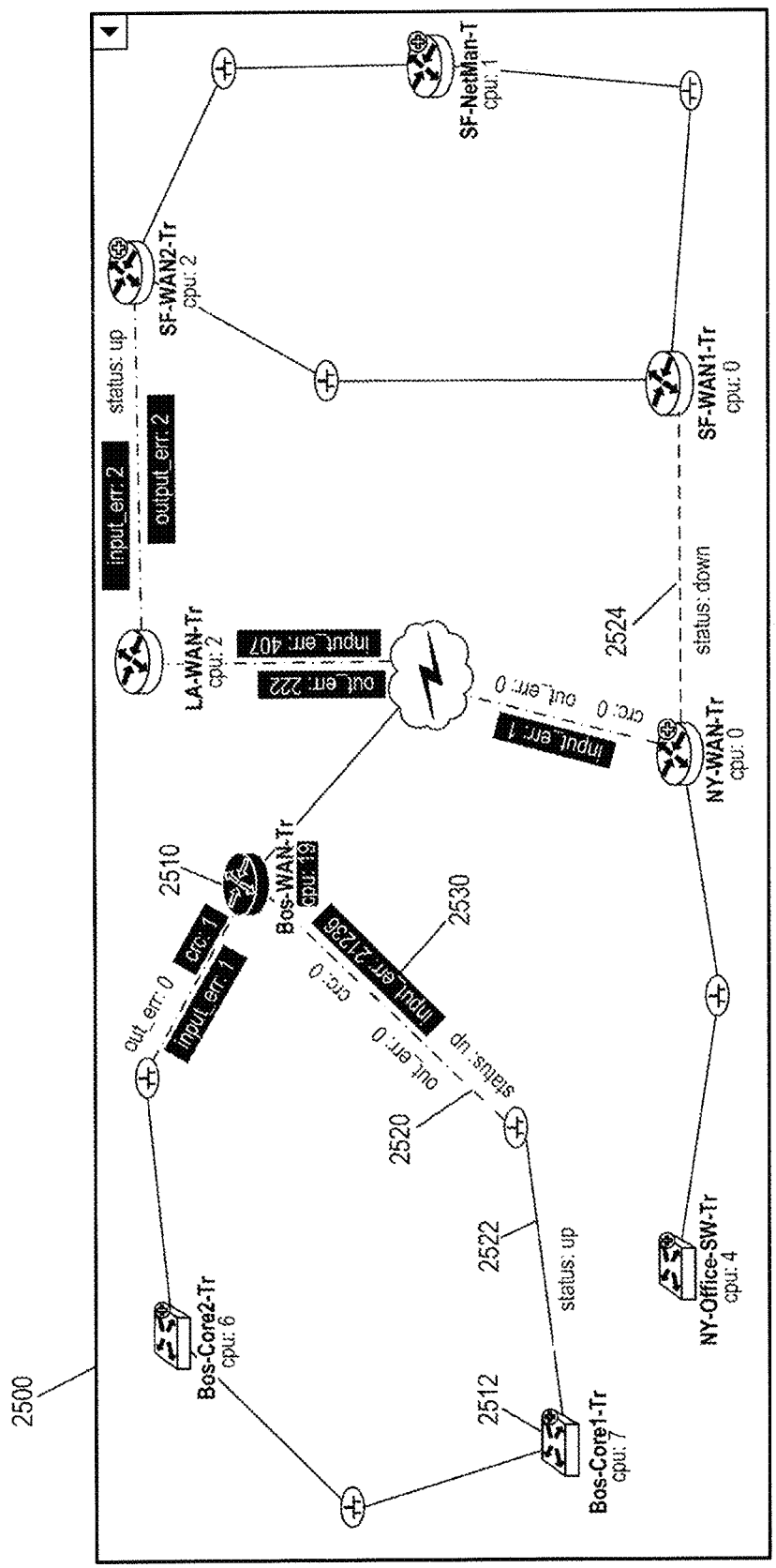
FIG. 25 shows an example network map to display a Qapp execution result for interface level data, according to some embodiments of the present disclosure.

FIG. 25 shows an exemplary network map 2500 having multiple types of alerts. Network map 2500 includes graphical indicators of network components such as core network 2512, WAN 2510, and connections 2522, 2520, and 2524. Using a Qapp such as that shown in FIG. 19, a plurality of network parameters may be monitored by recursively executing network command(s), parsing result(s), and analyzing the parsed information. The monitored network parameters (e.g., through their corresponding variables) may be displayed on network map 2500 in various forms. For example, CPU utilization values of a network device may be displayed near the corresponding device. Input/output errors and status of network interfaces corresponding to a connection may be displayed near the corresponding connection, such as connection 2522. When there is no error, the connection may be displayed in green color (e.g., connection 2522). When one or more errors occur, the error message may be highlighted (e.g., error message 2530) and the connection may be displayed in yellow color (e.g., connection 2520). When the status of a connection is down, the connection may be displayed in red color (e.g., connection 2524). As described above, the types of information and alerts that can be displayed on network map 2500 are not limited to the color, highlighting, and text, other forms of display, such as size, shape, font, description, etc., may also be used to display dynamic network information.

Figure 26:
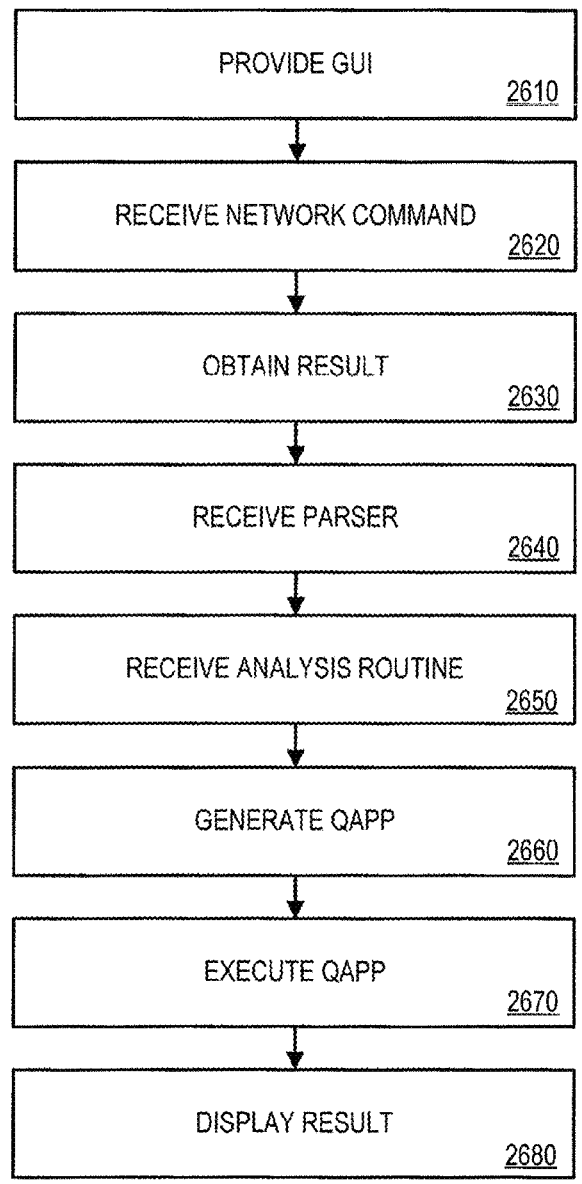
FIG. 26 is a flow chart of an example method for creating and executing a Qapp, according to some embodiments of the present disclosure.

FIG. 26 is a flow chart of an exemplary method 2600 for creating and executing a Qapp. Method 2600 may be implemented by system 100. System 100 may include a processor device and a memory device. The memory device may store computer codes for automating network management tasks associated with a computer network. The processor device may be operatively coupled to the memory device. When the computer codes stored on the memory device are executed by the processor device, the computer codes may cause the processor device to perform operations to implement method 2600.

At step 2610, a GUI (e.g., GUI 2000, 2100, 2200, or 2300) may be provided. At step 2620, a network command (e.g., a CLI command, a SNMP command, a Configuration command, or other command) to be executed on the computer network may be received through the GUI (e.g., through input box 2010). At step 2630, system 100 may obtain a result (e.g., result shown in pane 2030) from the computer network based on an execution of the network command on the computer network (e.g., upon a click of button 2020). At step 2640, system 100 may receive a parser (e.g., parser 2040) for retrieving information associated with a network parameter (e.g., CPU utilization) based on the result. The parser may include a variable (e.g., cpu1 or cpu2 shown in parser 2040) for storing the retrieved information. At step 2650, system 100 may receive an analysis routine (e.g., analysis routine defined in tab 2140) for analyzing the computer network based on variables cpu1 and cpu2. At step 2660, system 100 may generate a network management application (a Qapp) based on the parser and the analysis routine. At step 2670, system 100 may execute the Qapp to retrieve and parser information from the computer network recursively and to analyze the information. At step 2680, system 100 may display analysis result in a GUI (e.g., on network map 2400 or 2500).

Figure 27:
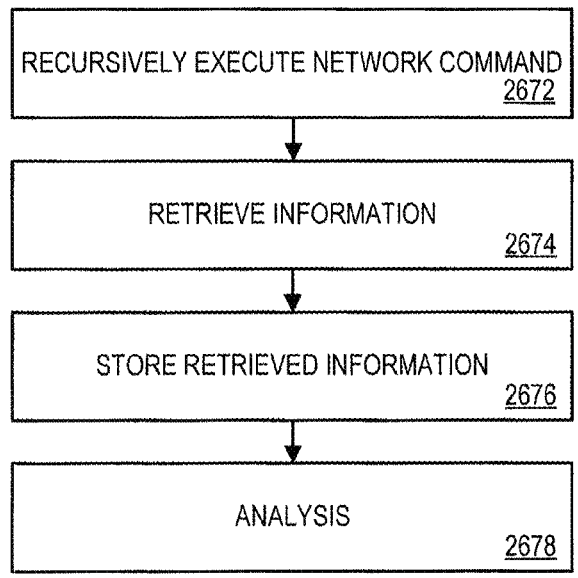
FIG. 27 is a flow chart of an example implementation of executing a Qapp.

FIG. 27 is a flow chart of an exemplary implementation of step 2670 for executing the Qapp. As shown in FIG. 27, at step 2672, the Qapp may recursively execute a network command (e.g., the network command as defined in input box 2010) to obtain result information (e.g., result information similar to those shown in pane 2030) from the computer network. At step 2674, the Qapp may use a parser (e.g., parser as defined in input box 2040) to retrieve information associated with a network parameter (e.g., CPU utilization) based on the result information. At step 2676, the Qapp may store the retrieved information in a variable (e.g., cpu1 or cpu2 as defined in parser 2040). At step 2678, the Qapp may analyze the computer network based on the variable using an analysis routine (e.g., the analysis routine defined in FIGS. 21-23).

The specification has described network management systems and methods. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store computer code instructions for execution by one or more processors, including computer code instructions for causing the processor(s) to perform steps or stages consistent with the embodiments described herein. The term "computer-readable medium" should be understood to include tangible items and exclude carrier waves and transient signals, i.e., be non-transitory. Examples include RAM, ROM, volatile memory, nonvolatile memory, hard drives, CD ROMs, DVDs, flash drives, disks, and any other known physical storage media.

Figure 28:
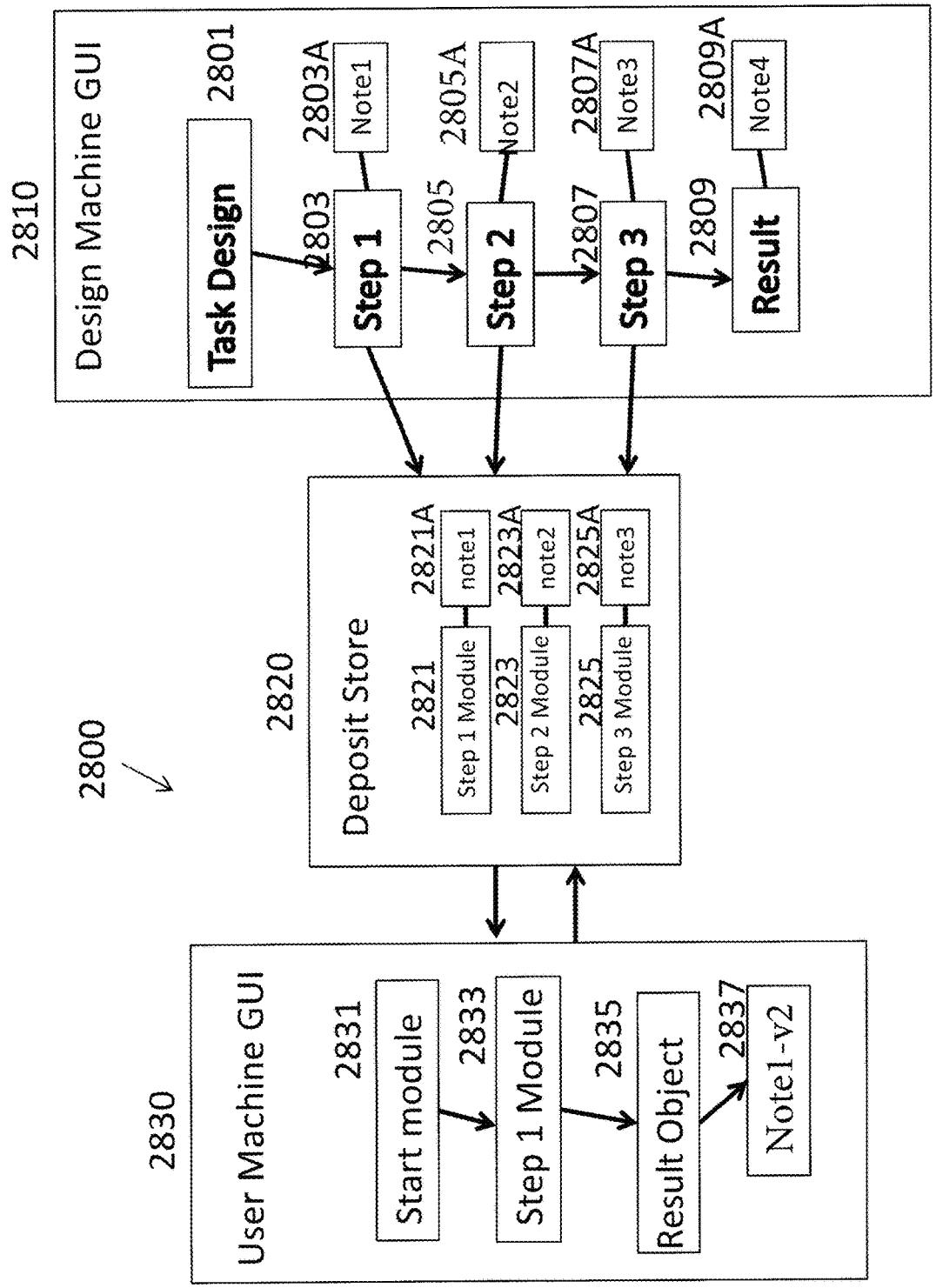
FIG. 28 schematically shows an example functional structure of an automated and standardized task-oriented computer network management system for reuse in accordance with this application.

In reference to FIG. 28, an automated modularization system 2800 for task steps is shown to include a design module 2810 and a user module 2830. The design module 2810 includes GUI based components to allow a senior engineer to design and test a full set of procedure for a particular task. Task design module 2801 guides a senior engineer to design his/her procedure into multiple sequential steps, for example, steps 1, 2, 3 at corresponding choices of graphic elements. Included are underlying functional modules 2803, 2805, 2807 and for each step, the designer can place a note at their respective note module 2803A, 2805A, 2807A to explain design logic and purpose. The design GUI 2810 also executes the designed procedure and displays the running result at a display module 2809, where the designer can also place a comment at its associated note module 2809A. If the designed procedure runs successfully, design module 2810 then modularizes each of the steps into an independent module and deposits them into a deposit store 2820 for other people to use and retrieve. For example, Step 1 of the task procedure becomes step 1 module at store position 2821 of deposit database (storage) 2820, with an associated note at position 2821A. Step 2 of the task procedure becomes step 2 module at store position 2823 of deposit database (storage) 2820, with an associated note at position 2823A. Step 3 of the task procedure becomes step 3 module at store position 2825 of deposit database (storage) 2820, with an associated note at position 2825A.

The automatic modularization can be realized by providing a universal starting module 2801 and universal ending module 2809 in the design GUI 2810, which allows for taking in the inputting variables and outputting the running result as variables in a variable holder for next function block.

A user GUI 2830 is provided to select any of the step modules and run the selected step according to his/her own needs. For example, user GUI 2830 provides a start module 2831 to allow step 1 module plug-in to form a module 2833, and executes module 2833 to generate a result object 2835. Then user GUI 2830 also provides a commenting function 2837 to allow the user input any note for this run. Result object 2835 and note1-v2 are then saved into deposit database 2820 for future reference and retrieval for step 1 module.

The starting module and result displaying module in one embodiment are a set of Qmap windows that not only provide a graphical user interface for a user to select a computer network environment to run a task-oriented procedure, but also present a live observation of the execution of each of the steps of the procedure. Qmap window will automatically draw out the topologies around a chosen network device and its surrounding, neighboring network devices.

In the present system, many network management procedures; and troubleshooting protocols are then standardized over a set of network devices, modularized into steps, and grouped into action blocks. Steps and action blocks are then tagged with keywords and tasks for keyword searching and browsing by GUI elements. In one embodiment, the steps are in the form of Qapps, and the execution results are recorded with a Qmap.

Figure 29:
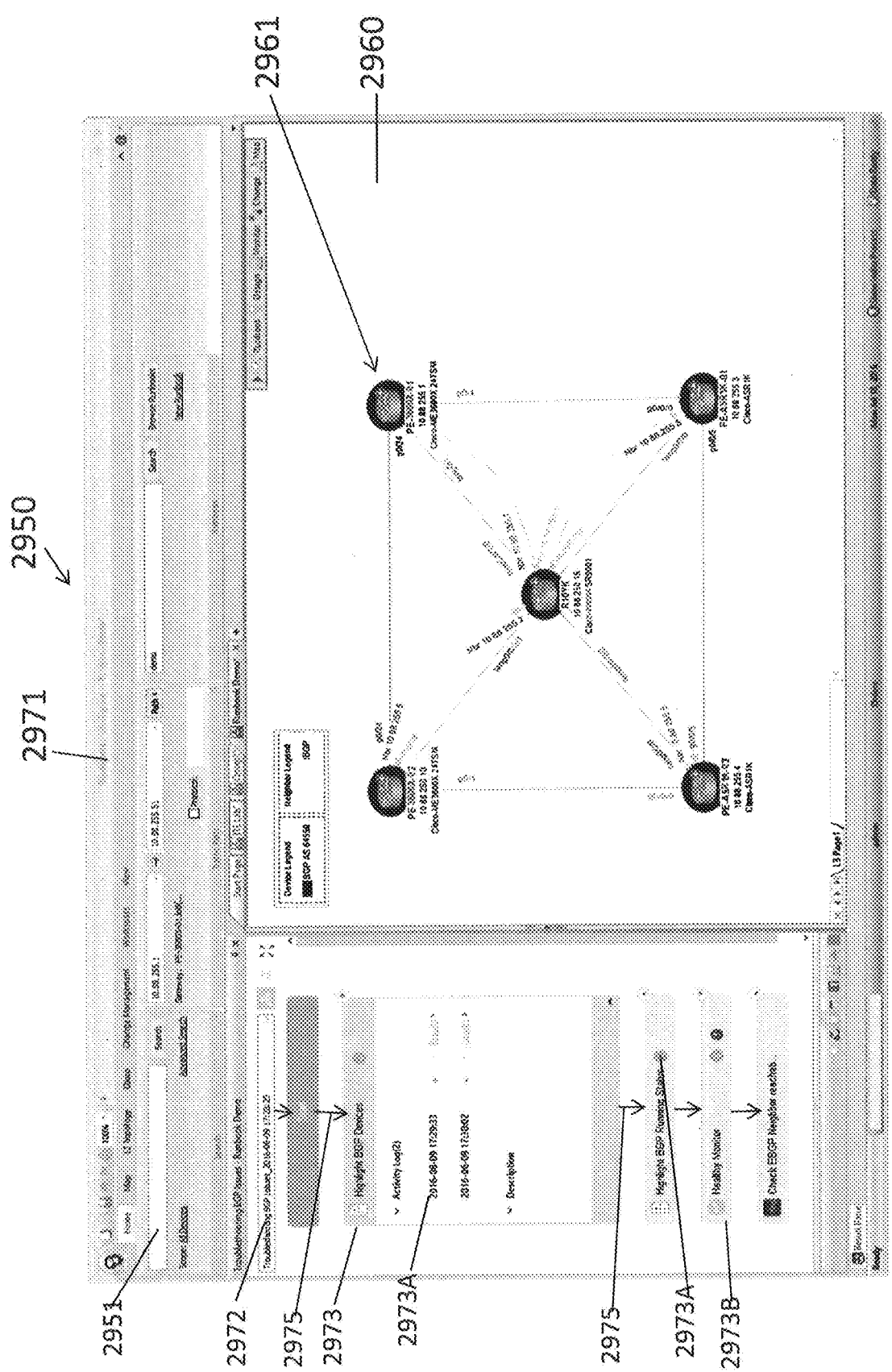
FIG. 29 shows an example GUI of the system of FIG. 28.

In reference to FIG. 29, the runbook 2950 system includes a GUI 2971 for a level one user to choose and execute a standard troubleshooting procedure. In GUI 2971, the upper left panel 2951 allows a user to search for a standard task-oriented procedure by keywords. For example, if keyword "traffic slow" is entered, all related modularized and standardized network procedures will be displayed for the user to choose in left window panel 2972. Other options of choices include by source where a user can choose a source of network, by destination or by a function/task for a Qapp.

For example when the user chooses the standard "traffic slow troubleshooting" procedure at dropdown list 2972, traffic slow troubleshooting procedure 2973 is shown that includes a set of multiple Steps 2973 and their respective associated notes 2973A. Between each of the respective steps 2973, are the logic controls 2975 which show whether the prior step has reached successfully to the next step for a full execution of the procedure. On the right window panel 2960, a network device map 2961 is created or a prior execution instance is displayed to show the execution result of each step. A user can click on each of the steps 2973 to start that step and to see the execution result on the devices in map 2961. The user can then enter his or her comments at the step's note area. Step 2973B provides a health monitor to see if each of the steps is executed within the set satisfactory scope.

In a real world application, for example, a NOC engineer receives a complaint of VoIP quality issue, logs in to this system 2950, searches and finds a standardized VoIP troubleshooting protocol in the system, and launches the troubleshooting analysis as follows:

he prompts the user to enter source IP of the phone and the destination number. A Qmap is automatically created for VoIP data flow across data network by the system;

he follows and clicks the step to create an L2 map of that data flow;

he clicks the next step on the screen that automatically executes Qapp1 to annotate QoS configure;

he clicks the next step on screen which automatically executes an overall health monitoring Qapp2;

he clicks the next step on screen that automatically executes Qapp3 that checks the VoIP quality; and he observes the execution results with the Qmap on the screen to see where the problem has occurred in the user phone's network.

In another example, a NOC engineer receives a report that a server in a remote site is unresponsive. He then starts system 2950 to launch a diagnosis as follows:

he first searches the IP of the server and opens the site map where the server belongs to on screen;

using the site map as a reference map, the engineer finds other execution instances executed at this site recently, including the associated notes; and the engineer then executes the next step that automatically runs the Qapp on the map, and finds that the link duplex is misconfigured. He then creates a note on this diagnosis, to remind the other people about this misconfiguration.

he can also delete a few old and non-useful execution instances inside that site map.

In another example, company A has several multicasting groups deployed across 100 routers. Engineers need to monitor real-time and diagnose a particular group. Using system 2950, an engineer can do the following:

he enters a source address and destination group (S,G) and the system automatically uses Qapp and creates a Qmap of the (S,G) multicast flow;

he executes the next step that automatically runs a Qapp to annotate the multicast design; and he executes the next step that automatically runs another Qapp to monitor the active multicasting flow in the Qmap.

Figure 30:
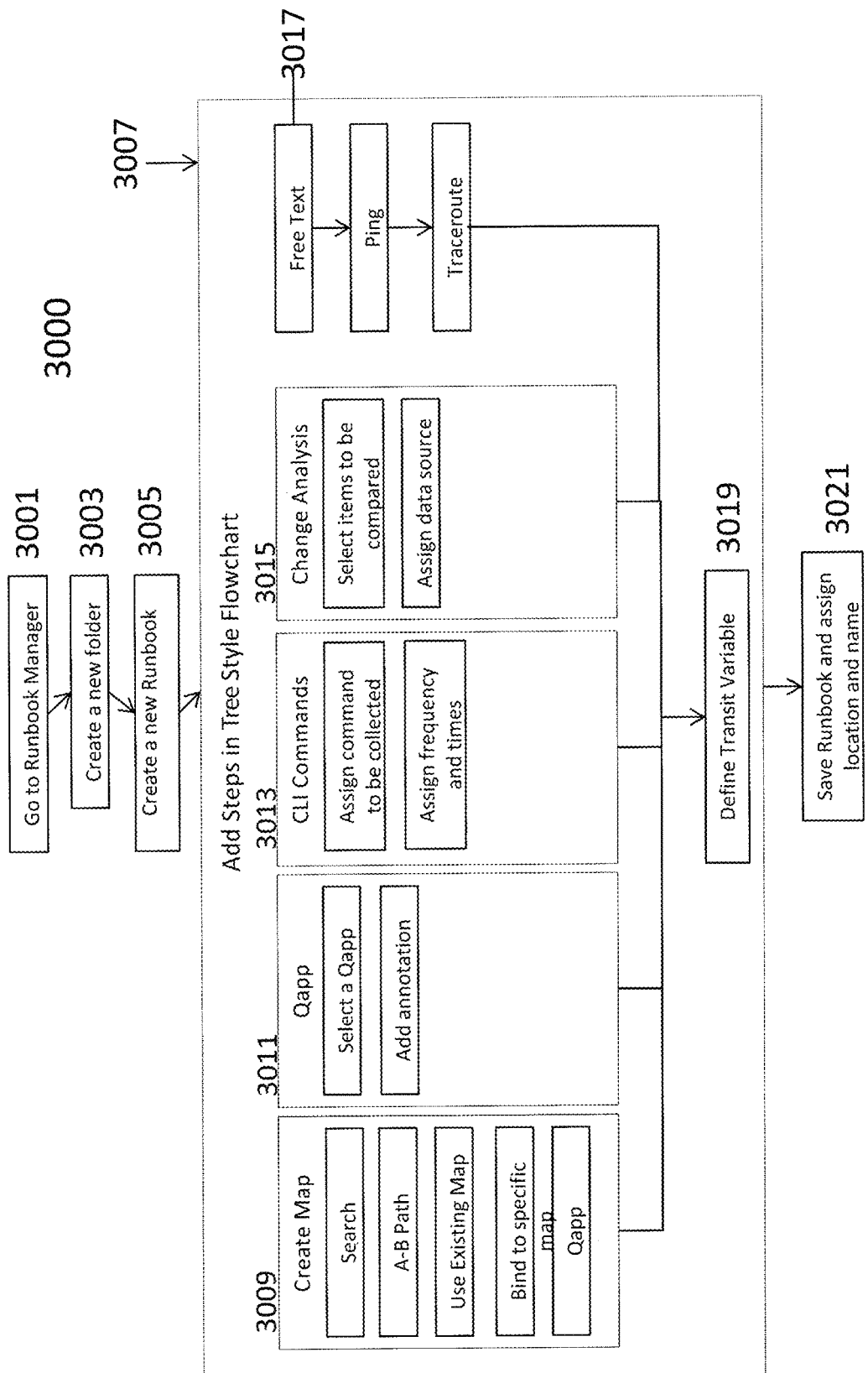
FIG. 30 schematically shows a flowchart of an example process for designing a re-useable computer network management task for automatic modularization of the individual task steps in accordance with this application.

System 2950 includes many built-in task-oriented standardized action blocks and Steps and procedures for common problems and troubleshooting. System 2950 also allows a creator user to create and modularize a task-oriented standard procedure themselves. In reference to FIG. 30, flow chart 3000 shows the process for a Creator user to design a modularized task-oriented standard procedure. In this system, a Creator solves a particular network problem by going through the process of Create Map→Understand Network Design→Monitor Current Status→Historical Change Analysis. FIGS. 31 to 35 show an example GUI for this process.

Figure 31:
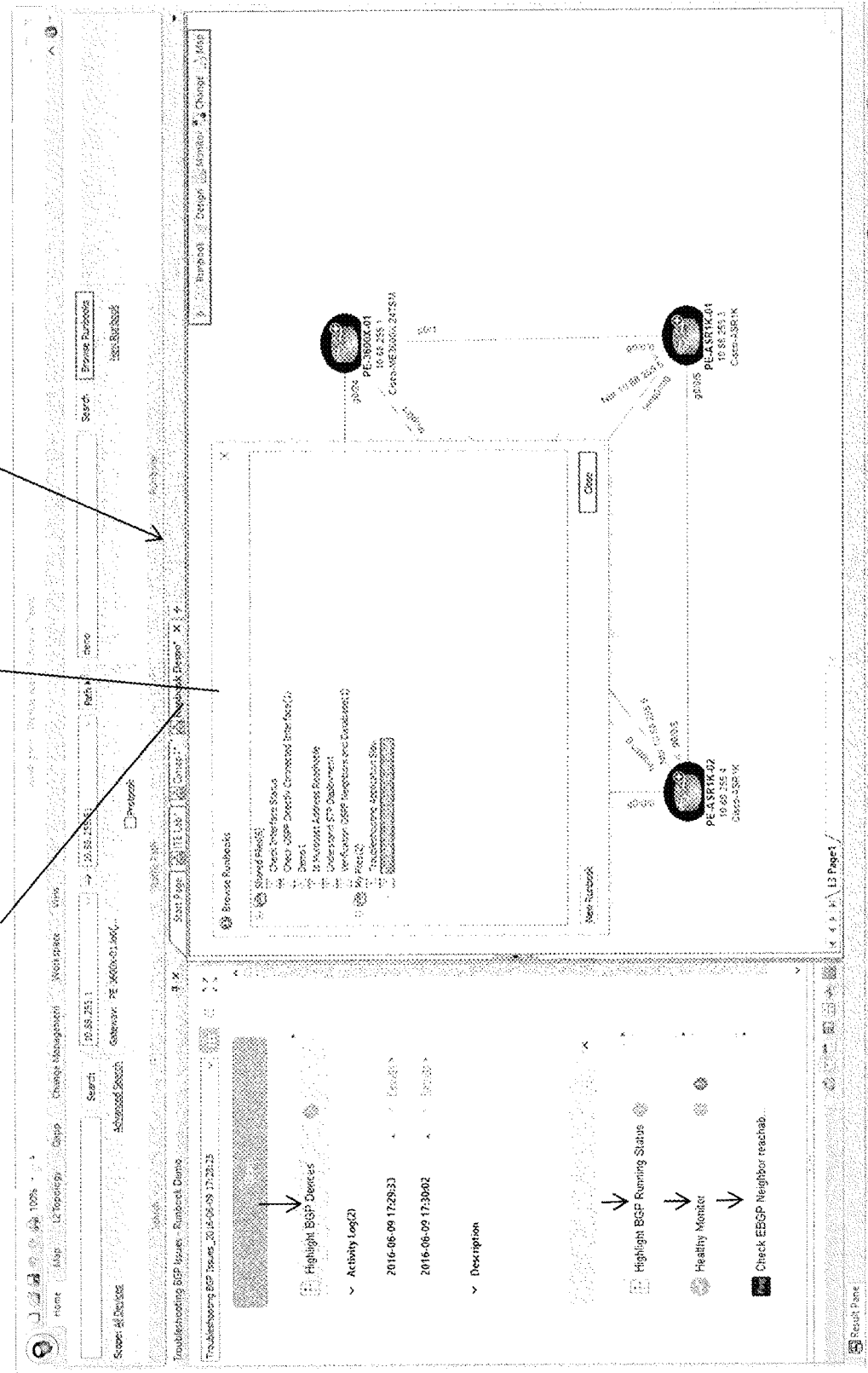
Figure 32:
Figure 33:
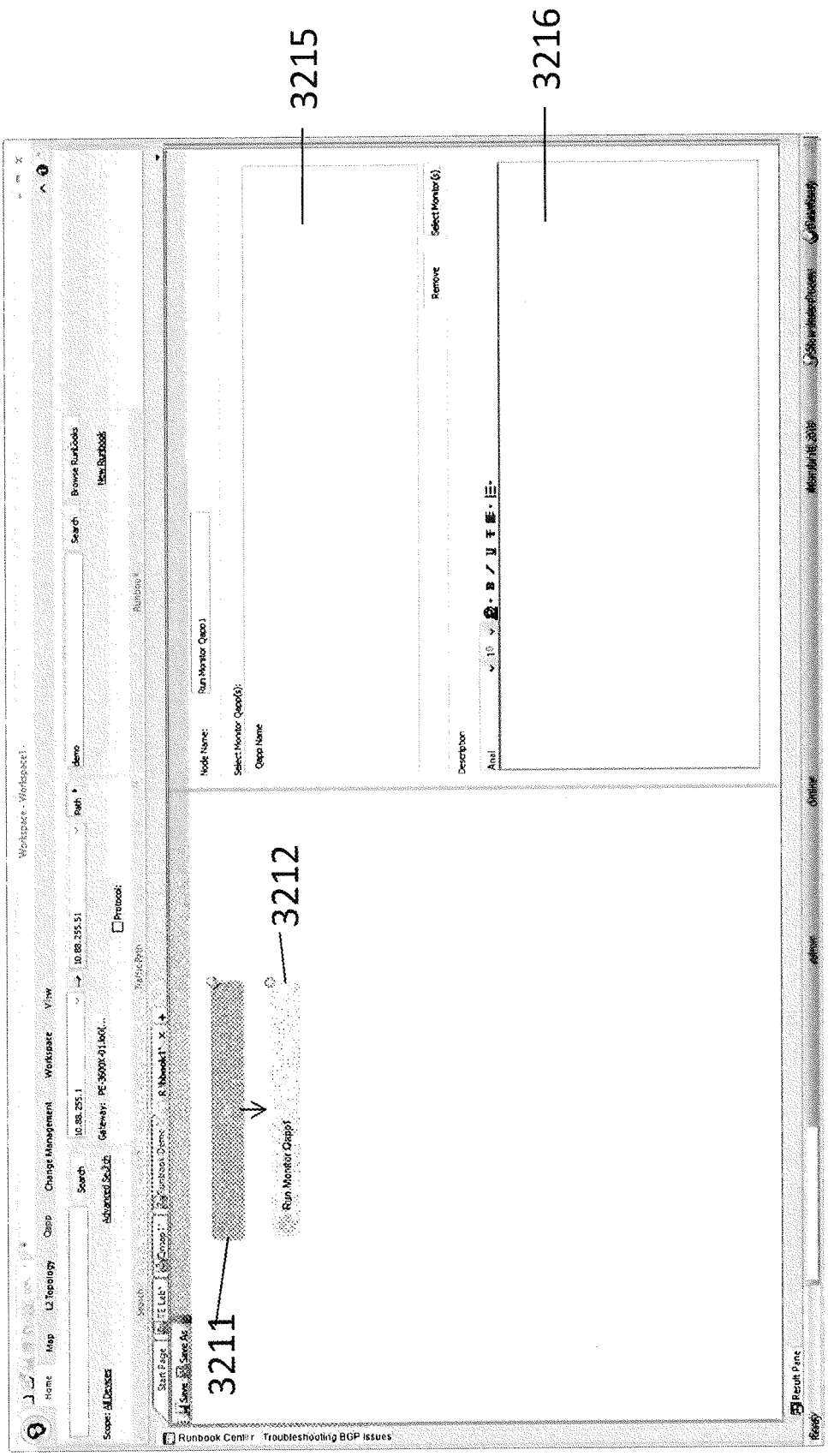
Figure 35:
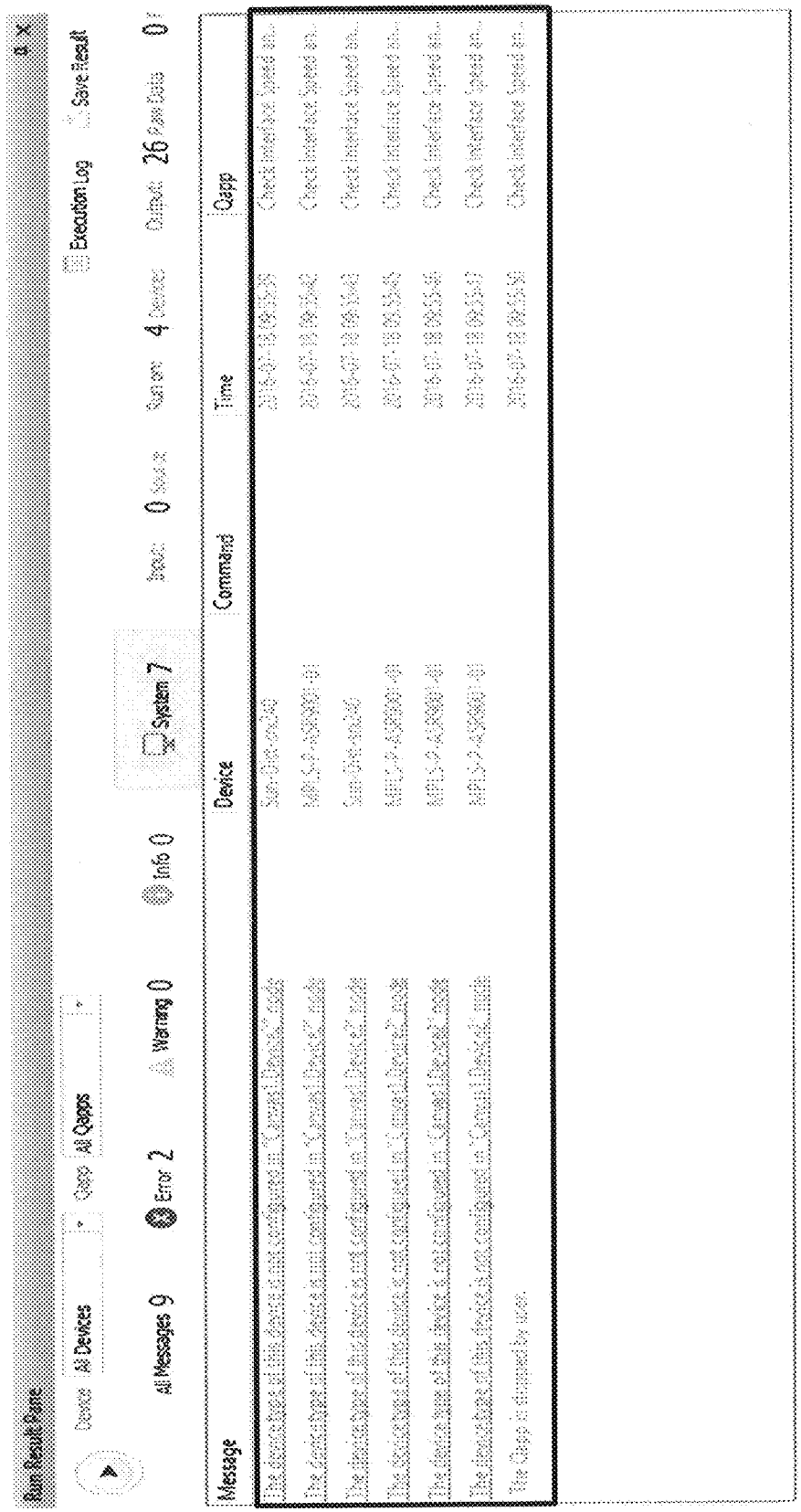

A creator user at step 3001 logs onto the manager interface 3100 and creates a new folder at step 3003 in window panel 3101 and 3103 (FIG. 31). At step 3005 in new window 3210, he initiates a new task-oriented standard procedure instance 3211 and is automatically led to next step by popup window 3212 for creating a map (FIG. 32). He also inputs some annotation at window panel 3213. He starts the standardization 3007 by creating a Qmap at step 3009 via choices provided in option panel 3215. He can use the built in functions of Search, A-B path, Open an existing Map, or use a Qapp to create a Map. Panel 3216 allows him to input some comments. Creating a map enables a standard running environment for users to minimizing errors. After this he can add Steps by selecting stored Qapps in the system at step 3011, or obtain a Qapp by executing a network CLI command at step 3013. He can further add more logic statements through GUIs in FIGS. 34 and 35. The system provides modularized system feature steps, such as Change Analysis (e.g., step 3015), Execute CLI Command (e.g. step 3017), Ping, Traceroute, Telnet, Netflow, IPSLA, etc. for defining a transit variable 3019 and saving runbook and assigning a location and name 3021.

Figure 36:
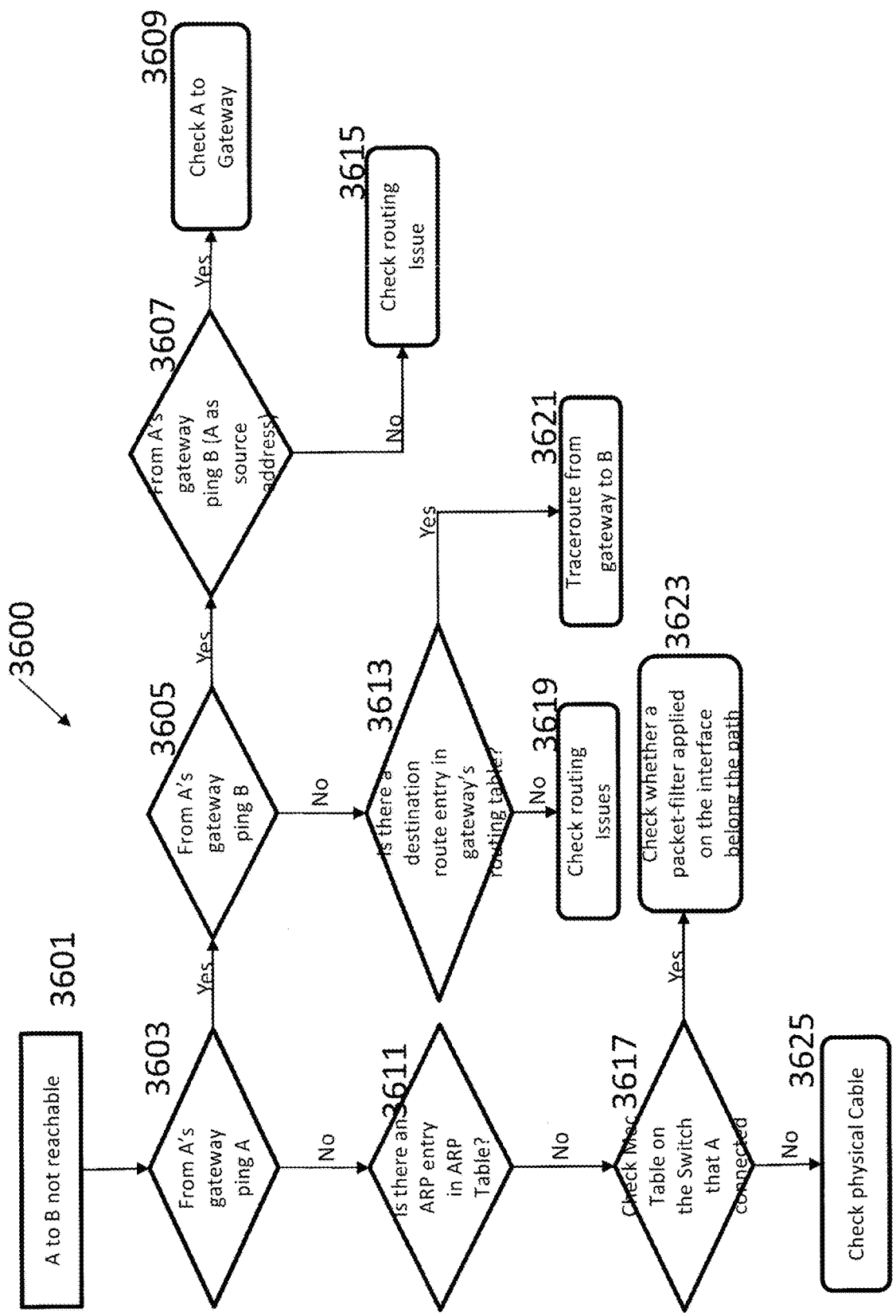
FIG. 36 shows an example client flowchart GUI for re-using the modularized steps of a standardized computer network management task as designed in FIGS. 31-35.

A creator can organize the executable steps into action blocks in a flowchart 3600 as shown in FIG. 36. Between each block are logic controls. 3601 represents troubleshooting procedure for "A to B not reachable" symptom. It automatically goes to action block 3603 that does "from A's gateway pings A," if yes it automatically goes to action block 3605 "From A's gateway pings B," but if action block 3603 cannot be done, it automatically goes to action block 3611 to find "If there is an ARP entry in ARP table." Steps proceed so on through action block 3617 to action block 3623 or 3625. The "yes" line of 3603 proceeds from action block 3605 through action block 3607 either to action block 3609 or to action block 3615, or proceeds from action block 3605 through action block 3613 either to action block 3621 or to action block 3619.

Figure 37:
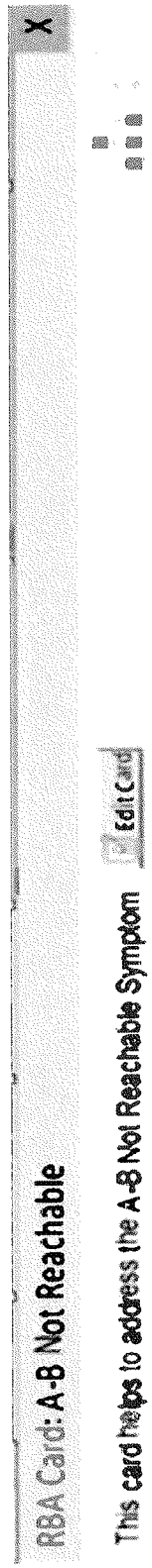
FIG. 37 shows an example client natural language GUI for re-using the modularized steps of a standardized computer network management task as designed in FIGS. 31-35.

The flowchart "A to B not reachable" troubleshooting procedure can alternatively be presented in natural language logic statements as shown in FIG. 37, where the action blocks are marked with hyperlink color. The flowchart blocks 3603 to 3605 etc. are converted into natural language logic in hyperlink 3701-3715.

Figure 38:
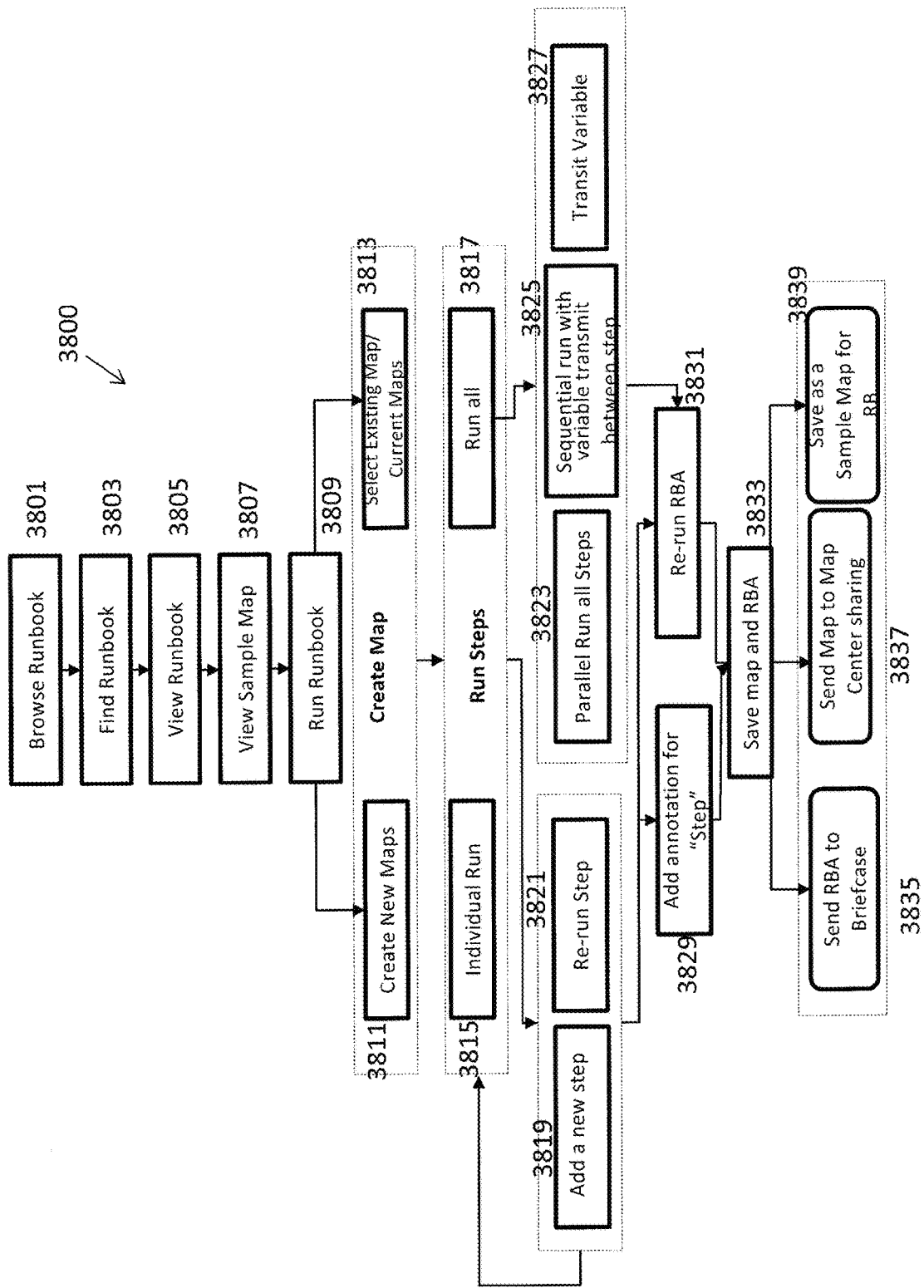
FIG. 38 schematically shows an example client process for re-using the modularized steps of a standardized computer network management task in accordance with this application.

In reference to FIG. 38, a flowchart process 3800 illustrates a user re-using or repeating a troubleshooting procedure created and shared by another creator. At steps 3801 and 3803, in the system 2950, a user can browse or find with keyword searching a procedure shared by another user or the creator that is relevant to his problem at hand. Once identified, he clicks the procedure and views the details of the procedure at step 3805. He can further view the stored execution instance map that is associated with the procedure by clicking on a graphic element on the screen at step 3807. There may be many execution versions stored, and each prior and new execution instance can be associated with a map, and the execution instance can be stored as map data within the host's map. At step 3811 the user can create a new map and execute the procedure on devices in the new map; or alternatively, open an existing map and execute the procedure on the existing map and save the running result as an instance (Step 3813). At the map level, the user is also provided with a note to annotate his/her experience with this procedure. From step 3815 to step 3827, the user can further choose to execute a single Step or a few Steps in parallel or in sequence to compare and identify any problems. The user can also add a Step to the procedure and provide an annotation for his reasoning and purpose in so doing (Step 3829). User note is provided in free text format 3017 and can be edited in a rich text editor, for example. The annotation at Step level is beneficial in that it helps another engineer in reviewing the execution data, and saves other users from providing input again in doing a re-run. The input for creating a Map includes map name and path, record search input, A to B Path includes record A, B, Protocol, Path type. Input for Run Qapp step includes device input, Table input; Input for Change Analysis includes Data Folder used, Attributes compared, input for CLI Commands executed; input for Ping/Traceroute includes Destination IP, Source IP or Device Interface, Segment Size, Packets counts.

The different categories of output of running an action Step is displayed in the left corner pane of the GUI at the alternative choices of 3831, 3833, 3835, 3837 and 3839. The output includes: Alert information from Qapp Add Message( ) method and Alert from system level message.

The system can also monitor results on Map and chart, the Result on the map including Device and Interface Label, Device and Interface Note, Alert number on the badge, and Chart result. Qapp Result at Map Level can still display Device data Interface data, Device and interface note, and Highlight and Exported report. The System function output will save the results from Change Analysis, Ping, Traceroute functions. The system also allows for Executing CLI Command at real time to collect raw data.

Users can also organize their experience into Briefcases for quickly locating solutions for problems solved before, and simply re-run a previously created procedure. In the organized Briefcase, a user should be able to know which procedure is most reliable and capable of executing correctly in his/her responsible network. Briefcase provides an easy way to find a Map, RB, RBA and Qapp that has tested in the user's own network. Briefcase includes "Current running session," (built-in) that is all of those procedures currently running on the user's terminal side, and the Individual Qapp's link. With simple mouse clicking, the user can view the execution result on the related Map. Briefcase includes "Recent used" where user can review the executed Qapp in the recent past. Briefcase includes "Current Map" (built-in)

where all QMaps that are currently open are located. Users can set up a folder to include running results, QMaps and Qapp. Briefcase keeps records of the frequently used running results from procedures, including Alias that is automatically designated for a running result to be sent to a Briefcase. Briefcase can simply keep a record of a Reference to a Map, or URL of a Map location.

Figure 39:
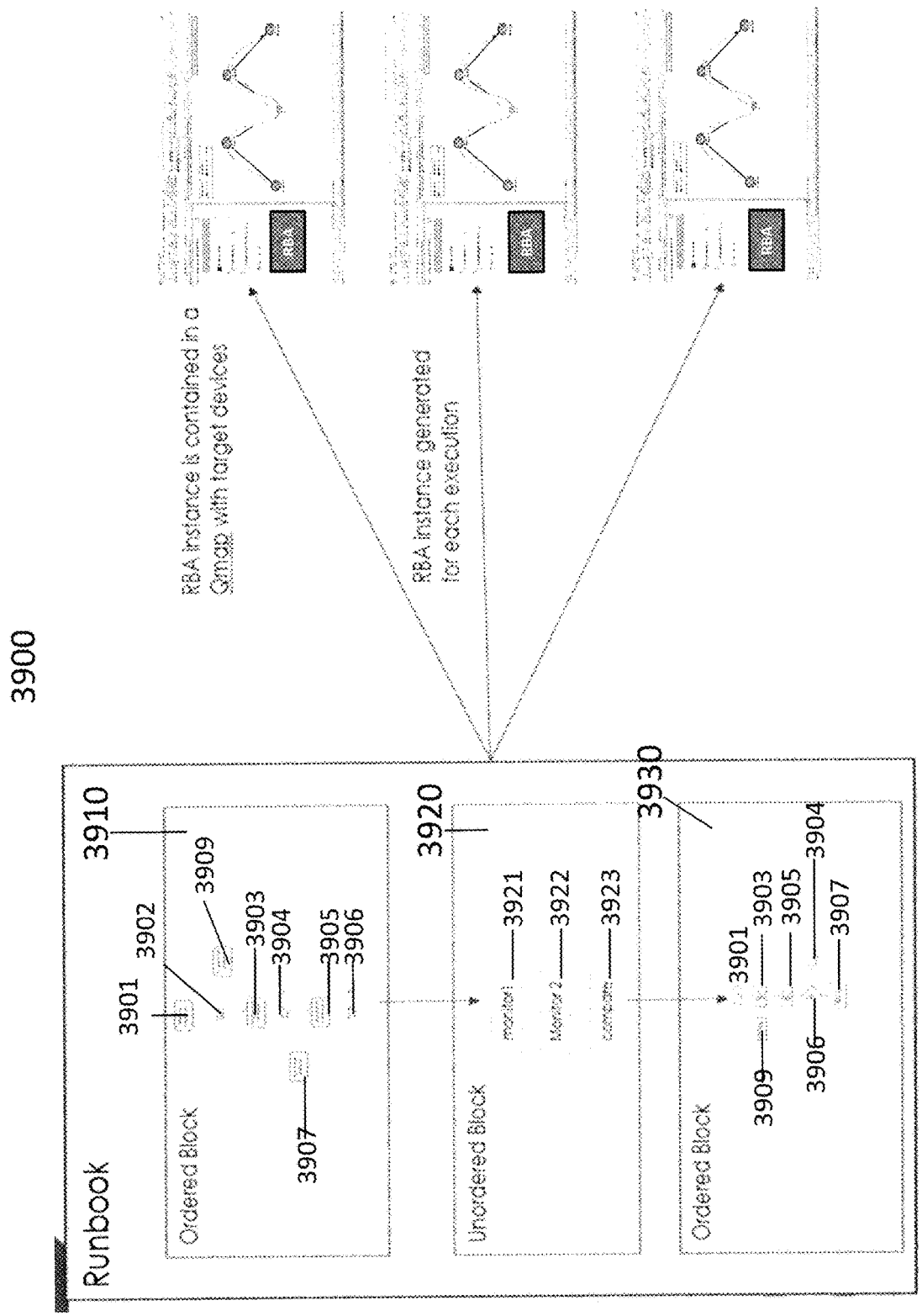
FIG. 39 shows another example client re-using modularized steps of a designed computer network management task in accordance with this application.

In reference to FIG. 39, the flexibility of organization of the action blocks of steps are illustrated. In block 3910, steps 3901 to 3909 are organized in a sequential order top down from 3901 to 3906 with 3907 and 3909 at the side. In block 3920, these steps are organized into three independent monitor action blocks 3921, 3922 and 3923. Then, in block 3930, steps 3901 to 3909 run in a sequential order from 3901 to 3907, with 3909 and 3904 as the side steps. Each execution scenario has its own execution instance displayed in the Qmap at the right side pane.

The modularized task-oriented standard procedure is alternatively called a Runbook (RB) operation. A Runbook GUI includes several elements:

Target Qmap (P1): user can create Runbook that is bound to a specific Qmap describing a section of the network under management. In such a Runbook, each Operation Step can be pre-configured to act on a selected device on the map. This association is established and validated at Runbook Design Time in order to eliminate the uncertainty at runtime.

Hidden Page (P1): each procedure instance by default would be associated with a target Qmap containing the target devices of this execution. In order to preserve and present the complete result for each Operation Step in the Runbook, system automatically builds a hidden map page for all steps generating a map-based output, such as map-based monitoring actions. In some interactive troubleshooting situations, Qmap is used as the working space for the troubleshooting actions. For Routine Tasks involving large number of devices, a map may not be feasible or necessary.

Procedure Annotation (P1): allows user to annotate the result from the running procedure to put in user's comments, such as key finding from the result. This is an important capability to facilitate the user collaboration across the case escalation path.

Interactive Runbook Execution (P1): in the initial phase, Runbooks will be used solely for interactive scenario where a user opens a Runbook and manually executes each Operation Step →interpret the execution outcome →follow instruction in Runbook to decide which operation step to take as the next step.

Auto Execution (P2): the auto execution of the non-sequential blocks and auto execution for sequential blocks.

Scheduled Runbook Execution (P2): allow user to schedule the execution of a Runbook on a periodic basis. (Typically this would rely on moving the Qapp execution onto server. A client based scheduling functionality can be done, but won't provide smooth experience.

Runbook Annotation (RBA) Browse by RB (P1): RBA can not only be browsed within its host Qmap, but can also be browsed under its originating Runbook in the Runbook browser. This will give user the ability to easily find all past instances when the runbook was executed. This capability can be useful for scenarios like: programming the routing configuration screening task in a Runbook, executing it every morning, and going back to check the result from yesterday in order to compare it with today's result. It can also be used to see the past execution instance for new user to understand how to use the runbook.

Runbook statistics (e.g. identify the most frequently used RB) can also be derived from such aggregation. Rerun RB Steps in an existing RBA (P1): allow user to rerun any step in a Runbook. This functionality can be very useful in both troubleshooting and routine task scenarios: During troubleshooting, user takes over a ticket with a map associated. User opens the map and reviews the RBA for past action and result. User reruns one of the steps to check the current status and compares with what was collected yesterday to see if there is anything different.

For a configuration screening task runbook containing 4 steps and scheduled to be run at 6 AM every morning: admin comes at 8 AM to check on the status of today's execution and noticed that one of the steps failed during execution. He immediately triggers a rerun of that step to catch up on the missed step.

New RBA Instance from Existing RBA (P2): this would give user a convenient way to create a new instance of the same RB in the same host Qmap, without going through the RB browse and map selection. E.g. I ran a monitoring task yesterday on this map. Today, I want to run it again on the same map, I will just create a new instance of the RB from the previous RBA. Note: here if there is any modification on the originating RB, user should be prompted to choose to use the old or new version of the RB.

It is intended that the disclosure and examples be considered as exemplary only, with a true scope and spirit of disclosed embodiments being indicated by the following claims. As will be recognized by those skilled in the art, the innovative concepts described in the present disclosure can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

None of the description in the present disclosure should be read as implying that any particular element, step, or function is an essential element which must be included in the claim scope: the scope of patented subject matter is defined only by the allowed claims. Moreover, none of these claims are intended to invoke paragraph six of 35 USC section 112 unless the exact words "means for" are followed by a participle. The claims as filed are intended to be as comprehensive as possible, and no subject matter is intentionally relinquished, dedicated, or abandoned.

The invention claimed is:

1. A system for creating a network management procedure with respect to a network of devices, the system comprising a computer processor and a non-transient memory comprising instructions that, when executed by the computer processor, cause the computer processor to implement a method comprising:

presenting a graphical user interface (GUI) on a display;
presenting a representation of the network of devices on the display, wherein the representation includes real-time information for each represented device;
presenting a representation of a first network management procedure on the display, wherein the representation includes a plurality of steps of the first network management procedure, and wherein each step is a single independently executable action that obtains or causes a network result with respect to the network;
receiving a selection from a user, via the GUI, of one or more steps of the first network management procedure;
presenting, on the display, a graphic element corresponding to each selected step, wherein the graphic element for each selected step on the display is operable by a GUI operation applied to the graphic element to execute the corresponding selected step for the network result for that selected step; and storing the selected one or more steps as a second network management procedure for later retrieval, wherein the second network management procedure is iteratively presented for selection of steps for future procedures.

2. The system of claim 1, wherein the method further comprises:
displaying the selected steps as a flowchart.

3. The system of claim 1, wherein the method further comprises:
receiving, via the GUI, an identifier of a subset of steps as a block of steps,
wherein the steps in the identified block are to be executed together.

4. The system of claim 1, wherein the method further comprises:
receiving, via the GUI, an identifier of a subset of steps as a block of steps,
wherein the steps in the identified block are to be executed in a predetermined order.

5. The system of claim 1, wherein the method further comprises:
receiving, via the GUI, an identifier of a subset of steps as a block of steps; and
receiving, via the GUI, a control indicator that establishes a logical relationship between at least two steps in the identified block.

6. The system of claim 1, wherein the method further comprises:
receiving a GUI operation to modify an order of the displayed graphic elements,
wherein the modified order of the displayed graphic elements sets an order in which the corresponding steps are executed.

7. The system of claim 1, wherein the method further comprises:
receiving, via the GUI, annotation information corresponding to a step.

8. The system of claim 1, wherein each step obtains, or causes, a network result from, or in, the computer network.

9. The system of claim 8, wherein the network result corresponds to a response from a device in the network.

10. The system of claim 1, wherein storing the selected steps further comprises:
assigning a label to the stored network management procedure.

11. A system for troubleshooting a network of devices, the system comprising a computer processor and a non-transient memory comprising instructions that, when executed by the computer processor, cause the computer processor to implement a method comprising:
presenting a graphical user interface (GUI) on a display;
presenting a representation of the network of devices on the display, wherein the representation includes real-time information for each represented device;
presenting, on the display, a list of one or more stored network management procedures;
receiving a selection from a user, via the GUI, of an indication of one of the network management procedures from the list;
retrieving the selected network management procedure;
presenting, on the display, one or more steps of the selected network management procedure, wherein each step is a single independently executable action that obtains or causes a network result with respect to the network; and
presenting, on the display, a graphic element corresponding to each step, wherein the graphic element for each step on the display is operable by a GUI operation applied to the graphic element to execute the corresponding step for the network result for that corresponding step.

12. The system of claim 11, wherein the method further comprises:
displaying the steps of the selected network management procedure as a flowchart.

13. The system of claim 11, wherein the method further comprises:
displaying, via the GUI, an identifier of a subset of steps as a block of steps,
wherein the steps in the identified block are to be executed together.

14. The system of claim 11, wherein the method further comprises:
displaying, via the GUI, an identifier of a subset of steps as a block of steps,
wherein the steps in the identified block are to be executed in a predetermined order.

15. The system of claim 11, wherein the method further comprises:
displaying, via the GUI, an identifier of a subset of steps as a block of steps; and
displaying, via the GUI, a control indicator that establishes a logical relationship between at least two steps in the identified block.

16. The system of claim 11, wherein the method further comprises:
receiving a GUI operation to modify an order of the displayed graphic elements,
wherein the modified order of the displayed graphic elements sets an order in which the corresponding steps are executed.

17. The system of claim 11, wherein the method further comprises:
receiving, via the GUI, annotation information corresponding to a step.

18. The system of claim 11, wherein each step obtains, or causes, a network result from, or in, the computer network.

19. The system of claim 18, wherein the network result corresponds to a response from a device in the network.

* * * * *